United States Patent
Yamagishi et al.

(10) Patent No.: US 10,511,395 B2
(45) Date of Patent: Dec. 17, 2019

(54) RECEPTION DEVICE, TRANSMISSION DEVICE, AND DATA PROCESSING METHOD

(71) Applicant: SONY CORPORATION, Tokyo (JP)

(72) Inventors: Yasuaki Yamagishi, Kanagawa (JP); Tatsuya Igarashi, Tokyo (JP)

(73) Assignee: SONY CORPORATION, Tokyo (JP)

(*) Notice: Subject to any disclaimer, the term of this patent is extended or adjusted under 35 U.S.C. 154(b) by 99 days.

(21) Appl. No.: 15/520,074

(22) PCT Filed: Sep. 8, 2015

(86) PCT No.: PCT/JP2015/075393
§ 371 (c)(1),
(2) Date: Apr. 18, 2017

(87) PCT Pub. No.: WO2016/067756
PCT Pub. Date: May 6, 2016

(65) Prior Publication Data
US 2017/0310409 A1    Oct. 26, 2017

(30) Foreign Application Priority Data
Oct. 28, 2014 (JP) ................................ 2014-219657

(51) Int. Cl.
| | |
|---|---|
| *H04H 60/13* | (2008.01) |
| *G06F 16/907* | (2019.01) |
| *G06F 16/955* | (2019.01) |
| *H04H 20/91* | (2008.01) |
| *H04N 21/433* | (2011.01) |
| *H04N 21/434* | (2011.01) |

(Continued)

(52) U.S. Cl.
CPC ............. *H04H 60/13* (2013.01); *G06F 16/00* (2019.01); *G06F 16/907* (2019.01);
(Continued)

(58) Field of Classification Search
CPC .... H04H 60/13; H04H 20/91; H04N 21/4331; H04N 21/4345; H04N 21/435;
(Continued)

(56) References Cited

U.S. PATENT DOCUMENTS

| | | |
|---|---|---|
| 6,502,108 B1 | 12/2002 | Day et al. |
| 6,538,676 B1 | 3/2003 | Peters |

(Continued)

FOREIGN PATENT DOCUMENTS

| | | |
|---|---|---|
| JP | 2004-289848 A | 10/2004 |
| JP | 2009-205397 A | 9/2009 |

(Continued)

OTHER PUBLICATIONS

Office Action dated May 28, 2019 in Japanese Patent Application No. 2016-556424.

*Primary Examiner* — Davoud A Zand
(74) *Attorney, Agent, or Firm* — Oblon, McClelland, Maier & Neustadt, L.L.P.

(57) ABSTRACT

Provided are a device and a method which are capable of realizing an efficient search of metadata such as access information corresponding to acquisition-scheduled data in a reception device. A reception device receives a token which is auxiliary search information for efficiently searching for metadata such as access information related to acquisition-scheduled data of the reception device and performs a search process using the token. The token includes a service worker (SW) search scope token capable of limiting a search scope of access information corresponding to data serving as a management target of a specific service worker (SW) which is a data management program and a service worker (SW) cache scope token indicating that access information corresponding to data serving as a management target of a service worker (SW) is collectively recorded.

20 Claims, 41 Drawing Sheets

(51) Int. Cl.
    *H04N 21/435* (2011.01)
    *H04N 21/443* (2011.01)
    *H04N 21/454* (2011.01)
    *G06F 16/00* (2019.01)

(52) U.S. Cl.
    CPC ......... *G06F 16/9566* (2019.01); *H04H 20/91* (2013.01); *H04N 21/435* (2013.01); *H04N 21/4331* (2013.01); *H04N 21/4345* (2013.01); *H04N 21/4433* (2013.01); *H04N 21/454* (2013.01)

(58) Field of Classification Search
    CPC ................ H04N 21/4433; H04N 21/454; G06F 16/907; G06F 16/9566; G06F 16/00; G06F 17/30887; G06F 17/30997
    See application file for complete search history.

(56) References Cited

U.S. PATENT DOCUMENTS

| | | | |
|---|---|---|---|
| 2006/0053121 A1* | 3/2006 | Zizys | G06F 11/1451 |
| 2010/0250599 A1* | 9/2010 | Schmidt | G06F 17/30241 707/780 |
| 2011/0276585 A1* | 11/2011 | Wagner | H04N 21/2225 707/769 |
| 2012/0317136 A1* | 12/2012 | Papish | G06F 16/9535 707/769 |
| 2014/0297700 A1* | 10/2014 | Vongsouvanh | G06F 17/30106 707/827 |

FOREIGN PATENT DOCUMENTS

| | | |
|---|---|---|
| JP | 2010-28584 A | 2/2010 |
| JP | 2014-057227 A | 3/2014 |

* cited by examiner

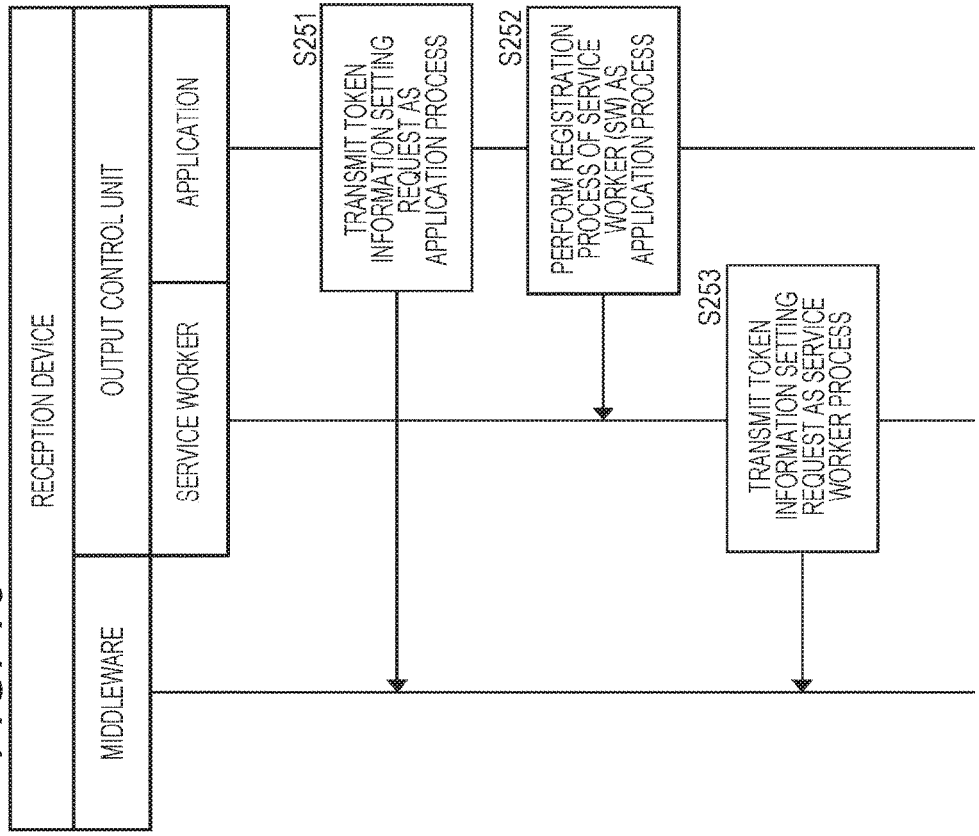
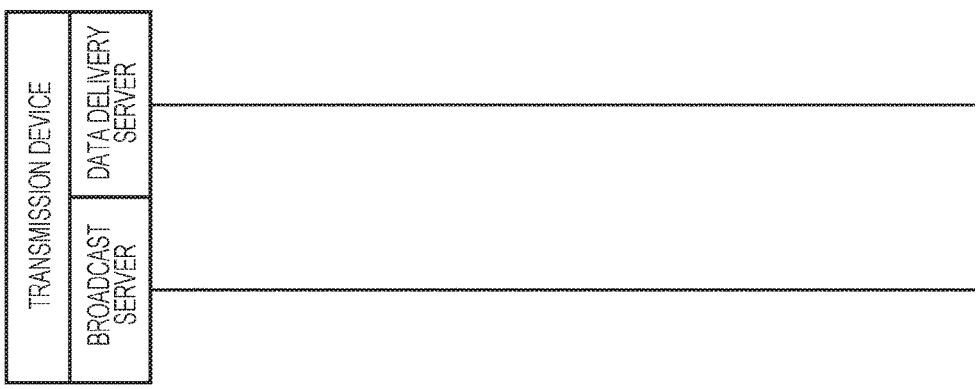
FIG. 16

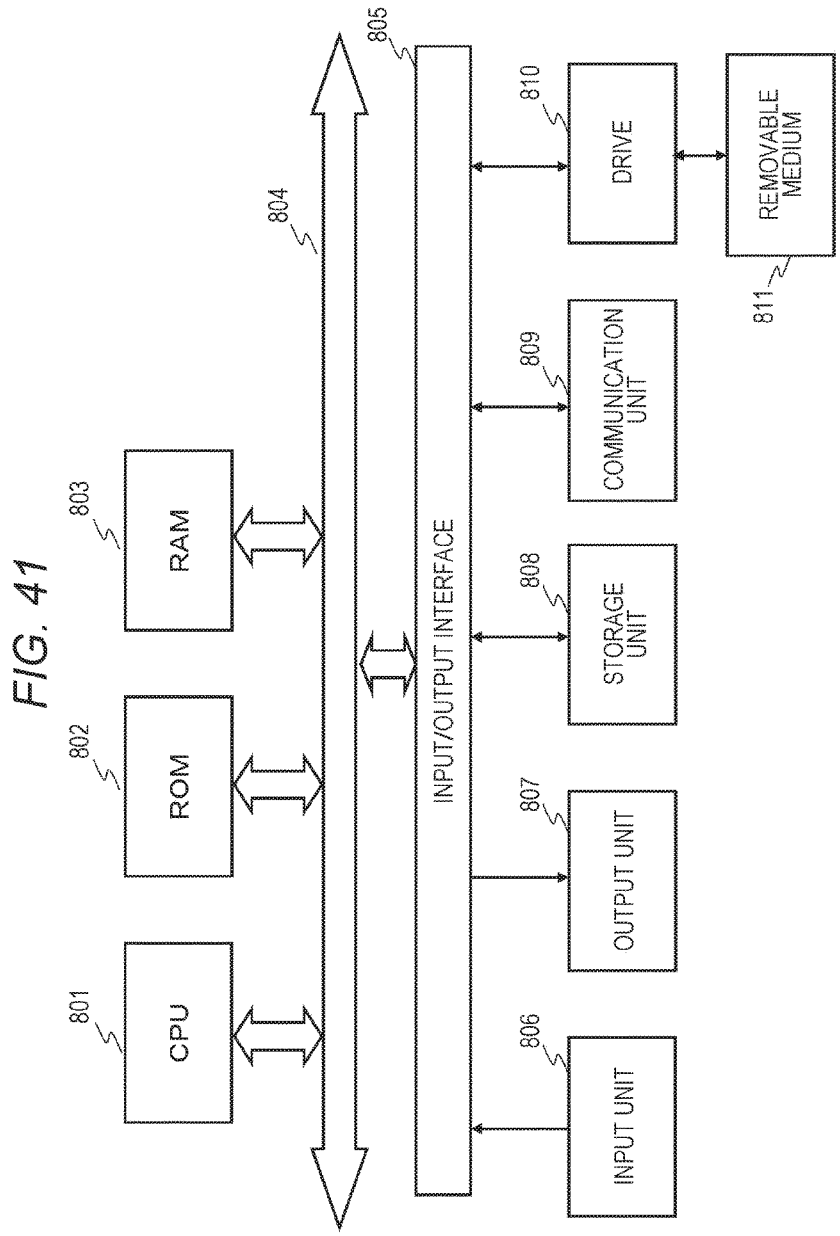

RECEPTION DEVICE, TRANSMISSION DEVICE, AND DATA PROCESSING METHOD

CROSS REFERENCE TO RELATED APPLICATIONS

This application is a U.S. National Phase of International Patent Application No. PCT/JP2015/075393 filed on Sep. 8, 2015, which claims priority benefit of Japanese Patent Application No. JP 2014-219657 filed in the Japan Patent Office on Oct. 28, 2014. Each of the above-referenced applications is hereby incorporated herein by reference in its entirety.

TECHNICAL FIELD

The present disclosure relates to a reception device, a transmission device, and a data processing method. More particularly, the present disclosure relates to a reception device that performs reception of data, for example, via a broadcast wave or a network, a transmission device that perform transmission of data, for example, via a broadcast wave or a network, and a data processing method for communication data.

BACKGROUND ART

Development and standardization of systems in which transmission and reception of content such as broadcast programs through one-way communication using a broadcast wave or the like or two-way or one-way communication via a network such as the Internet or the like are performed between a transmission device that provides content such as a broadcast station or a content server and a reception device such as a television, a PC, or a mobile terminal has been actively conducted.

Note that a related art such that a technique of implementing data delivery via a broadcast wave and a network is disclosed in, for example, Patent Document 1 (Japanese Patent Application Laid-Open No. 2014-057227).

Standardization of Advanced Television System Committee (ATSC) 3.0 has been conducted as one of standards related to data delivery system via a broadcast wave and a network.

In ATSC 3.0, a packaging scheme for download type application delivery management and an offline application registration/update management scheme are still under review.

Meanwhile, World Wide Web Consortium (W3C) which is an international standardization organization of World Wide Web (WWW) usage technology is developing a specification of a service worker (SW) including a control program or the like used to realize use of applications convenient for clients.

In order to realize effective use of a framework of the service worker (SW) in clients which are reception devices of broadcast content, it is required that delivery management of application parts which are broadcast and delivered and the service worker (SW) can be effectively managed.

CITATION LIST

Patent Document

Patent Document 1: Japanese Patent Application Laid-Open No. 2014-057227

SUMMARY OF THE INVENTION

Problems to be Solved by the Invention

It is an object of the present disclosure to provide a reception device, a transmission device, and a data processing method, which are capable of realizing the effective use of the service worker (SW) framework in clients serving as a broadcast content reception device.

Further, more specifically, it is an object to provide a reception device, a transmission device, and a data processing method which enable, for example, an efficient search of metadata such as a URL corresponding to acquisition-scheduled data in a reception device.

Solutions to Problems

According to a first aspect of the present disclosure, provided is a reception device including a data processing unit that receives a token which is auxiliary search information for efficiently searching for metadata related to acquisition-scheduled data and performs a process using the token.

Further, according to a second aspect of the present disclosure, provided is a transmission device that transmits metadata in which a token is recorded, the token being auxiliary search information for efficiently searching for metadata related to acquisition-scheduled data in a reception device.

Further, according to a third aspect of the present disclosure, provided is a data processing method performed in a reception device, including receiving, by a data processing unit of the reception device, a token which is auxiliary search information for efficiently searching for metadata related to acquisition-scheduled data and performing a process using the token.

Further, according to a fourth aspect of the present disclosure, provided is a data processing method performed in a transmission device, including transmitting metadata in which a token is recorded, the token being auxiliary search information for efficiently searching for metadata related to acquisition-scheduled data in a reception device.

Other objects, features, and advantages of the present disclosure will become apparent from detailed description based on an embodiment of the present disclosure to be described later and the attached drawings. Note that, in this specification, a system is a logical aggregate configuration of a plurality of devices, and it is not limited to a configuration in which devices of respective components are in the same housing.

Effects of the Invention

According to a configuration of an embodiment of the present disclosure, a device and a method which are capable of realizing an efficient search of metadata such as access information corresponding to acquisition-scheduled data in a reception device are implemented.

Specifically, a reception device receives a token serving as auxiliary search information for efficiently searching for metadata such as access information related to acquisition-scheduled data of the reception device and performs a search process using the token.

Examples of the token includes a service worker (SW) search scope token capable of limiting a search scope of access information corresponding to data serving as a management target of a specific service worker (SW) which is a data management program and a service worker (SW) cache scope token indicating that the access information corresponding to the data of the management target of the service worker (SW) is collectively recorded.

According to the present configuration, a device and a method which are capable of realizing an efficient search of metadata such as access information corresponding to acquisition-scheduled data in a reception device are implemented.

Note that the effects described in this specification are merely examples and not limited thereto, and additional effects may be obtained.

BRIEF DESCRIPTION OF DRAWINGS

FIG. 16 is a diagram for describing a data acquisition process sequence using a token.

FIG. 41 is a diagram for describing exemplary hardware configurations of a transmission device and a reception device serving as a communication device.

MODE FOR CARRYING OUT THE INVENTION

A reception device, a transmission device, and a data processing method of the present disclosure will be described below in detail with reference to the appended drawings.

Further, a description will proceed according to the following sections.

1. Example configuration of communication system
2. Data communication protocols FLUTE and ROUTE
3. Exemplary communication processes performed by transmission device and reception device 4. Service worker (SW)
5. Example of acquisition and execution of application in reception device
6. Delivery of service worker (SW) and cache control process (polling type process example)
  6.1. Acquisition and registration processes of service worker (SW) from broadcast stream-associated application
  6.2. Configuration in which efficiency of data acquisition process of reception device is improved by applying token
  6.3. Update process of service worker (SW)
  6.4. Control process of storage unit (permanent cache) of reception device by service worker (SW)
7. Delivery of service worker (SW) and cache control process (push type process example)
  7.1. Acquisition and registration processes of service worker (SW) from broadcast stream-associated application
  7.2. Configuration in which efficiency of data acquisition process of reception device is improved by applying token
  7.3. Update process of service worker (SW)
  7.4. Control process of storage unit (permanent cache) of reception device by service worker (SW)
8. Configuration of signaling data (metadata) which describes token
  8.1. Exemplary token recording in OMA-ESG constituting signaling data (metadata)
  8.2. Exemplary token recording in USD constituting signaling data (metadata)
  8.3. Exemplary token recording in FLUTE (ROUTE) parameter layer constituting signaling data (metadata)
9. Exemplary configurations of transmission device and reception device
10. Conclusion of configuration of present disclosure

[1. Example of Configuration of Communication System]

First, an exemplary configuration of a communication system in which a process of the present disclosure is performed will be described with reference to FIG. 1.

Figure 1:
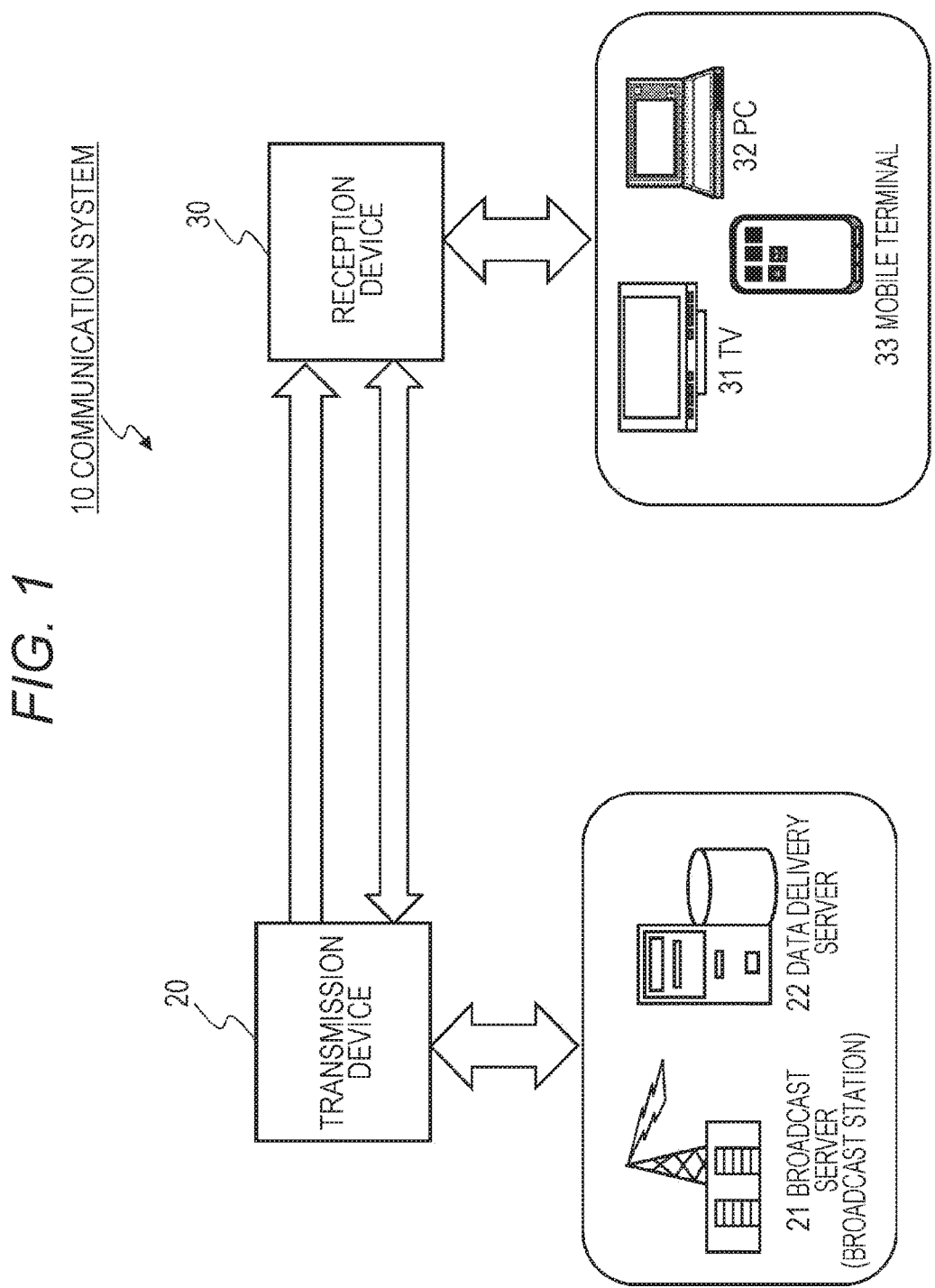
FIG. 1 is a diagram for describing an exemplary configuration of a communication system in which a process of the present disclosure is performed.

A communication system 10 includes a transmission device 20 serving as a communication device that transmits contents such as image data, audio data, or the like and a reception device 30 serving as a communication device that receives the content transmitted from the transmission device 20 as illustrated in FIG. 1.

Specifically, the transmission device 20 is, for example, a device on a content provision side such as a broadcast station 21 and a content server 22.

On the other hand, the reception device 30 is a client device of a general user, and specifically, the reception device 30 includes, for example, a television 31, a PC 32, a mobile terminal 33, or the like.

Data communication between the transmission device 20 and the reception device 30 is performed as communication using at least either or both of two-way communication or one-way communication via a network such as the Internet and one-way communication via a broadcast wave or the like.

Content transmission from the transmission device 20 to the reception device 30 is performed, for example, according to an MPEG-DASH standard which is a standard of an adaptive streaming technique.

The MPEG-DASH standard includes the following two standards:
  (a) a standard related to a manifest file (media presentation description (MPD)) for describing metadata serving as management information of moving images or audio files; and
  (b) a standard related to a file format (a segment format) for moving image content transmission.

Content delivery from the transmission device 20 to the reception device 30 is performed according to the MPEG-DASH standard.

The transmission device 20 encodes content data and generates a data file including encoded data and metadata of the encoded data.

An encoding process is performed, for example, according to an MP4 file format specified in MPEG.

Note that, when the transmission device 20 generates an MP4 format data file, a file of encoded data is referred to as "mdat," and metadata is referred to as "moov," "moof," or the like.

Content provided by the transmission device 20 to the reception device 30 is various data, for example, music data, video data such as movies, television programs, videos, photographs, documents, paintings, and diagrams, games, and software.

Transmission data of the transmission device 20 will be described with reference to FIG. 2.

Figure 2:
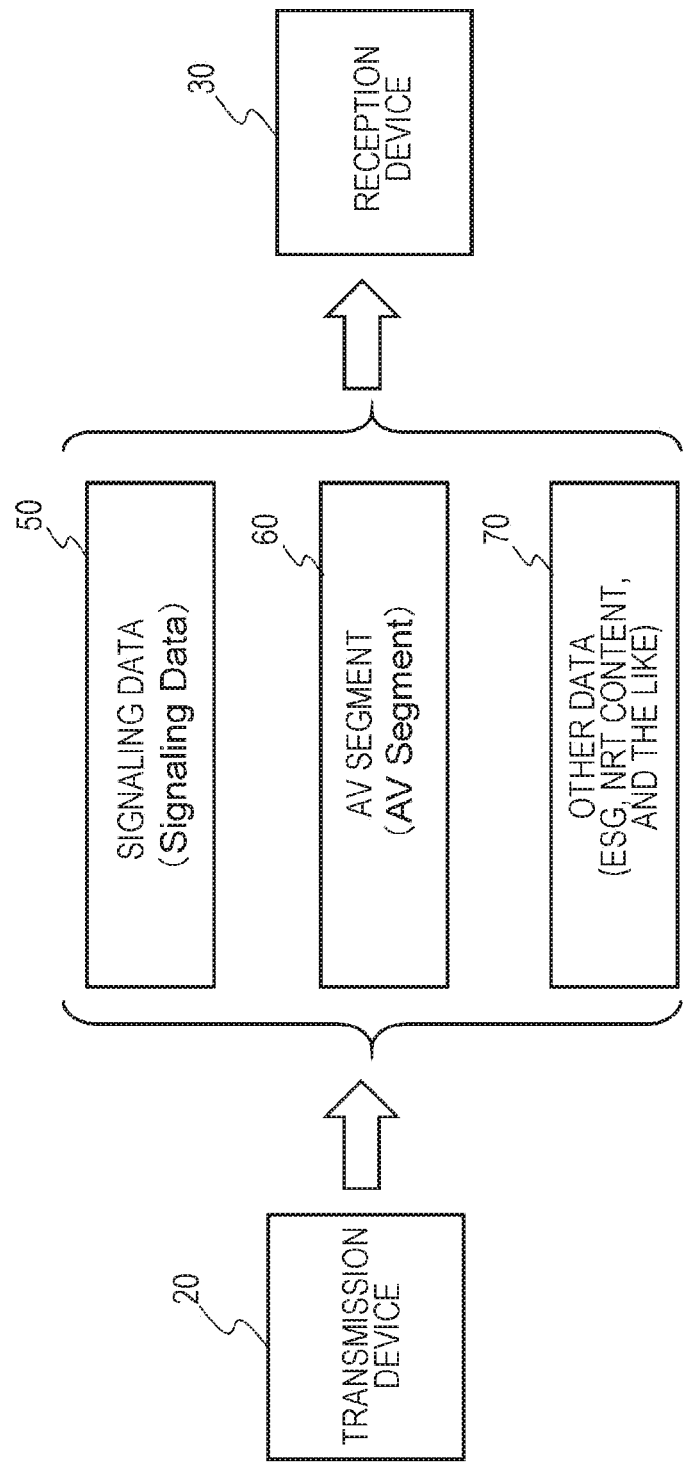
FIG. 2 is a diagram for describing transmission data of a transmission device.

Data transmitted by the transmission device 20 which performs data transmission according to the MPEG-DASH standard are roughly divided into a plurality of kinds of following data as illustrated in FIG. 2:
  (a) signaling data 50;
  (b) AV segment 60; and
  (c) other data (ESG, NRT content, or the like.) 70.

For example, the AV segment 60 is configured with an image (video) or audio data which is reproduced in the reception device, that is, program content or the like provided from a broadcast station. For example, the AV segment 60 is configured with MP4 encoded data (mdat) and metadata (moov and moof).

On the other hand, the signaling data 50 is configured with program schedule information such as a program table, address information (a uniform resource locator (URL) or the like.) necessary for program acquisition, guide information including information necessary for a reproduction process of content such as codec information (an encoding scheme or the like) or the like, and control information.

The reception device 30 has to receive the signaling data 50 before reception of the AV segment 60 storing program content serving as a reproduction target.

For example, the signaling data 50 is transmitted to the reception device (client) which is a user equipment such as a smartphone or a television as data of an extensible markup language (XML) format.

As described above, the signaling data is repeatedly transmitted as necessary.

For example, the signaling data is transmitted frequently and repeatedly at intervals of 100 msec.

This is because the reception device (client) can immediately acquire the signaling data at any time.

The client (reception device) can promptly perform a process necessary for reception and reproduction of program content such as acquisition of an access address of necessary program content, a codec setting process, or the like on the basis of receivable signaling data as necessary.

The other data 70 includes, for example, an electronic service guide (ESG), NRT content, and the like.

The ESG is an electronic service guide, for example, guide information such as a program table.

The NRT content is non-real time type content.

For example, data files such as various application files, moving images, or still images which are executed on a browser of the reception device 30 serving as a client are included in the NRT content.

A service worker used as a control program of an application (which will be described later) or the like is also included in the NRT content.

The following data illustrated in FIG. 2 are transmitted, for example, according to a data communication protocol: a file delivery over uni-directional transport (FLUTE):

(a) the signaling data 50;
(b) the AV segment 60; and
(c) the other data (ESG, NRT content, or the like.) 70

[2. Data Communication Protocols Flute and Route]

The data communication protocol FLUTE is a protocol for performing session management of content to be transmitted in a multicast manner.

For example, a file (which is identified by a URL and a version) generated at a server side serving as a transmission device is transmitted to a client serving as a reception device according to the FLUTE protocol.

The reception device (client) 30 stores a URL and a version of a received file and a file, for example, in a storage unit (client cache) of the reception device (client) 30 in association with each other.

When a URL is identical but aversion is different, it is regarded that content of the file is updated. In the FLUTE protocol, only one-way file transfer control is performed, there is no selective filtering function of a file in a client, but it is possible to implement selective filtering by choosing a file that undergoes transfer control according to FLUTE at a client side using metadata linked with the file and configure, update, and manage a local cache in which the user's preference is reflected.

Note that the metadata may be extended and incorporated into FLUTE protocol or may be described separately by a protocol such as an electronic service guide (ESG).

Note that FLUTE has been standardized originally as a file transfer protocol in multicast.

FLUTE is configured with FDT and a multicast protocol of a scalable file object called ALC, specifically, a combination of LCT or FEC components which are building blocks thereof.

FLUTE of a related art has been mainly developed for use in asynchronous file transfer, and currently, FLUTE is extended to be easily applied even to broadcast live streaming in Advanced Television System Committee (ATSC) which is a standardization organization related to data delivery systems via a broadcast wave and a network.

The extended specification of FLUTE is called real-time object delivery over unidirectional transport (ROUTE).

Advanced Television System Committee (ATSC) 3.0 is currently being standardized as one of standards related to data delivery systems via a broadcast wave and a network. ATSC 3.0 specifies a stack configuration in which instead of the FLUTE protocol of the related art, ROUTE is employed for transmission of signaling data, ESGs, asynchronous files, synchronous streams, and the like.

[3. Exemplary Communication Processes Performed by Transmission Device and Reception Device]

Next, exemplary communication processes performed by the transmission device and the reception device will be described.

Figure 3:
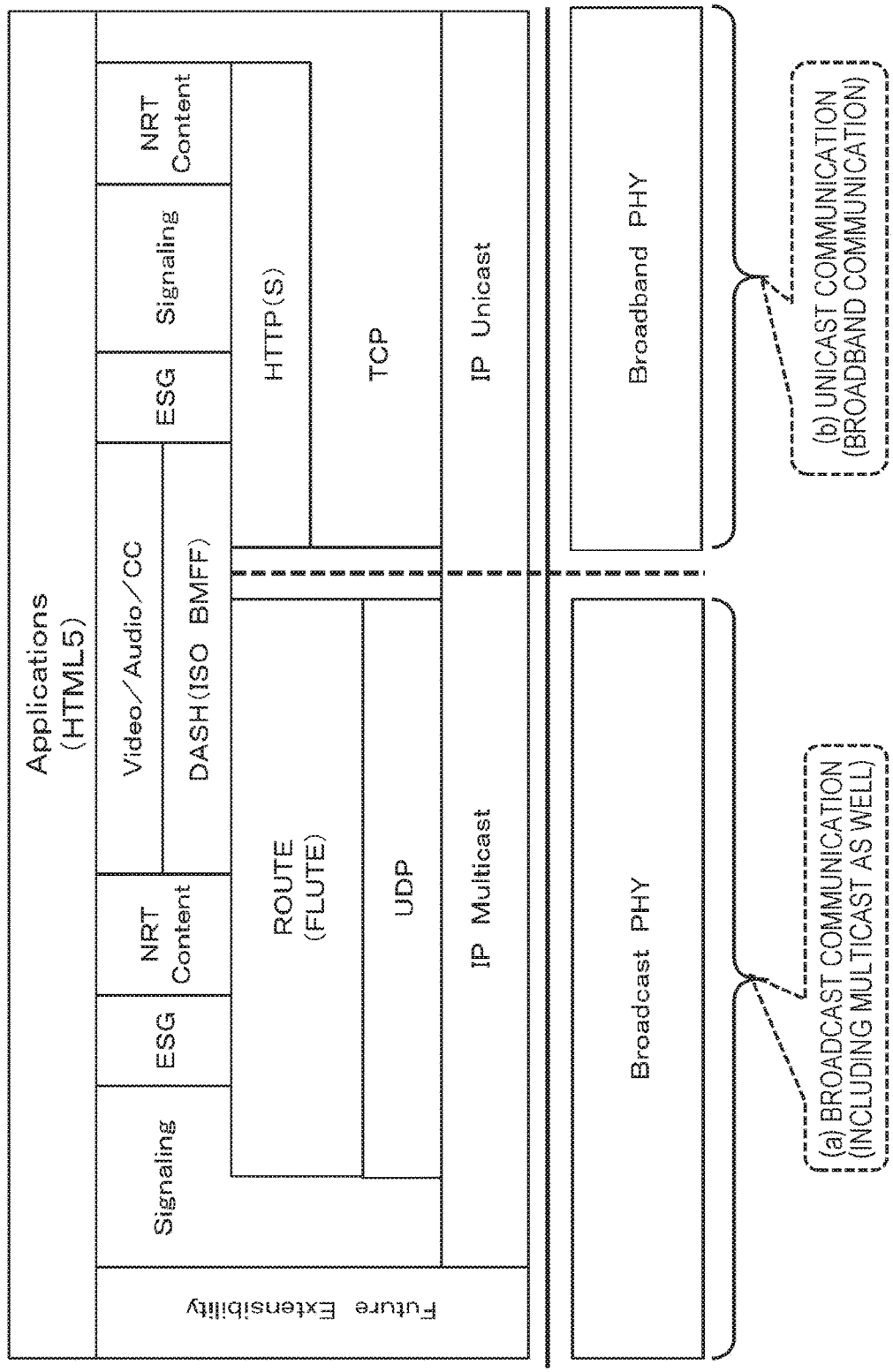
FIG. 3 is a diagram illustrating an example of a protocol stack of a transmission device and a reception device.

FIG. 3 is a diagram illustrating an example of protocol stacks of the transmission device and the reception device.

In the example illustrated in FIG. 3, two protocol stacks for processing the following two pieces of communication data are illustrated:

(a) broadcast (including multicast) communication (for example, broadcast type data delivery); and (b) unicast (broadband) communication (for example, HTTP type P2P communication).

A left side of FIG. 3 is (a) a protocol stack corresponding to broadcast communication (for example, broadcast type data delivery).

A right side of FIG. 3 is (b) a protocol stack corresponding to unicast (broadband) communication (for example, HTTP type P2P communication).

The protocol stack corresponding to (a) the broadcast communication (for example, the broadcast type data delivery) illustrated on the left side of FIG. 3 has the following layers in order from a lower layer:

(1) a broadcast physical layer (Broadcast PHY);
(2) an IP multicast layer (IP Multicast);
(3) a UDP layer;
(4) a ROUTE (=extended FLUTE) layer;
(5) an ESG, NRT content, DASH (ISO BMFF), and Video/Audio/CC; and
(6) an application layer (Applications (HTML5)).

Note that a signaling layer is set as a layer above (2) the IP multicast layer (IP Multicast).

The signaling layer is a layer applied to the transmission and reception of the signaling data 50 described above with reference to FIG. 2. The signaling data includes program schedule information such as a program table, address information (a URL or the like.) necessary for program acquisition, guide information including information necessary for a reproduction process of content such as codec information (an encoding scheme or the like) or the like, and control information.

Note that a use permission layer of a new protocol in the future (Future Extensibility) is set as a layer above (1) the broadcast physical layer (Broadcast PHY).

(1) The broadcast physical layer (Broadcast PHY) is a physical layer configured with a communication control unit for controlling, for example, a communication unit of a broadcast system for executing broadcast communication.

(2) The IP multicast layer (IP multicast) is a layer in which a data transmission/reception process according to an IP multicast is performed.

(3) The UDP layer is a layer in which a process of generating and analyzing a UDP packet is performed.

(4) The ROUTE layer is a layer in which transfer data is stored and extracted according to the ROUTE protocol serving as the extended FLUTE protocol.

Similarly to FLUTE, ROUTE is a multicast protocol of a scalable file object called ALC, and specifically, ROUTE is configured with a combination of LCT or FEC components which are building blocks thereof.

(5) The ESG, NRT content, DASH (ISO BMFF) and Video/Audio/CC are data transferred according to the ROUTE protocol.

The broadcast type delivery service according to the DASH standard is called a multimedia broadcast multicast service (MBMS). There is an evolved multimedia broadcast multicast service (eMBMS) as a scheme for efficiently implementing MBMS in LTE.

MBMS and eMBMS are broadcast type delivery services, that is, services for simultaneously delivering the same data such as movie content or the like to a plurality of user terminals (UE) which are reception devices located in a specific area through a common bearer. Through broadcast delivery according to MBMS or eMBMS, it is possible to simultaneously provide the same content to reception devices such as a plurality of smartphones, PCs, or televisions located in a delivery service provision area.

In MBMS, and eMBMS, a process of downloading files according to a 3GPP file format (ISO-BMFF files or MP4 files) is specified according to the transfer protocol ROUTE or FLUTE.

Most of the following data described above with reference to FIG. 2 are transmitted according to the ROUTE protocol or the FLUTE protocol:

(a) the signaling data 50;
(b) the AV segment 60; and
(c) the other data (ESG, NRT content, or the like.) 70

(5) The ESG, NRT content, DASH (ISO BMFF) and Video/Audio/CC are data which is transferred according to the ROUTE protocol.

The ESG is an electronic service guide, for example, guide information such as program table.

The NRT content is non-real time type content.

As described above, for example, data files such as various application files, moving images, or still images which are executed on a browser of the reception device serving as a client are included in the NRT content. Further, a service worker (SW) used as a control program of an application (which will be described later) or the like is also included in the NRT content.

The Video/Audio/CC is actual data serving as a reproduction target such as videos or audios delivered according to the DASH standard.

(6) The application layer (Applications (HTML5)) is an application layer in which generation or analysis of data to be transferred according to ROUTE protocol is performed, and output control of various data is performed, for example, data generation, analysis, an output process, and the like to which HTML5 is applied is performed.

On the other hand, the protocol stack corresponding to (b) the unicast (broadband) communication (for example, HTTP type P2P communication) illustrated on the right side of FIG. 3 has the following layers in order from the lower layer:

(1) a broadband physical layer (Broadband PHY);
(2) an IP unicast layer (IP Unicast);
(3) a TCP layer;
(4) an HTTP layer;
(5) ESG, Signaling, NRT content, DASH (ISO BMFF) and Video/Audio/CC;
(6) an application layer (Applications (HTML5)).

(1) The broadband physical layer (Broadband PHY) is a physical layer configured with a communication control unit such as a device driver for controlling a communication unit such as a network card for executing broadband communication.

(2) The IP unicast layer (IP Unicast) is a layer in which the IP unicast transmission/reception process is performed.

(3) The HTTP layer is an HTTP packet generation/analysis processing layer.

The upper layer is similar to the stack configuration of (a) the broadcast communication (for example, broadcast type data delivery) on the left side of FIG. 3.

Note that the transmission device (server) 20 and the reception device (client) 30 perform a process according to at least one of the two processing systems of FIG. 3, that is, the following two communication protocol stacks:

(a) broadcast communication (for example, broadcast type data delivery);
(b) unicast (broadband) communication (for example, HTTP type P2P communication).

In the protocol stack illustrated in FIG. 3, an attribute of a file group which is multicast and transferred according to ROUTE (FLUTE) (including a URL serving as an identifier of a file) can be described in signaling data in which a file transfer session is described when it can be described in a control file of ROUTE (FLUTE). Further, a more detailed attribute of a file transfer session can be described by an ESG (which can also be used for presentation to end users).

[4. Service Worker (Sw)]

Next, the service worker (SW) which is provided by the transmission device (server) 20 and mainly used in the reception device (client) 30 will be described.

The service worker (SW) is provided to the reception device from the transmission device 20 such as a broadcast server 21 or a data delivery server 22.

The service worker (SW) is a program which performs an acquisition process for an application (=an application program) executed in the reception device (client) 30, a data file used when an application is performed, or the like, a storage process in a storage unit (cache), an update process, a deletion process, and the like. Specifically, service worker (SW) is configured with, for example, JavaScript (registered trademark).

For example, the service worker (SW) is set corresponding to the broadcast program (broadcast content) provided by the transmission device 20 such as the broadcast server 21, the data delivery server 22, and the like, and provided to the reception device 30 as a control/management program of an application provided from the transmission device 20 to the reception device 30.

The service worker (SW), the application, and the data file used when the application is executed are provided from the transmission device 20 to the reception device 30, for example, as the NRT content (non-real time content) described above with reference to FIGS. 2 and 3.

Alternatively, a data provision server different from a server that delivers a broadcast program may be configured to provide the service worker (SW), the application, and the data file used when the application is executed to the reception device 30.

For example, the service worker (SW) performs management (acquiring, retention, update, deletion, and the like.) of an application or the like for performing information display using a browser which is a program used for performing a browsing process of a web page or the like in the reception device 30.

A specific example (use case) of a process using the service worker (SW) will be described with reference to FIGS. 4 and 5.

Figure 4:
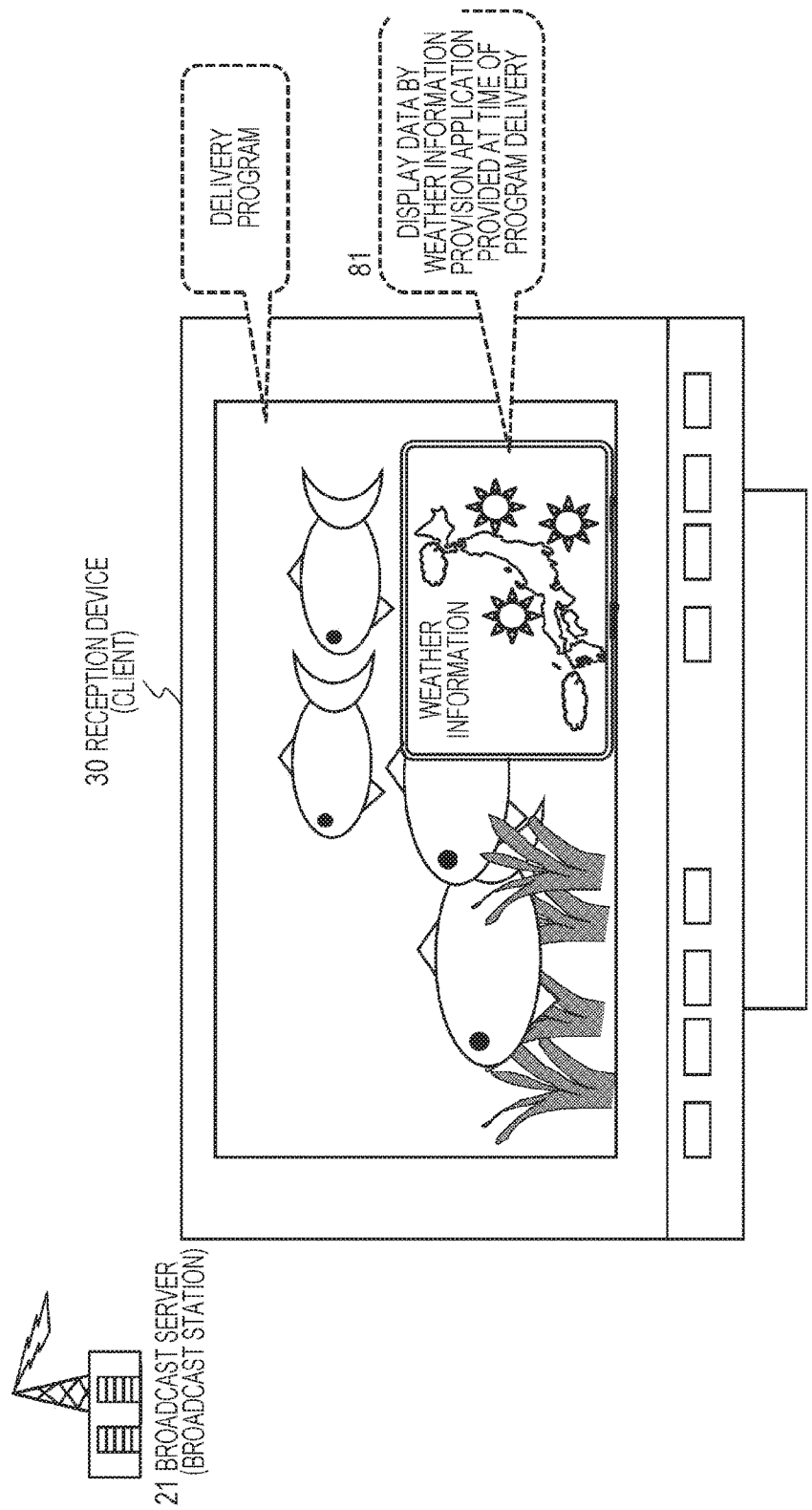
FIG. 4 is a diagram for describing a specific example (use case) of a process using a service worker (SW).

FIG. 4 illustrates a state in which the reception device 30 receives certain program content from the transmission device 20 such as the broadcast server 21 and displays the program content on the display unit of the reception device 30.

In addition to the program delivery, the transmission device 20 such as the broadcast server 21 provides an application for displaying weather information and various data files used for the weather information display application, for example, data files including various data such as moving images, still images, and audios to the reception device 30 as the NRT content (non-real time content).

Hereinafter, the application and the data files are referred to as "resources."

The broadcast server 21 further provides the service worker (SW) serving as a resource management program for managing the "resources" to the reception device 30 as the NRT content (non-real time content).

The reception device 30 can perform display of the weather information together with program display as illustrated in FIG. 4 using the "resource" received from the transmission device 20, that is, the application and the data files.

In the data delivery configuration described above, such data display using the application is disabled at the same time as when the program provided by the application ends.

This is because the resources such as the weather information display application are set to be usable in the reception device 30 during reception of the program, for example, stored in a temporary storage cache and are set in an usable state, but when the program ends or the user switches a channel, such cache data is erased or set in a non-accessible state.

The service worker (SW) functions as a resource management program that enables an application or data corresponding to the program to be usable even after the program ends, even after a channel is switched, or even in an offline state such as a broadcast non-reception state or a network non-connection state.

Figure 5:
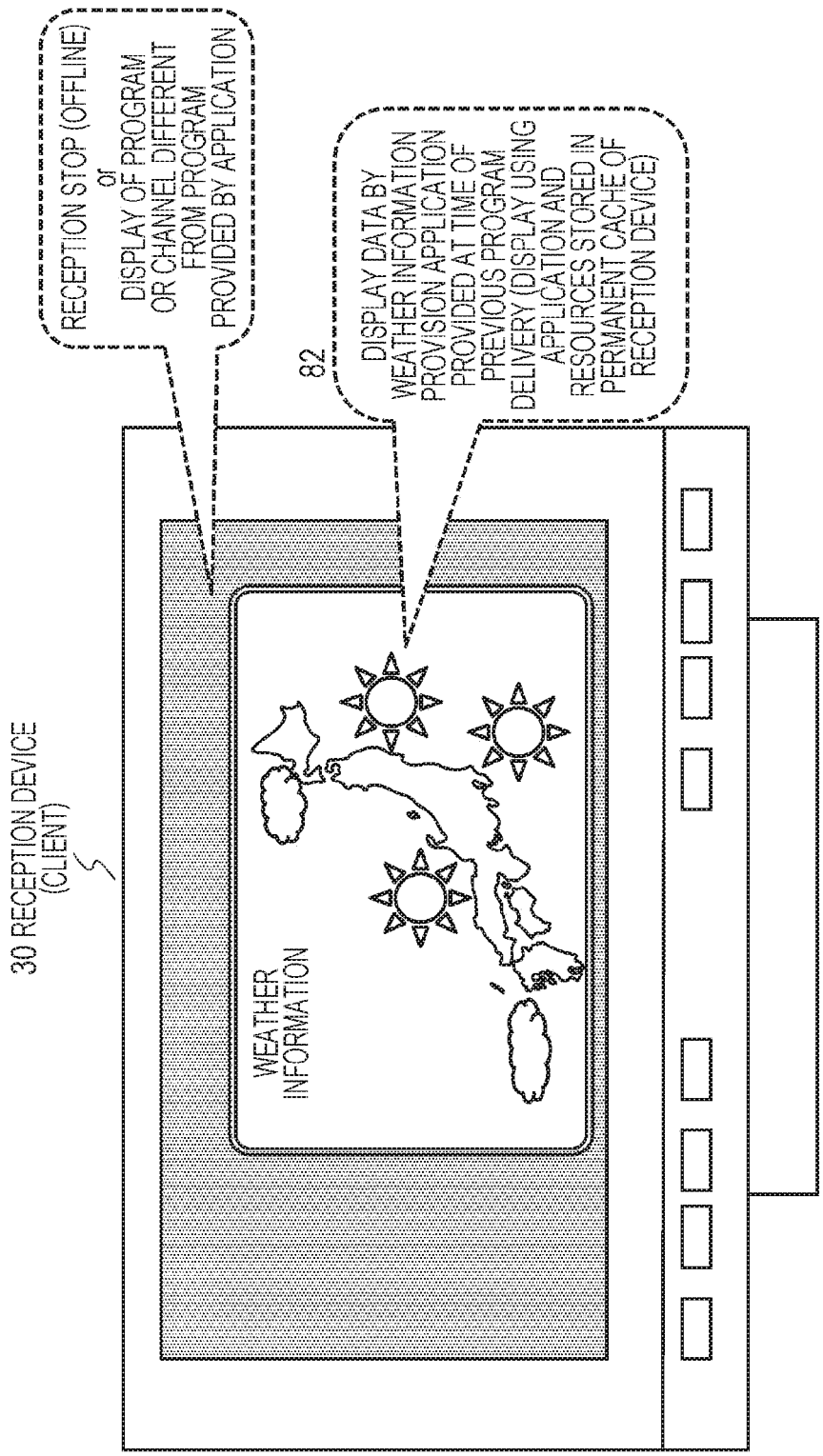
FIG. 5 is a diagram for describing a specific example (use case) of a process using a service worker (SW).

It is possible to enable the weather information display application to be usable even after the program provided by the application ends, even after switching to another channel is performed, or even in an offline state in which data reception is not performed as illustrated in FIG. 5. In other words, it is possible to cause the weather information to be displayed on the display unit of the reception device 30 and browsed.

Note that the weather information display application is, for example, a program displayed on the browser.

The weather information display application is stored in a storage unit (permanent cache) of the reception device 30 under the control of the service worker (SW). For example, when there is a request (event) such as a display request from the user, the weather information display application is read out from the storage unit (permanent cache) and displayed on the display unit under the control of the service worker (SW).

Note that the storage unit (permanent cache) storing the resources such as the application is preferably a nonvolatile memory in which stored data is not erased even when the reception device 30 is powered off.

As described above, using the service worker (SW), it is possible to use various program correspondence applications irrespective of display or non-display of a program.

Note that the service worker (SW) is set, for example, in units of resources corresponding to a certain program (in units of applications and application-related data) and provided from the transmission device 20 to the reception device 30 together with the resources or before or after transmission of the resources.

The service worker (SW) can be set for each program, but it is also possible to set a service worker (SW) which can be used in common to resources corresponding to a specific channel including a plurality of programs.

The service worker (SW) and the resources (the application and application-related data) managed by the service worker (SW) are stored in the storage unit (permanent cache) of the reception device 30.

Figure 6:
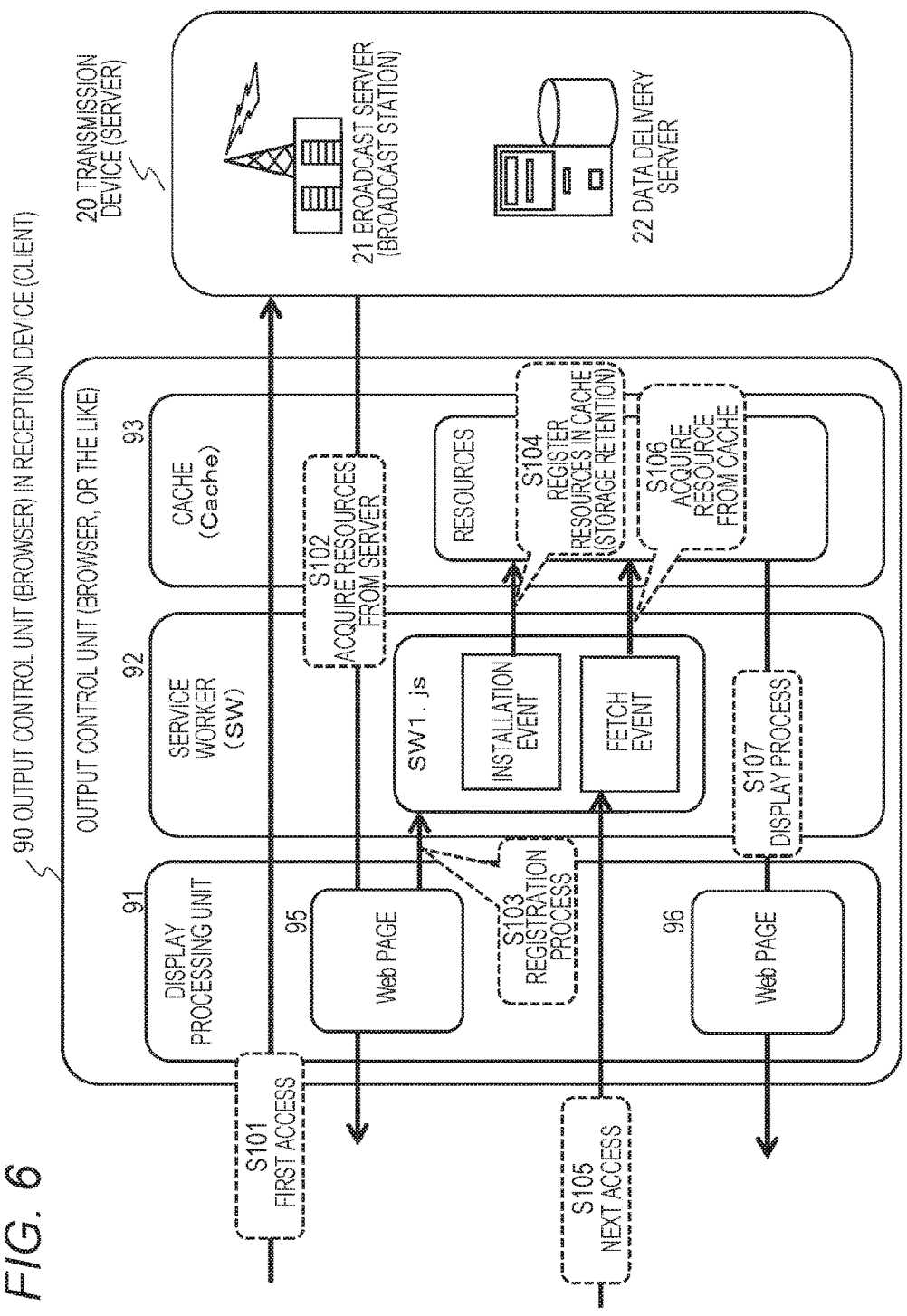
FIG. 6 is a diagram for describing an example of a process using a service worker (SW).

FIG. 6 is a diagram for describing an example of a process using the service worker (SW).

FIG. 6 illustrates an example of a sequence in which the reception device 30 acquires a web page serving as resources (for example, the weather information display page illustrated in FIGS. 4 and 5) from the transmission device 20, stores the web page in the storage unit (permanent cache) of the reception device 30, and uses the web page.

Note that the web page is displayed using a predetermined web page display application and resources configured with display data.

FIG. 6 illustrates a display processing unit 91, a service worker (SW) 92, and a cache (storage unit) 93 as components of an output control unit 90 in the reception device.

Steps S101 to S102 are a resource (web page) acquisition process performed such that the reception device 30 performs a first access processing on the transmission device 20.

For example, it is acquired from the NRT content transmitted from the broadcast server.

After the acquisition process, the display processing unit 91 causes a web page 95 to be displayed on the display unit of the reception device 30.

This display is a state in which the program providing the web page is displayed as well and corresponds to a display state described above with reference to FIG. 3.

In this display period, for example, when there is a resource (web page) registration (installation) request as an instruction by the user, in step S103, the service worker (SW) 92 starts a resource (web page) registration (installation) process.

Specifically, a process of handing the resources over to a cache 93 and storing the resources in the storage unit (permanent cache) is performed as in step S104.

Thereafter, after the program ends, after a channel is switched, or in offline set state, in step S105, the user makes a web page browsing request.

The service worker (SW) 92 detects an input of the browsing request as a fetch event, and in in step S106, the service worker (SW) 92 acquires the resources (web page) from the storage unit (permanent cache) in response to the fetch event detection.

In step S107, the display processing unit 91 displays a web page 96.

The web page display process is a display process after the program ends, after a channel is switched, or in the offline set state and corresponds to the display state described above with reference to FIG. 5.

As described above, using the service worker (SW), it is possible to use various program correspondence applications irrespective of whether or not the program is displayed, and for example, it is possible to perform the process of displaying the web page set as display information of a program attribute at an arbitrary timing irrespective of the program.

As described above, for example, the service worker (SW) performs resource management such as acquisition, storage, update, and deletion of the resources including an application having a web page, an HTML page, JavaScript (registered trademark), and the like as components or data or the like used in an application.

The storage unit (cache) in which the resources are stored is a storage unit (cache) in which stored data is permanently stored, and stores data even when an application does not operate unlike a common local/temporary cache.

A sort of proxy server is implemented in the browser serving as a web page display program, and it is an image that can access the proxy server as necessary at any time, acquire the web page, and display the web page.

Note that the service worker (SW) is also stored (installed) in the permanent cache. When the service worker (SW) is installed in the reception device, various control can be performed on the resources serving as the management target of this service worker (SW).

For example, in response to an access request to the resources (a fetch request to the resources), before a browser side process (acquisition of resources from a local cache or a network) starts, the process of the service worker (SW) starts, and provision of the resources from the permanent cache is performed.

Further, since service worker (SW) is provided by JavaScript (registered trademark), it is possible to incorporate various processes, and it is possible to perform flexible process description for cache control such as update of some resources of the permanent cache.

Note that the service worker (SW) can also be updated. The service worker (SW) is provided from the transmission device 20, but various kinds of information necessary for the update process such as update date/time information and access information of an update date are recorded in header information (HTTP cache-control) of the service worker (SW), and the update process is performed on the basis of the header information.

For example, when an expiration date arrives on the basis of an expiration date or the like set in the header, the reception device 30 performs the acquisition process of a new version of the service worker (SW) and performs the update process of replacing the old version of the SW stored in the cache.

[5. Example of Acquisition and Execution of Application in Reception Device]

As described above, the reception device 30 can execute, for example, an application such as the weather information display application described above with reference to FIGS. 4 and 5, that is, the management target of the service worker (SW) at an arbitrary timing using the service worker (SW).

The user at the reception device 30 side can execute the application at an arbitrary timing and browse a weather information display page or various web pages at any time.

A configuration of the reception device 30 of executing the application will be described with reference to FIG. 7.

Figure 7:
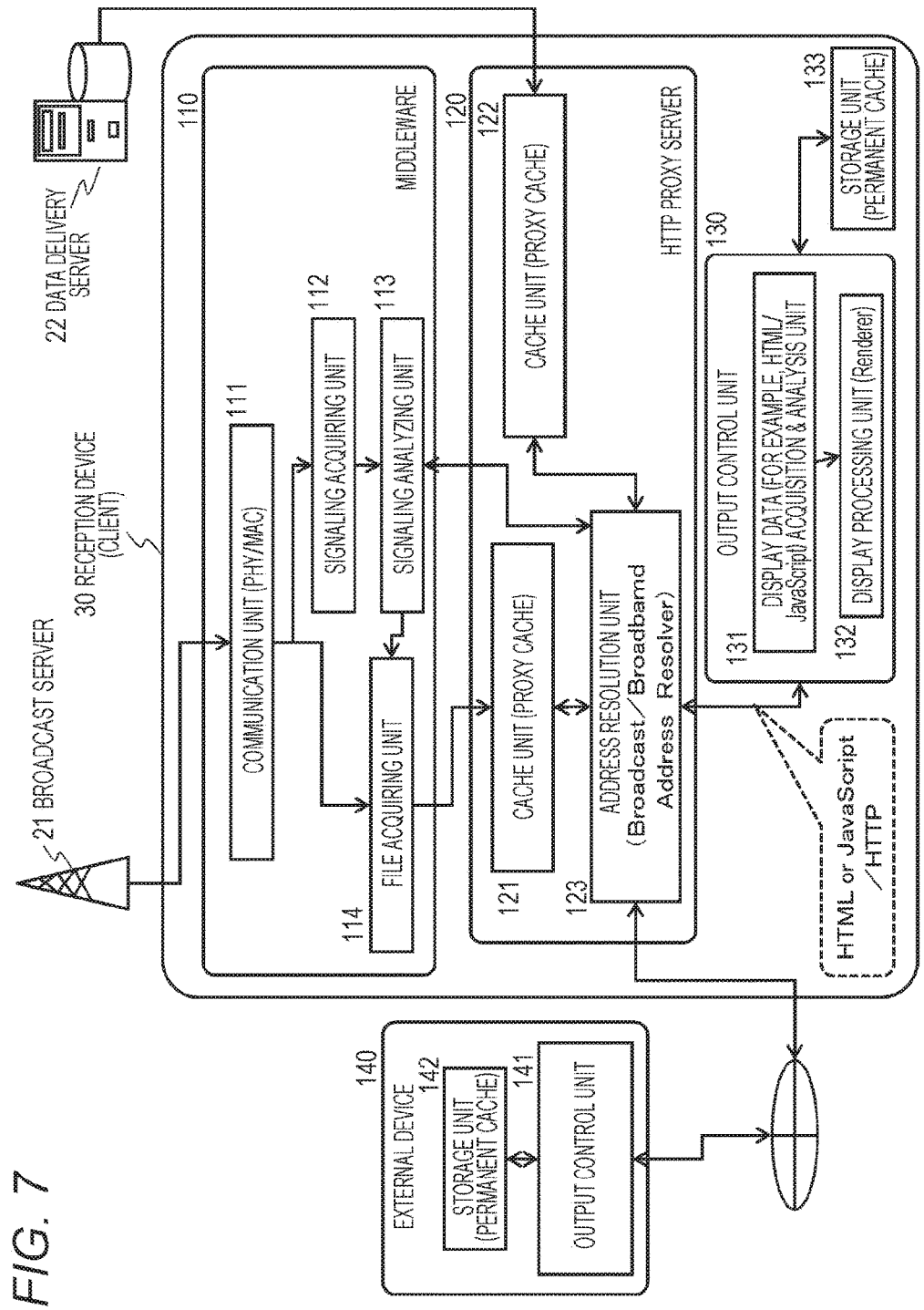
FIG. 7 is a diagram for describing an exemplary configuration of a reception device.

FIG. 7 illustrates an exemplary configuration mainly applied to acquisition and execution of the application as a partial configuration of the reception device 30 for executing a service worker (SW) management application such as the weather information display application.

The reception device 30 includes middleware 110, an HTTP proxy server 120, and an output control unit 130 as illustrated in FIG. 7.

The middleware 110 receives and analyzes provision data of the broadcast server 21.

The middleware 110 includes a communication unit (PHY/MAC) 111, a signaling acquiring unit 112 that acquires signaling data, a signaling analyzing unit 113 that analyzes signaling data, and a file acquiring unit 114 that acquires signaling data and program content data such as videos and voices or data files such as NRT content of an application or the like.

The data received by middleware 110 is stored in a cache unit (proxy cache) 121 of a proxy server 120. The proxy server 120 further stores data acquired from the data delivery server 22 via a network in a cache unit (proxy cache) 122.

The proxy server 120 inputs a data request transferred from the output control unit 130 to an address resolution unit 123, acquires requested data from the cache unit (proxy cache) 121 or 122 or the outside, and provides the requested data.

The output control unit 130 is a data processing unit that executes the service worker (SW) management application such as the weather information display application. For example, the output control unit 130 performs a web page display process or the like on the browser.

The output control unit 130 includes a display data (for example, HTML/JavaScript (registered trademark)) acquisition & analysis unit 131 and a display processing unit (Renderer) 132.

The output control unit 130 acquires and presents middleware (Client Local ATSC Middleware) 110 in which a broadcast system reception stack is implemented via the proxy server (Client Local HTTP Proxy Server) 120 or acquires and presents an application and a part (HTML page and JavaScript) via a common network stack in which a network system transmission/reception process is performed.

Note that it is also possible to transfer the application and the part (an HTML page or JavaScript) in an output control unit 141 of an external device 150 connected to the reception device 30 via a network such as a LAN and execute the application in the external device 140.

The output control unit 130 can store the service worker (SW) and the resources serving as the management target of the service worker (SW) (the application and the application-related data) in the storage unit (permanent cache) 133 and perform the process using the service worker (SW) and the resources stored in the storage unit (the permanent cache) at an arbitrary timing.

For example, it is possible to output various data using the application at an arbitrary timing as described above with reference to FIGS. 4 and 5. Further, the output control unit 130 performs the update process or the deletion process of the service worker (SW) or the resources (the application and the application-related data) as necessary.

The same applies to the output control unit 141 of the external device 140, and the service worker (SW) or the resources (the application and the application-related data) are stored in a storage unit (permanent cache) 142 of the external device 140, and various data processes using the service worker (SW) or the application are performed at an arbitrary timing. Further, the update process or the deletion process of the service worker (SW) or the resources (the application and the application-related data) is performed as necessary.

Note that, in the model illustrated in FIG. 7, since the output control units 130 and 140 consistently access via the proxy server 120 when access to the outside is performed, it is not distinguished whether the resources such as the application are acquired via broadcasting or a network. In other words, network transparency is provided.

An exemplary data acquisition/provision process according to the data request from the output control unit 130 will be described.

For example, when the output control unit 130 requests acquisition of an HTML page or JavaScript (registered trademark) constituting the application (an HTTP request), the proxy server 120 that has received the request determines whether an HTML page or JavaScript (registered trademark) is acquired via the broadcast reception stack or a network in the address resolution unit (Broadcast/Broadband Address Resolver) 123.

Information serving as a material of the determination is obtained from an analysis result of signaling data by the signaling analyzing unit 113.

The signaling analyzing unit (Signaling Parser) 113 transmits an acquisition request of USBD (USD, SDP, or the like.) which is metadata included in the signaling data of ATSC 3.0 to the signaling acquiring unit (Signaling Retriever) 112.

The signaling analyzing unit (Signaling Parser) 113 extracts the metadata included in the signaling data transferred by a signaling data storage LCT packet which is broadcast and received via the communication unit (an ATSC tuner: ATSC 3.0 PHY/MAC) 111.

Further, the signaling analyzing unit (Signaling Parser) 113 resolves broadcast delivery address information for acquiring a requested file from the signaling data (metadata) on the basis of a URL included in the acquisition request of the application component (part). When the application component (part) is determined to be broadcast delivery target data, the file acquiring unit (File Retriever) 114 acquires the file storage LCT packet in which a desired file is stored on the basis of the broadcast delivery address information, and stores the file storage LCT packet in the cache unit (proxy cache) 121.

The proxy server 120 returns the cached file to the output control unit 130 (as an HTTP response). When the URL included in the acquisition request of the application part is not set in the metadata included in the signaling data, the proxy server 120 acquires the file from the data delivery server 22 via a common network stack.

[6. Delivery of Service Worker (Sw) and Cache Control Process (Polling Type Process Example)]

Next, delivery of the service worker (SW) and a cache control process will be described.

For the service worker (SW) or the resource including the application serving as the management target of the service worker (SW) or data applied to the application, for example, there are two forms, that is, a configuration in which a polling type acquisition process is performed on the basis of an acquisition request from a browser installed in the reception device 30 and a push type in which it is acquired regardless of an acquisition request from a browser and provided to a browser.

The following two process forms of (A) and (B) will be sequentially described below.

(A) a polling type data acquisition process example; and
(B) a push type data acquisition process example.

First, a process example in which the polling type data acquisition process is performed will be described.

[6.1. Acquisition and Registration Processes of Service Worker (SW) from Broadcast Stream-associated Application]

First, a process example of acquiring and registering the service worker (SW) using the application attached to the broadcast stream transmitted from the transmission device 20 to the reception device 30 will be described.

The reception device (client) 30 acquires a URL of an application serving as an acquisition target through a process of a broadcast stream reproduction application (which is executed in a browser or a native environment) which is being executed in the reception device 30.

For example, trigger information for notifying a URL at which the application is activated is included in a broadcast stream of a specific program, and the reproduction application can acquire the URL from which the application is acquired on the basis of the trigger information.

The reception device 30 extracts the application specified by the URL from the broadcast stream using this URL or acquires the application via the network and executes the application on the browser.

The application performs the acquisition process and the registration process of the service worker (SW) [SW.js] in which the application is set as the management target. Js of SW.js indicates JavaScript (registered trademark).

The acquisition and execution of the application and the sequence of the acquisition and registration processes of the service worker (SW) will be described with reference to sequence diagrams illustrated in FIGS. 8 to 10.

Figure 8:
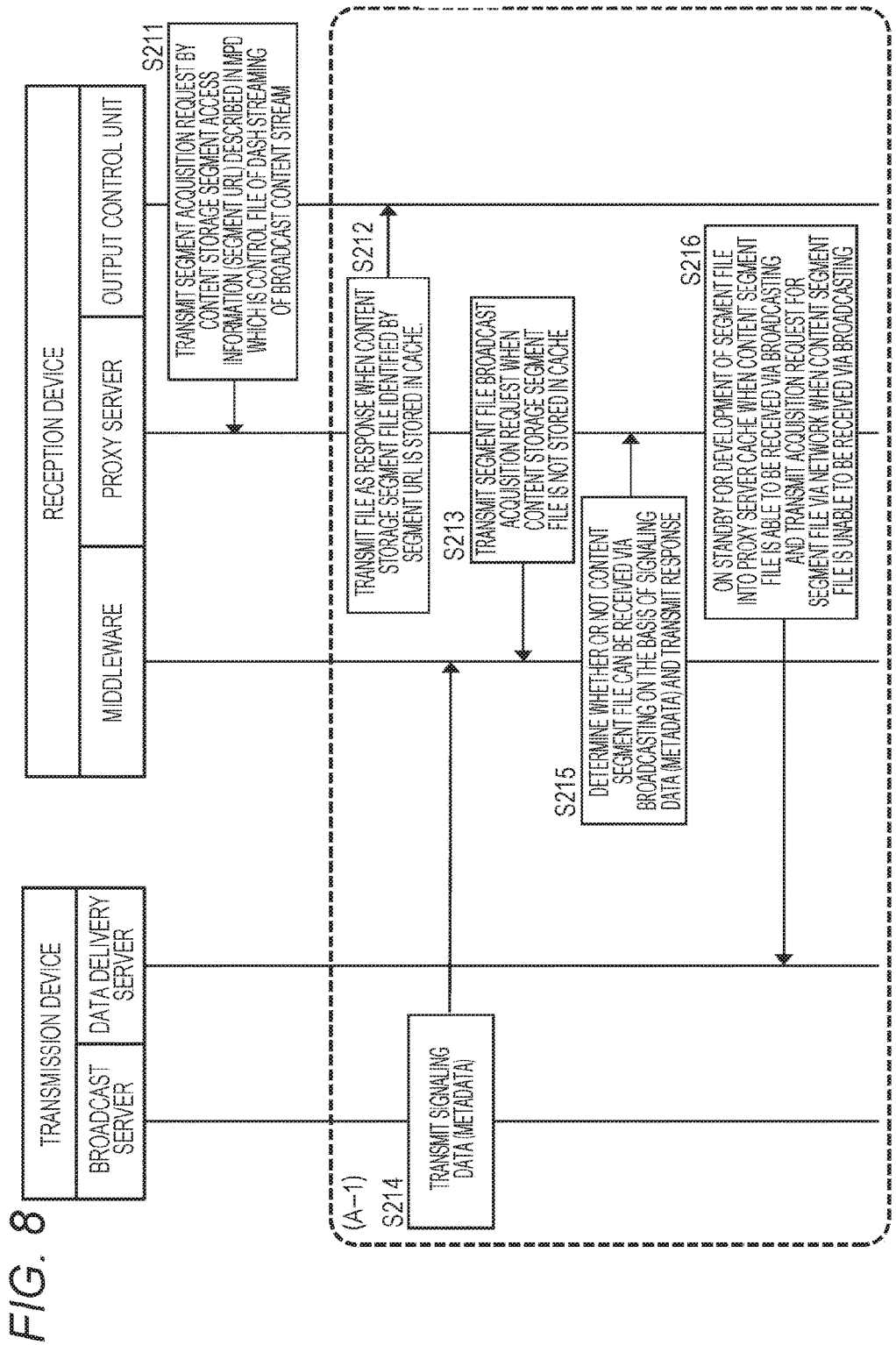
FIG. 8 is a diagram for describing acquisition and execution of an application, acquisition of a service worker (SW), and a sequence of a registration process.
Figure 9:
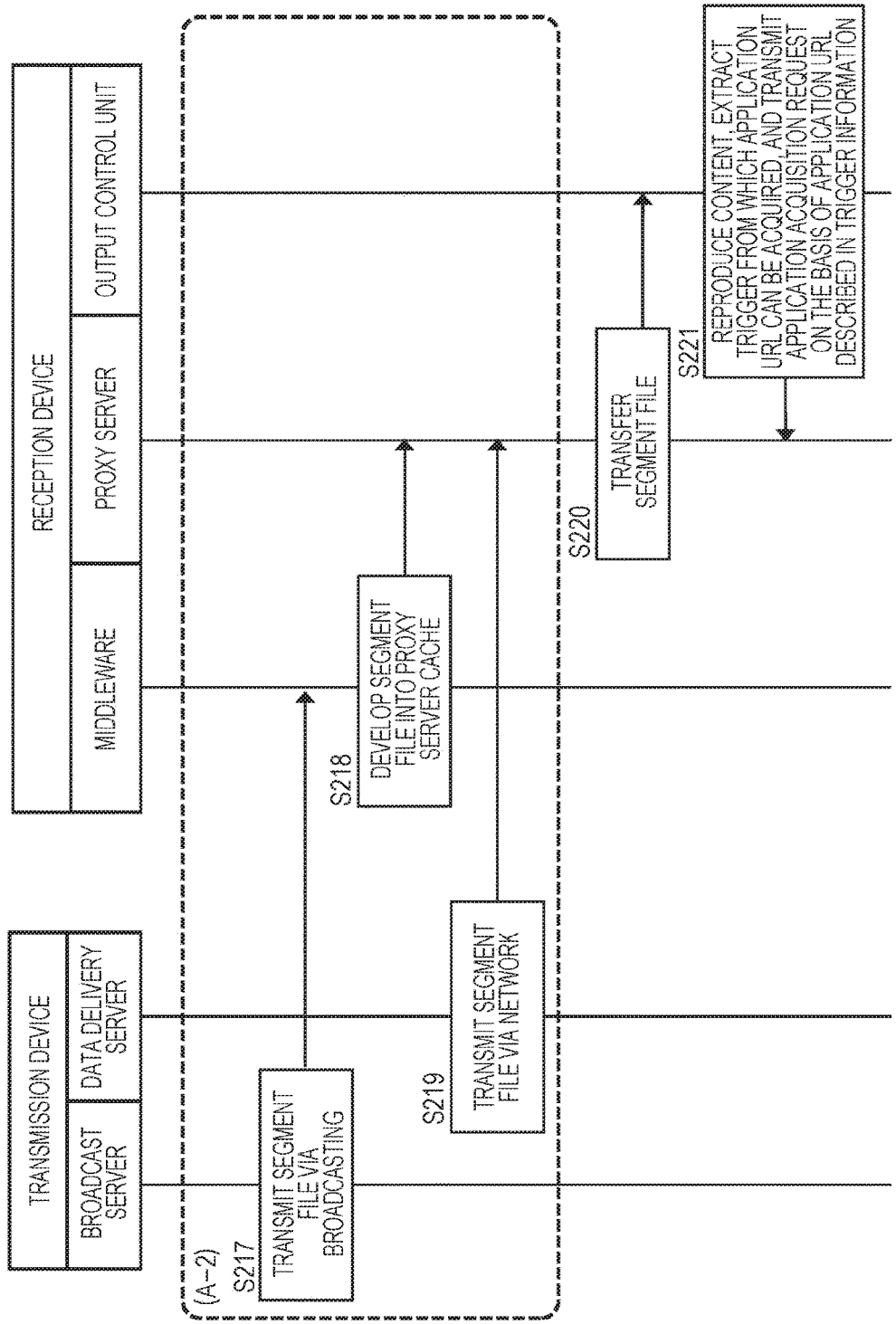
FIG. 9 is a diagram for describing acquisition and execution of an application, acquisition of a service worker (SW), and a sequence of a registration process.
Figure 10:
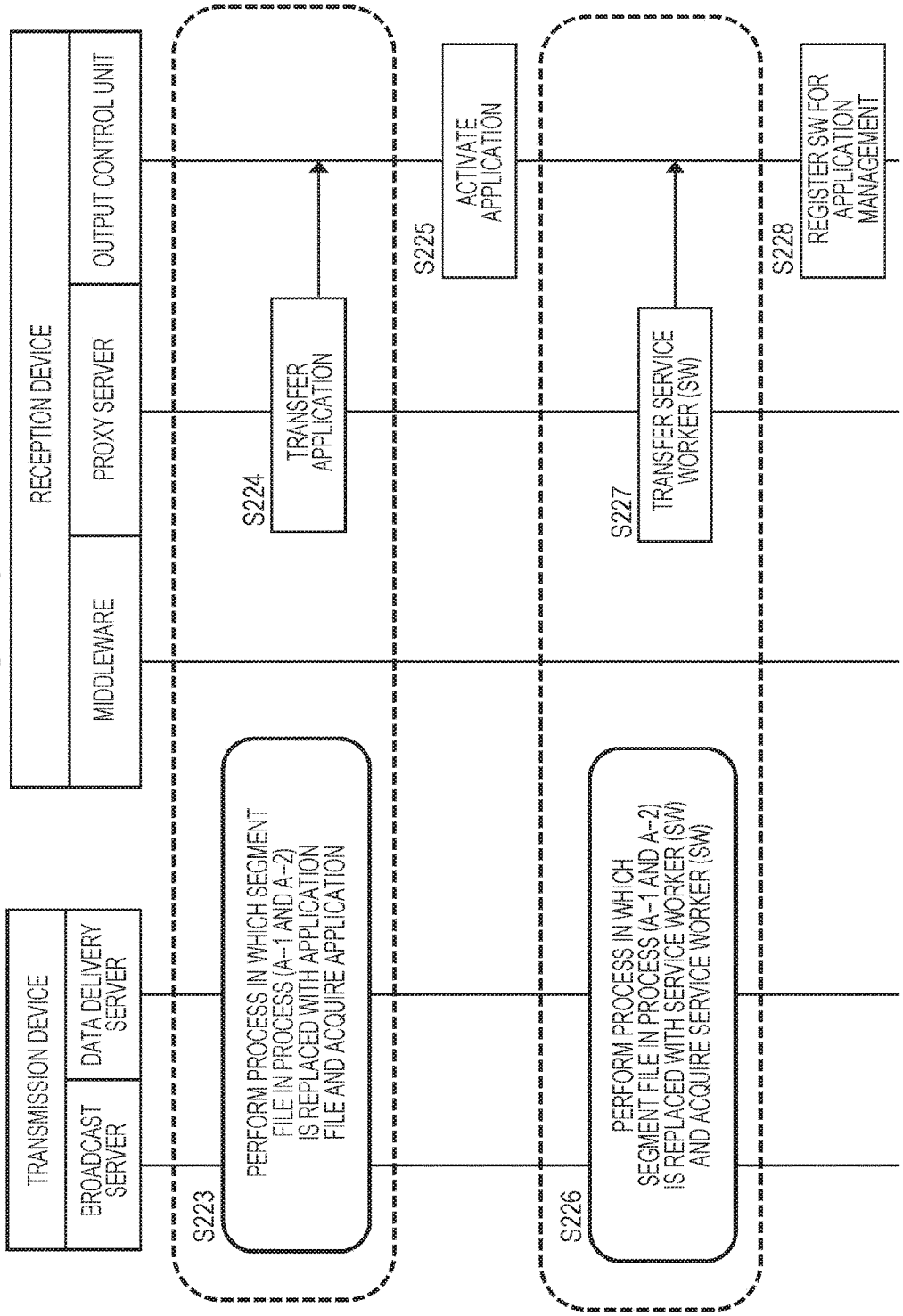
FIG. 10 is a diagram for describing acquisition and execution of an application, acquisition of a service worker (SW), and a sequence of a registration process.

In FIGS. 8 to 10, the following components are illustrated from the left.

(a) a broadcast server serving as the transmission device 20;
(b) a data delivery server serving as the transmission device 20;
(c) middleware serving as a component of the reception device 30;
(d) a proxy server serving as a component of the reception device 30; and
(e) an output control unit serving as a component of the reception device 30.

Processes of steps illustrated in the sequence diagrams of FIGS. 8 to 10 will be sequentially described.

Note that it is assumed that a native stream reproduction application or a stream reproduction application on the browser is activated in the output control unit of the reception device 30 before process sequences of FIGS. 8 to 10 start.

(Step S211)

First, the output control unit which is a component of the reception device 30 acquires a segment URL which is access information of a content storage segment described in MPD which is a control file of a DASH streaming of a broadcast content stream, and transmits an acquisition request for a content segment file in which broadcast content is stored using the acquired segment URL.

As described above, content transmission from the transmission device 20 to the reception device 30 is performed, for example, according to the MPEG-DASH standard which is a standard of an adaptive streaming technology.

As described above with reference to FIG. 2, data which is transmitted by the transmission device 20 that performs data transmission according to the MPEG-DASH standard is roughly divided into a plurality of kinds of following data:

(a) the signaling data 50;
(b) the AV segment 60; and
(c) the other data (ESG, NRT content, or the like.) 70.

For example, the AV segment 60 is configured with an image (video) or audio data which is reproduced in the reception device, that is, program content or the like provided from a broadcast station. For example, the AV segment 60 is configured with MP4 encoded data (mdat) and metadata (moov and moof).

The signaling data 50 is configured with program schedule information such as a program table, address information (a URL or the like.) necessary for program acquisition, guide information including information necessary for a reproduction process of content such as codec information (an encoding scheme or the like) or the like, and control information.

The other data 70 includes, for example, an electronic service guide (ESG), NRT content, and the like.

The ESG is an electronic service guide, for example, guide information such as a program table.

The NRT content is non-real time type content.

For example, data files such as various application files, moving images, or still images which are executed on a browser of the reception device serving as a client are included in the NRT content. The service worker (SW) is also included in the NRT content.

The (media presentation description (MPD)) is a manifest file describing metadata which is management information of moving images and audio files. Specifically, for example, delivery start time information of program content delivered from the broadcast station, access information for an AV segment, and the like are recorded.

In step S211, the output control unit of the reception device 30 acquires a segment URL which is access information of a content storage segment described in the MPD which is a control file of the DASH streaming of a broadcast content stream, and transmits an acquisition request for a content segment file to the proxy server using the acquired segment URL.

(Steps S212 to S213)

Next, in step S212, when the content segment file identified by the segment URL is stored in the cache managed by the proxy server, the proxy server of the reception device 30 acquires the content segment file from the cache and transmits the acquired file to the control unit as a response.

On the other hand, in step S213, when the content segment file identified by the segment URL is determined not to be stored in the cache managed by the proxy server, the proxy server of the reception device 30 outputs the acquisition request for the content segment file to the middleware.

(Step S214)

A process of step S214 indicates a process that is continuously performed by the broadcast server 21. The broadcast server 21 continuously provides signaling data (metadata or the like.) including control information, management information, or the like which is related to delivery content to the reception device 30 along with the delivery of the program content.

(Step S215)

A process of step S215 is performed by the middleware when the request for the content segment file is output from the proxy server in step S213.

The middleware determines whether or not the content segment file for which the acquisition request is output from the proxy server is able to be received via broadcasting on the basis of the signaling data (metadata) received from the broadcast server 21, and gives a notification indicating determination information to the proxy server.

(Step S216)

When a notification indicating that the content segment file can be received via broadcasting is received from the middleware, the proxy server is on standby for development (storage) of the segment file to a management cache of the proxy server.

On the other hand, when a notification indicating that the content segment file is unable to be received via broadcasting is received from the middleware, the proxy server transmits an acquisition request for acquiring the segment file via a network to the data delivery server 22.

(Steps S217 to S218)

A process of steps S217 to S218 is a process performed when the content segment file for which the acquisition request is output from the proxy server can be received via broadcasting.

In this case, in step S217, the broadcast server 21 transmits the content segment file via a broadcast wave.

In step S218, the middleware of the reception device 30 receives the segment file transmitted from the broadcast server 21 and develops (stores) the segment file into the management cache of the proxy server.

(Step S219)

A process of step S219 is a process performed when the content segment file for which the acquisition request is output from the proxy server is unable to be received via broadcasting.

In this case, in step S219, the data delivery server 22 transmits the content segment file requested from the reception device 30 to the reception device 30.

The proxy server of the reception device 30 receives the transmitted segment file and develops (stores) the segment file into the management cache of the proxy server.

(Step S220)

In step S220, the content segment file which is acquired from the broadcast server 21 or the data delivery server 22 and stored in the proxy server management cache is provided from the proxy server to the output control unit.

(Step S221)

In step S221, the output control unit of the reception device 30 starts reproduction of the content acquired from the proxy server.

Further, at the time of content reproduction, trigger information included in the content is acquired, an application URL which is access information of the application corresponding to the content recorded in the trigger information is acquired from the trigger information, and an application acquisition request to which the acquired application URL is applied is transmitted to the proxy server.

(Step S223)

A process of step S223 is a process of acquiring and executing an application set in the content being reproduced (for example, a broadcast program) in step S221.

In step S223, a similar process to the process of steps S212 to S219 (process (A-1 and A-2)) is performed on an application file.

In other words, a process in which "segment file" illustrated in the process of steps S212 to S219 is replaced with "application file" is performed, and the application file is acquired from the broadcast server 21 or the data delivery server 22 and stored in the management cache of the proxy server. Note that, when a desired application file is already developed (stored) into the management cache of the proxy server, a new acquisition process is unnecessary.

(Step S224)

In step S224, the application file which is acquired from the broadcast server 21 or the data delivery server 22 and stored in the management cache of the proxy server is provided from the proxy server to the output control unit.

(Step S225)

In step S225, the output control unit of the reception device 30 executes the application acquired from the proxy server.

For example, the display process of the web page or the like is performed together with the display of the program content. Note that processing content varies depending on the application, and data display is not necessarily performed.

(Step S226)

A process of step S226 is a process which is performed under the control of the application being performed in step S225, that is, a process of acquiring and executing the service worker (SW).

In step S226, a similar process to the process of steps S212 to S219 (the process (A-1 to A-2)) is performed on the service worker (SW) file.

In other words, a process in which "segment file" illustrated in the process of steps S212 to S219 is replaced with "service worker file" is performed, and the service worker file is acquired from the broadcast server 21 or the data delivery server 22 and stored in the management cache of the proxy server. Note that, when a desired service worker file is developed (stored) into the management cache of the proxy server, a new acquisition process is unnecessary.

(Step S227)

In step S227, the service worker file which is acquired from the broadcast server 21 or the data delivery server 22 and stored in the management cache of the proxy server is provided from the proxy server to the output control unit.

(Step S228)

In step S228, the output control unit of the reception device 30 performs a registration process of registering the service worker acquired from the proxy server.

Specifically, a process of storing the service worker (SW) in the storage unit (permanent cache) is performed.

[6.2. Configuration in which Efficiency of Data Acquisition Process of Reception Device is Improved by Applying Token]

Next, a configuration of improving efficiency of acquisition and selection processes of acquired data in the reception device will be described.

For example, the service worker (SW) manages the resources including the application which is set for each program in units of programs and the data files such as images used for the application.

The resources such as the application or the data file serving as the management target of the service worker (SW) are likely to be sequentially updated, and it is necessary for the reception device 30 to update the resources which are management target data of the service worker (SW) and retained in the storage unit (permanent cache) under the control of the service worker (SW) retained in the reception device.

However, the service worker (SW), the application, and the data file provided via the broadcast wave are set corresponding to each program, and the number of files transmitted from the transmission device 20 is expected to be enormous.

It is necessary for the reception device 30 to select the file (the application or the data file) constituting the resources serving as the management target of the service worker (SW) retained in its own device from a huge number of transmission files and acquire the selected file.

A configuration of efficiently executing the file selection process will be described below.

For example, the service worker (SW), the application, the data file related to the application, and the like are sequentially transmitted via the broadcast wave as the NRT content as described above.

Further, a URL corresponding to a file which is access information necessary for acquiring each file, transmission timing information of each file, or the like are recorded in the signaling data (metadata) and provided to the reception device 30.

The reception device 30 can analyze the signaling data (metadata) and detect a URL, a transmission timing, or the like of a file to be acquired.

For example, the signaling data (metadata) has a configuration of recording various information (metadata) of each service unit using one channel or one program as one service unit.

Figure 11:
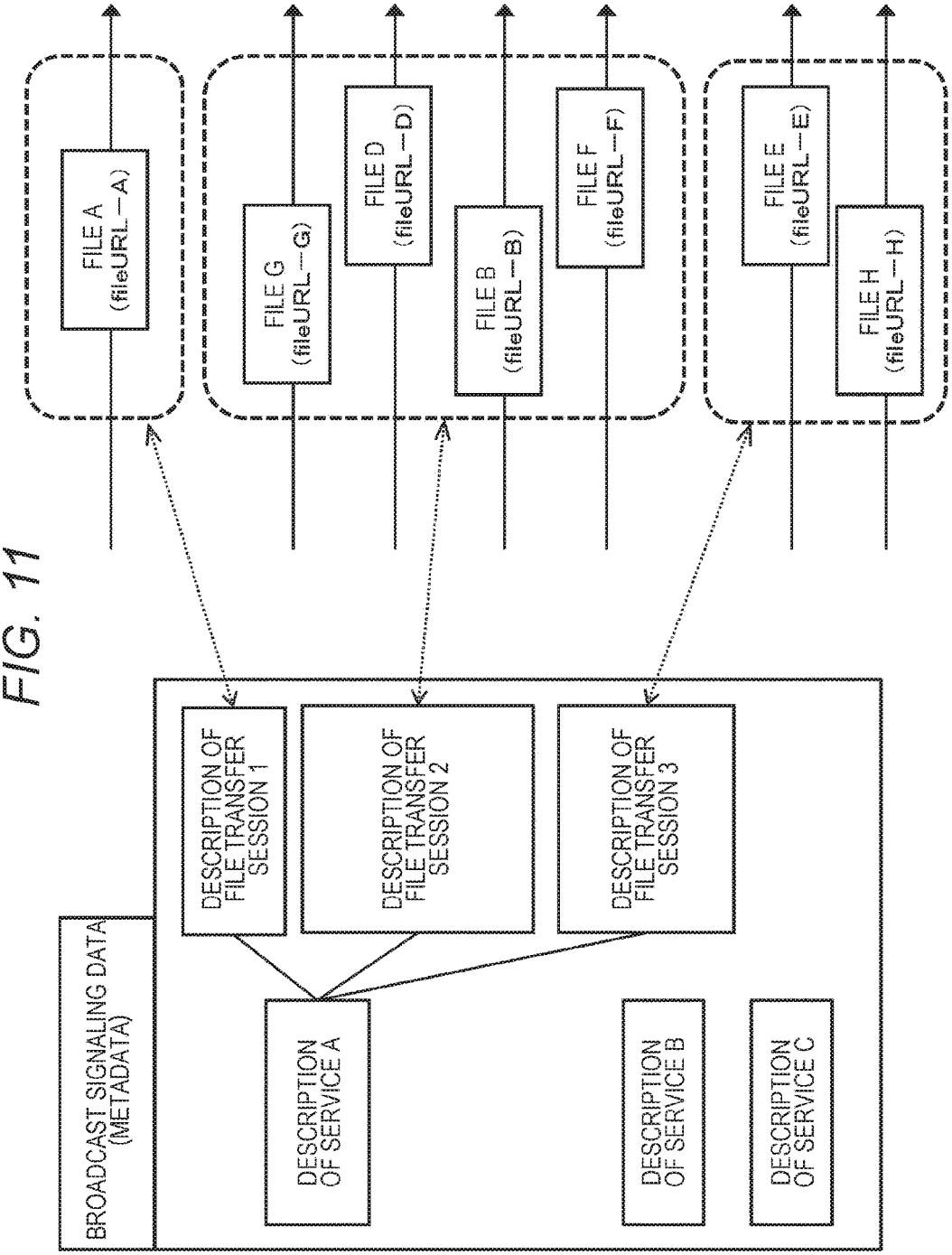
FIG. 11 is a diagram for describing an exemplary configuration of signaling data (metadata).

For example, as illustrated in FIG. 11, metadata of a service unit (a program unit or a channel unit) is described as follows:

metadata having description of a service A;
metadata having description of a service B; and
metadata having description of a service C.

In addition, the metadata of each service unit includes metadata of a file transfer session unit as low-level metadata.

Access information of a file transferred in each session is recorded in the metadata of the file transfer session unit.

The reception device 30 can perform acquisition through the processes of the signaling analyzing unit 113 and the address resolution unit 123 described above with reference to FIG. 7 using access information, acquire file access information matching a URL of a necessary file, and acquire a file.

However, the reception device 30 is unable to detect metadata of the signaling data in which the access information of a necessary file is recorded.

Therefore, it is necessary to investigate all the access information recorded in the signaling data as a search target, and a long time is required as a search time.

As a solution, an example in which a token or a URL for limiting a search scope is recorded in the signaling data will be described with reference to FIG. 12.

The token or the URL is auxiliary search information for efficiently searching for the access information (metadata) related to the acquisition-scheduled data of the reception device 30.

For example, the token or the URL is the auxiliary search information for efficiently searching for the access information related to the resources (the application and the application-related data) which are data serving as a management target of a specific service worker (SW).

Figure 12:
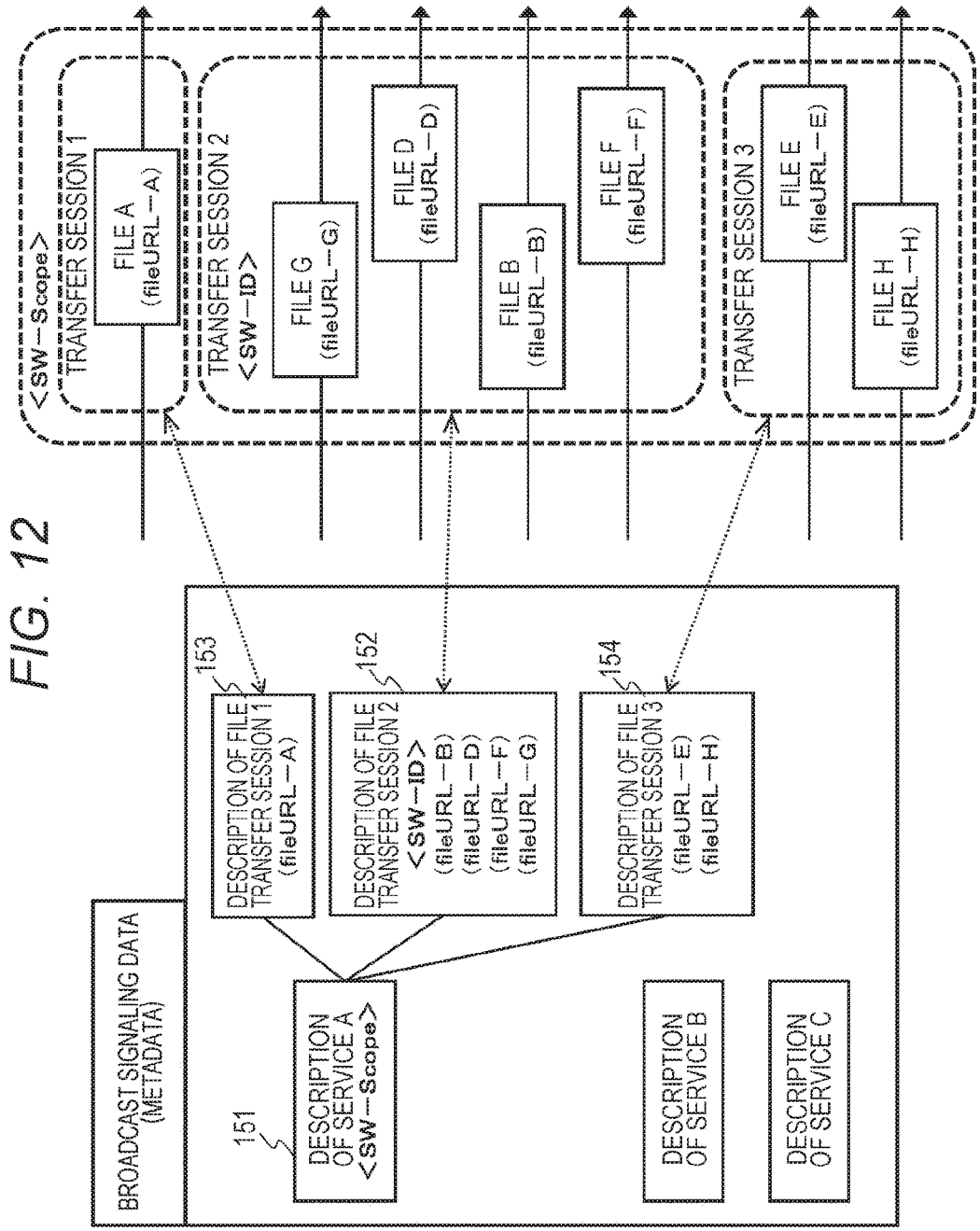
FIG. 12 is a diagram for describing an exemplary configuration of signaling data (metadata).

FIG. 12 illustrates an exemplary configuration of the signaling data (metadata) similar to that of FIG. 11. As described above, the signaling data (metadata) has a configuration in which various information (metadata) of each service unit is recorded, for example, using one channel or one program as one service unit.

As illustrated in FIG. 12, metadata of a service unit (a program unit or a channel unit) is described as follows:

metadata having description of a service A;
metadata having description of a service B; and
metadata having description of a service C.

In addition, the metadata of each service unit includes metadata of a file transfer session unit as low-level metadata.

In the example illustrated in FIG. 12, description of a token <SW-Scope> is included in metadata 151 having description of a service A.

Further, description of a token <SW-ID> and file URLs are included in metadata 152 having description of a file transfer session 2 which is metadata of a low-level session unit included in the metadata 151.

Further, description of a file URL is included in metadata 153 and 154 having description of file transfer sessions 1 and 3 which are metadata of the low-level session unit included in the metadata 151.

<SW-Scope>, <SW-ID>, and the file URL are data described as a token applied for improving efficiency of access information of an acquired file in the reception device.

The token <SW-Scope> recorded in the metadata 151 is a token used for limiting the search scope of the metadata in which the URL serving as the search target is recorded, that is, a "service worker (SW) search scope token."

Further, the token <SW-ID> recorded in the metadata 152 is a token indicating that URL information related to files serving as a management or update target of a specific SW (a cache target file) is collectively recorded, that is, a "service worker (SW) cache scope token."

Note that all the tokens are set as tokens corresponding to a specific service worker (SW) and recorded together with a service worker identifier identifying the service worker (SW).

For example, the "service worker (SW) search scope token <SW-Scope>" is a token indicating that the access information of the file transmitted as the management target or the update target of the service worker (SW) retained in the reception device is recorded in metadata in which the token is recorded or metadata therebelow.

When the reception device 30 selects the metadata in which the token is recorded and performs a search using the metadata and the metadata below the metadata as the search scope, the reception device 30 can efficiently acquire the access information of the file transmitted as the management target or the update target of the service worker (SW) retained in the reception device.

In other words, it is possible to exclude other metadata from the search target, and it is possible to increase search efficiency by limiting the search scope.

Further, the "service worker (SW) cache scope token <SW-ID>" is, for example, a token indicating a management target file group of a specific service worker (SW) indicating that the access information of the files transmitted as the management target or the update target of the service worker (SW) retained in the reception device is collectively recorded in the metadata in which the token is recorded.

When the reception device 30 selects the metadata in which the token is recorded and acquires only the access information recorded in the metadata, the reception device 30 can efficiently acquire the access information of the file transmitted as the management target or the update target of the service worker (SW) retained in the reception device.

As described above, the token or the URL is set as the auxiliary search information for efficiently searching for the access information (metadata) related to the acquisition-scheduled data of the reception device 30.

Note that, as illustrated in FIG. 12, a configuration in which the service worker (SW) search scope token is arranged in a description part of the service unit of the signaling data, and the service worker (SW) cache scope token is arranged in a description part of the file transfer session of the signaling data is one of exemplary token settings of increasing the search efficiency.

By employing this configuration, it is possible to perform the access information acquisition more efficiently when the signaling data is received in the reception device (client).

The reception device 30 selectively extracts a service description group having the service worker (SW) search scope token, then extracts the file transfer session description associated with the service description group, searches for the service worker (SW) cache scope token or the file transfer address matching the file URL (an address parameter necessary for acquiring an actual file transferred on a broadcast stream), and acquires a desired file.

The signaling data (metadata) transmitted from the transmission device 20 to the reception device 30 has a hierarchical configuration as illustrated in FIG. 12, and a more specific exemplary configuration of the signaling data (metadata) and an exemplary setting of the token will be described with reference to FIGS. 13 to 15.

An exemplary hierarchical configuration setting of the signaling data (metadata) transmitted from transmission device 20 to the reception device 30 will be described on the basis of (1) an exemplary token setting 1 illustrated in FIG. 13.

Figure 13:
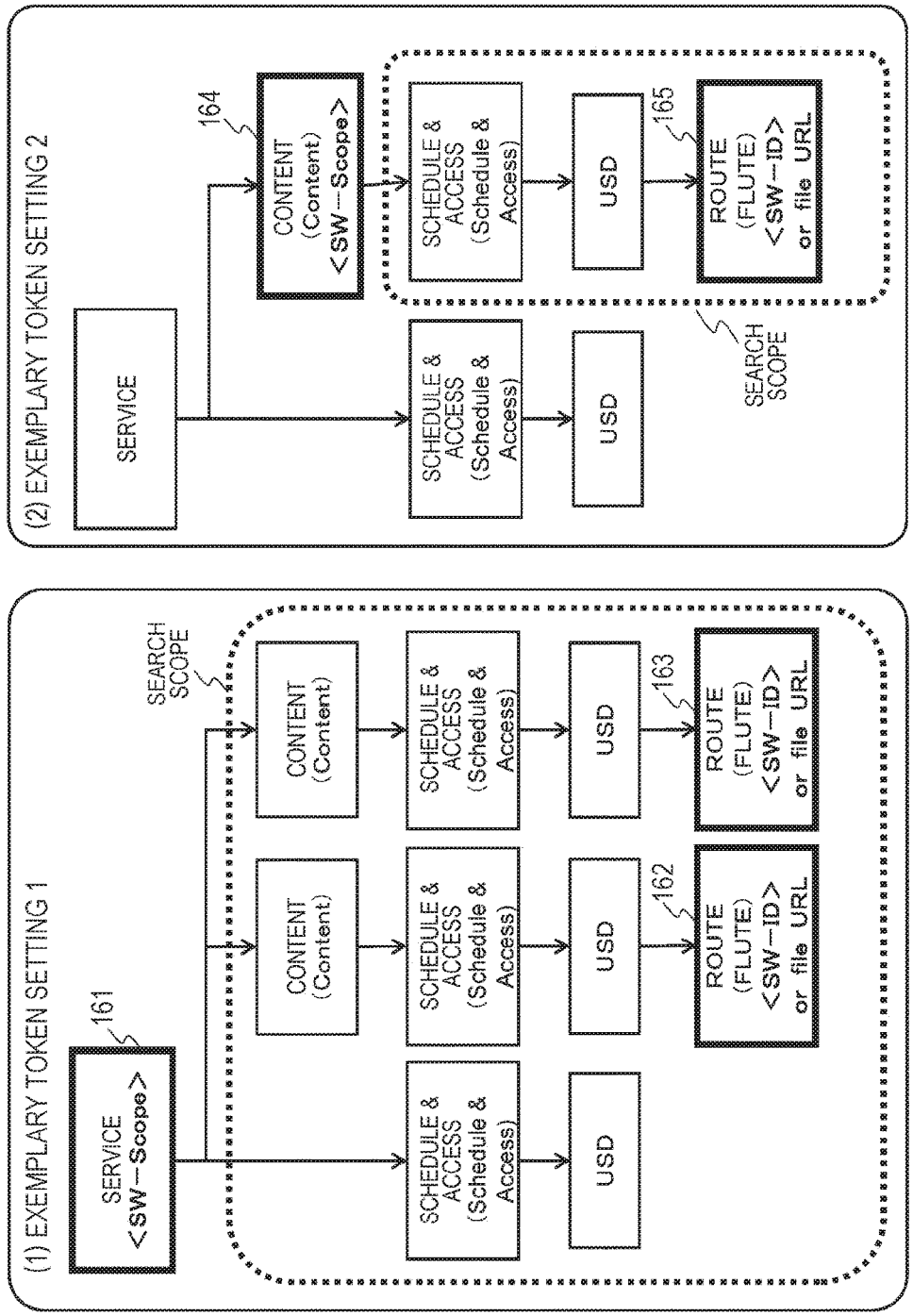
FIG. 13 is a diagram for describing an exemplary token setting in signaling data (metadata).

The signaling data (metadata) illustrated in FIG. 13(1) is metadata (service) in which the highest layer is a service unit set in units of programs or in units of channels.

Metadata (content) of the content unit is set below the metadata of the service unit.

Metadata (Schedule & Access) in which a delivery schedule and access information are described is set below the metadata (Service) of the service unit or the metadata (Content) of the content unit.

Further, user service description (USD) metadata is set below the metadata (Schedule & Access).

Note that the USD stores, for example, information related to a delivery method and includes, for example, the following signaling data:

session description (SDP);

file delivery description (FDD);

repair flow description (RFD); and schedule description (SD).

Further, the USD includes the media presentation description (MPD) as signaling data having a manifest file in which various guide information and control information corresponding to content (AV segment) are stored.

ROUTE metadata in which specific delivery data information delivered according to the ROUTE protocol, for example, a transfer parameter specific to a file which is actually delivered or the like is recorded is set below the USD metadata.

In the exemplary token setting 1 illustrated in FIG. 13(1), the "service worker (SW) search scope token <SW-Scope>" is recorded in service metadata 161.

The reception device 30 can limit the search scope of the URL or the access information of the acquisition-scheduled file according to this token. In other words, it is possible to set the search scope indicated by a dotted frame in FIG. 13(1) and search for the URL or the access information of the acquisition-scheduled file.

Further, the "service worker (SW) cache scope token <SW-ID>" is recorded in ROUTE metadata 162 and 163 of the lowest layer.

The reception device 30 can detect that the URL or the access information of the acquisition-scheduled file of the group constituting the resources managed by a specific service worker (SW) is recorded in the metadata 162 and 163 according to this token.

In an exemplary token setting 2 illustrated in FIG. 13(2), the "service worker (SW) search scope token <SW-Scope>" is recorded in content metadata 164.

The reception device 30 can limit the search scope according to this token. In other words, it is possible to set a search scope indicated by a dotted frame in FIG. 13(2) and search for the URL or the access information of the acquisition-scheduled file.

Further, the "service worker (SW) cache scope token <SW-ID>" is recorded in ROUTE metadata 165 of the lowest layer.

The reception device 30 can detect that the URL or the access information of the acquisition-scheduled file of the group constituting the resources managed by a specific service worker (SW) is recorded in the metadata 165 according to this token.

Figure 14:
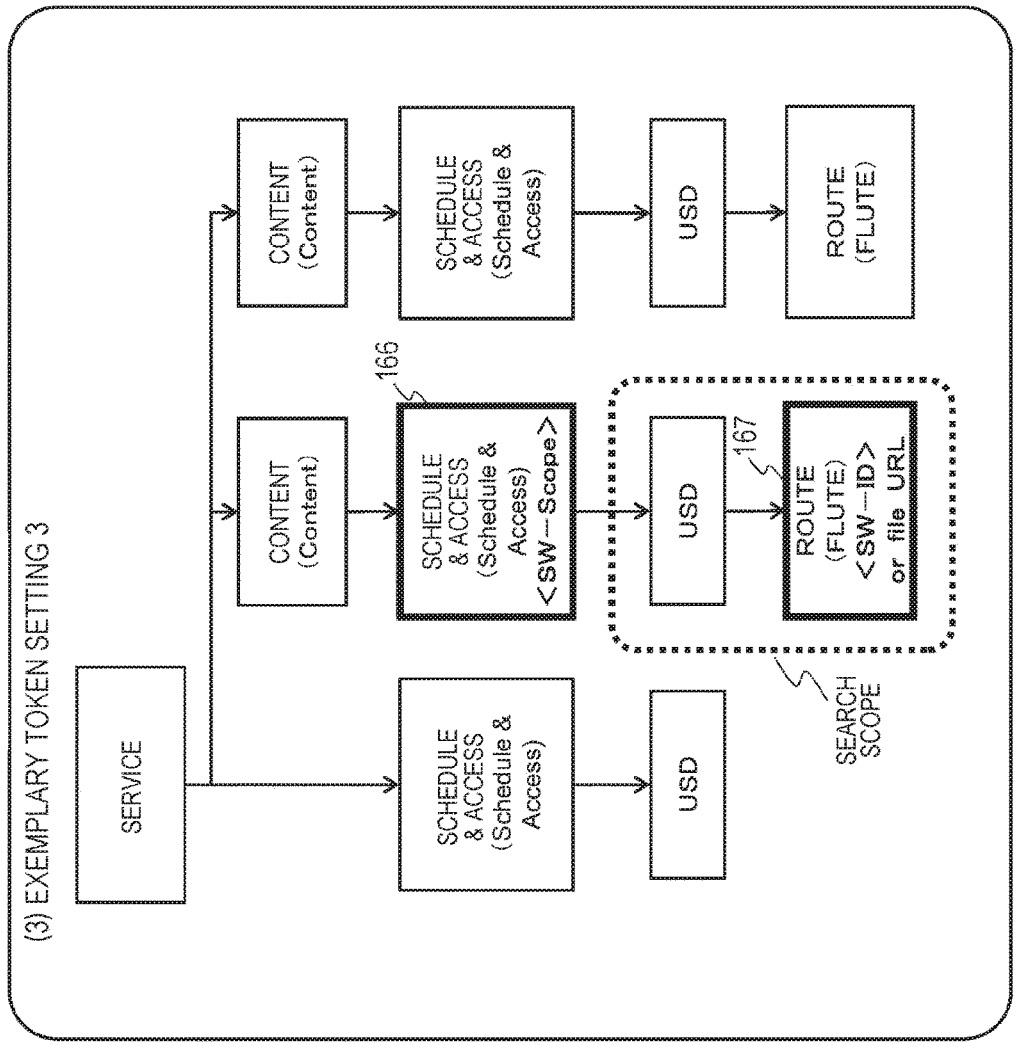
FIG. 14 is a diagram for describing an exemplary token setting in signaling data (metadata).
Figure 15:
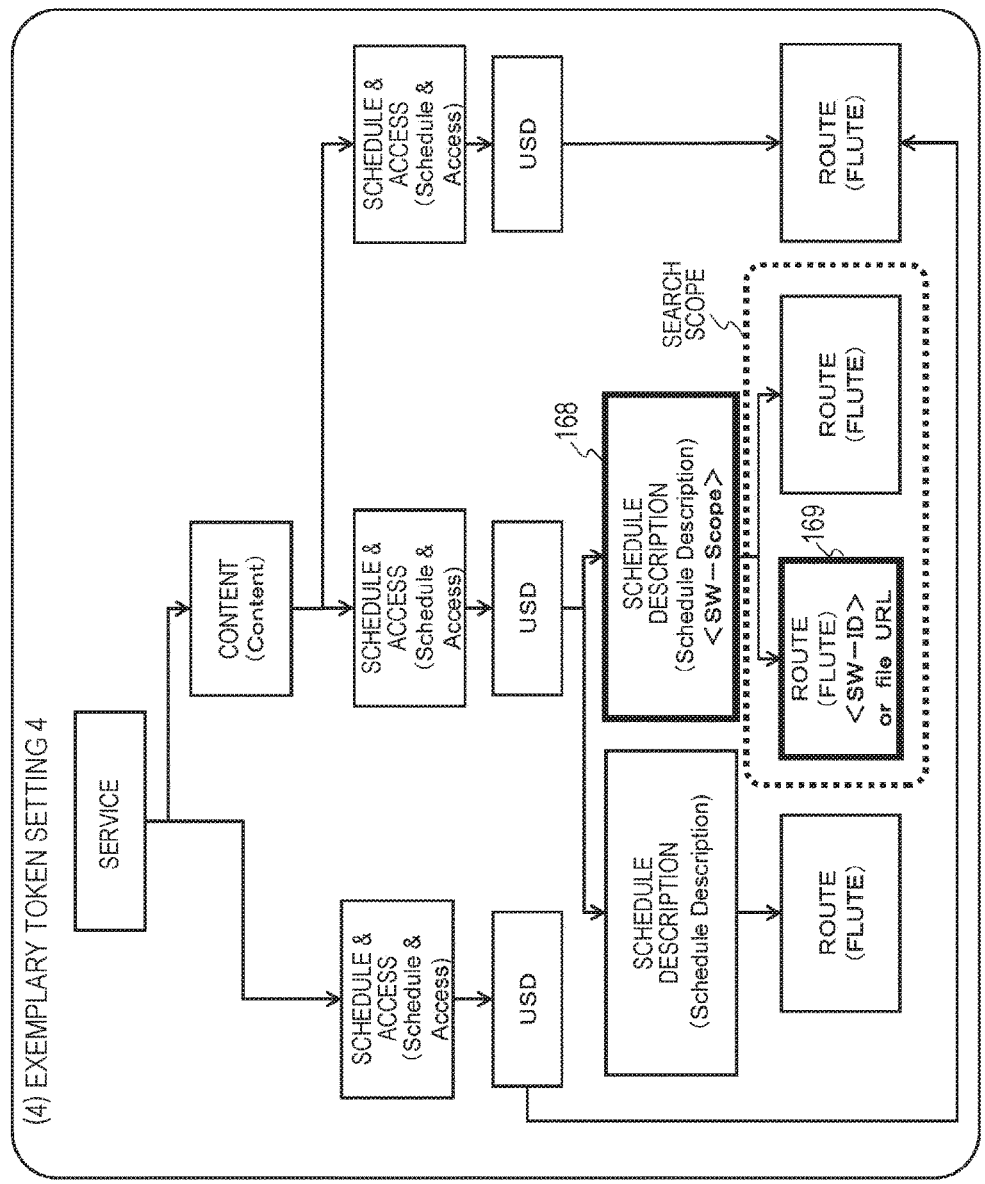
FIG. 15 is a diagram for describing an exemplary token setting in signaling data (metadata).

In an exemplary token setting 3 illustrated in FIG. 14(3),

The "service worker (SW) search scope token <SW-Scope>" is recorded in schedule & access metadata 166.

The reception device 30 can limit the search scope of the URL or the access information of the acquisition-scheduled file according to this token. In other words, it is possible to set a search scope indicated by a dotted frame in FIG. 14(3) and perform a search.

Further, the "service worker (SW) cache scope token <SW-ID>" is recorded in ROUTE metadata 167 of the lowest layer.

The reception device 30 can detect that the URL or the access information of the acquisition-scheduled file of the group constituting the resources managed by a specific service worker (SW) is recorded in the metadata 167 according to this token.

In an exemplary token setting 4 illustrated in FIG. 15(4), the "service worker (SW) search scope token <SW-Scope>" is recorded in schedule description metadata 168 set below the USD metadata.

The reception device 30 can limit the search scope according to this token. In other words, it is possible to set a search scope indicated by the dotted frame in FIG. 15(4) and search for the URL or the access information of the acquisition-scheduled file.

Further, the "service worker (SW) cache scope token <SW-ID>" is recorded in ROUTE metadata 169 of the lowest layer.

The reception device 30 can detect that the URL or the access information of the acquisition-scheduled file of the group constituting the resources managed by a specific service worker (SW) is recorded in the metadata 169 according to this token.

A plurality of exemplary setting of the token in the signaling data have been described with reference to FIGS. 13 to 15, but in addition, a token can be set in various forms.

The reception device 30 can efficiently acquire the URL or the access information of the file to be acquired on the basis of the token included in the signaling data.

For example, the reception device 30 notifies (sets) the middleware that receives broadcast data of token information for token detection for detecting a token applied to a filtering process such as limitation of the search scope or group specifying of the search target file, analyzes the signaling data transmitted from the transmission device 20 according to the set token information, detects the token, performs an efficient search process using the detected token, and acquires the URL information or the access information, delivery schedule information, and the like which are necessary for acquisition of the file to be stored in the storage unit (permanent cache).

Note that the delivery schedule information of each file is also recorded in the signaling data together with the file URL.

For example, the process of setting the token information in the middleware can be performed by outputting a request using ajax for a server side script on the proxy server.

Note that, as a parameter applied to the process of setting the token information, the URL can be used when the file URL serving as the acquisition target is obvious.

When each file URL is unknown (when there is a possibility that each file URL will be changed in the future) or when the number of file URLs is enormous, for example, a character string corresponding to an identifier of a specific application, a data file, the service worker (SW) or a group identifier associated with a file group of management target resources of the service worker (SW) can be used as the parameter.

Note that, as the parameter applicable to filtering of reception data, a token, a file URL, or a combination thereof can be applied, and examples of specific settings of the filtering parameter are as follows:

(1) file URL information;
(2) service worker (SW) search scope token (SW-Scope) identification information+file URL information;
(3) service worker (SW) cache scope token (SW-ID) identification information; and
(4) service worker (SW) search scope token (SW-Scope) identification information+service worker (SW) cache scope token (SW-ID) identification information.

The middleware of the reception device 30 detects a token or a URL included in the signaling data on the basis of the set token information. A search for the access information corresponding to the acquisition-scheduled data is performed using the detected token or URL. Further, it is specified whether or not there is a file delivery session corresponding to a selected URL, and reception scheduling for receiving a file is performed.

Thereafter, the file (for example, the application, the application part, the data file, or the like.) acquired on the basis of the access information or the file URL is developed (stored) into the management cache of proxy server.

A data acquisition process sequence using a token will be described with reference to sequence diagrams illustrated in FIGS. 16 to 17.

Figure 17:
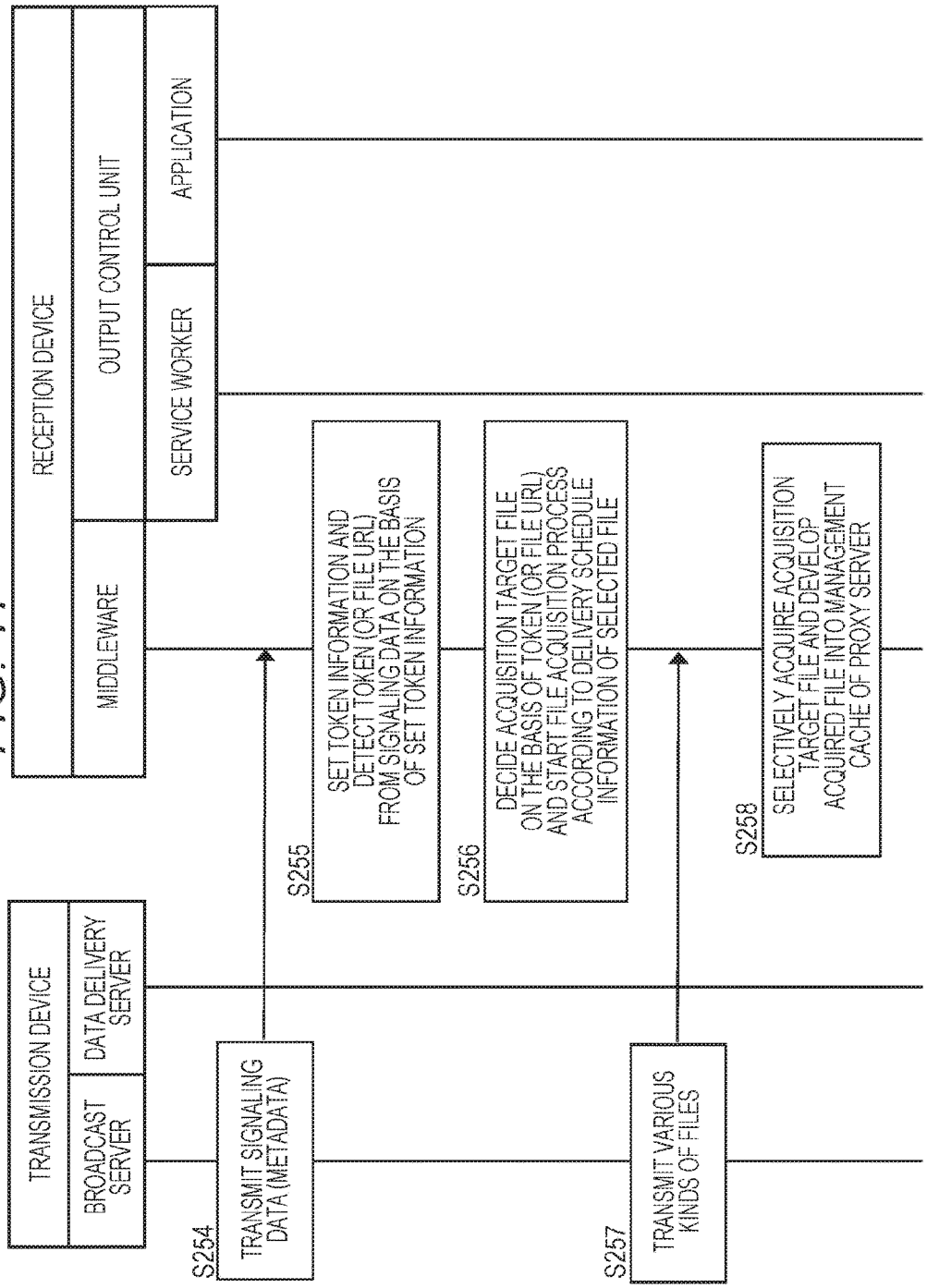
FIG. 17 is a diagram for describing a data acquisition process sequence using a token.

In FIGS. 16 to 17, the following components are illustrated from the left:

(a) the broadcast server constituting the transmission device;
(b) the data delivery server constituting the transmission device;
(c) the middleware of the reception device;
(d) the service worker executed by the output control unit of the reception device; and
(e) the application executed by the output control unit of the reception device.

A process of steps illustrated in the sequence diagrams of FIGS. 16 to 17 will be sequentially described.

(Step S251)

A process of step S251 is performed by the application executed by the output control unit of the reception device.

The application transmits a token information setting request to the middleware.

Specifically, for example, a notification of token information indicating a detection target token included in the signaling data is given to the signaling analyzing unit 113 of the middleware 110 illustrated in FIG. 7, and the detection target token is set in the signaling analyzing unit 113 in an identifiable state.

Specifically, for example, the service worker (SW) identifier or the like is reported and set as the token information.

(Steps S252 to S253)

A process in steps S252 to S253 is performed by the application and the service worker executed by the output control unit of the reception device.

The setting process of setting the token information in the middleware may be performed as the process of the application as described in step S251 but may be performed as the process of the service worker (SW).

The process of steps S252 to S253 is performed when the setting process of setting the token information in the middleware is performed as the process of the service worker (SW).

First, in step S252, the application performs the registration process of the service worker (SW) and starts the process of the service worker (SW).

Through the registration process, the service worker (SW) is stored in the storage unit (permanent cache) and enters a state in which it can be used at any time.

Then, the registered service worker (SW) transmits the token information setting request to the middleware.

The setting of the token information is a process similar to the process of step S251. In other words, for example, a notification of the token information indicating a detection target token included in the signaling data is given to the signaling analyzing unit 113 of the middleware 110 illustrated in FIG. 7, and the detection target token is set in the signaling analyzing unit 113 in an identifiable state.

(Step S254)

A process of step S254 is a transmission process of transmitting the signaling data which is continuously performed by the broadcast server.

For example, the token described above with reference to FIGS. 12 to 15 is set in the signaling data.

(Step S255)

A process of step S255 is a process of the middleware of the reception device 30. In other words, it is a process of the middleware that performs processes such as data reception and analysis of reception data. The middleware sets the token information reported from the application or the service worker (SW), and detects the token (or the file URL) from the signaling data on the basis of the set token information.

(Step S256)

In addition, in step S256, the middleware of the reception device 30 acquires the access information or the delivery schedule information of the acquisition target file on the basis of the token (or the file URL), and starts the file acquisition process using the access information or the delivery schedule information.

(Step S257)

A process of step S257 is a transmission process of transmitting various files which is continuously performed by the broadcast server.

The application, the application-related data such as the data file used when the application is executed, the service worker (SW), and the like are included in the transmission file.

(Step S258)

A process of step S255 is a process of the middleware of the reception device 30. The middleware selectively acquires a file serving as an acquisition target from the transmission file of the broadcast server and develops (stores) the acquired file into the management cache of the proxy server.

As described above, by using the token, the reception device 30 can efficiently search for the URL or the delivery information of the file serving as the acquisition target from the signaling data and reliably select and acquire a necessary file.

[6.3. Update Process of Service Worker (SW)]

Next, the update process of updating the service worker (SW) stored in the reception device 30 will be described.

The service worker (SW) acquired by the reception device 30 is stored in the storage unit (permanent cache) of the reception device together with the resources serving as the management target of the service worker (SW) (the application and the application-related data) and set to be usable at any time.

An expiration date can be set in the service worker (SW), and the reception device 30 can perform the service worker (SW) update process of replacing the service worker (SW) whose expiration date by which the reception device retains it has come with a new service worker (SW) as necessary.

For example, the service worker (SW) is acquired from the transmission device 20 such as the broadcast server 21 or the data delivery server 22 according to the acquisition request using the application set corresponding to predetermined content (program).

For example, at the time of the acquisition process (both via the broadcast or via the network), the expiration date of the service worker (SW) can be designated in "HTTP response header: Cache-control" which is communication data from the transmission device 20 to the reception device 30 when the process of providing the service worker (SW) is performed.

For example, a confirmation process or an update process for the expiration date of the service worker (SW) stored in the storage unit (permanent cache) of the reception device 30 through the service worker registration process performed by the process of the application set for predetermined content (program) is performed by the browser executed in the output control unit of the reception device.

The browser checks the expiration date of each of a plurality of service workers (SW) stored in the storage unit (permanent cache) of the reception device 30, automatically transmits the acquisition request to the local proxy server when the expiration date comes, and performs the re-registration process, that is, the update process for the service worker (SW) when content thereof is updated.

Alternatively, when a certain period of time (for example, once a day) set by the browser passes, the acquisition request for the service worker (SW) is automatically transmitted to the local proxy server, and the re-registration process is performed when content thereof is updated.

The update process sequence of updating the service worker (SW) will be described with reference to sequence diagrams illustrated in FIGS. 18 to 19.

Figure 18:
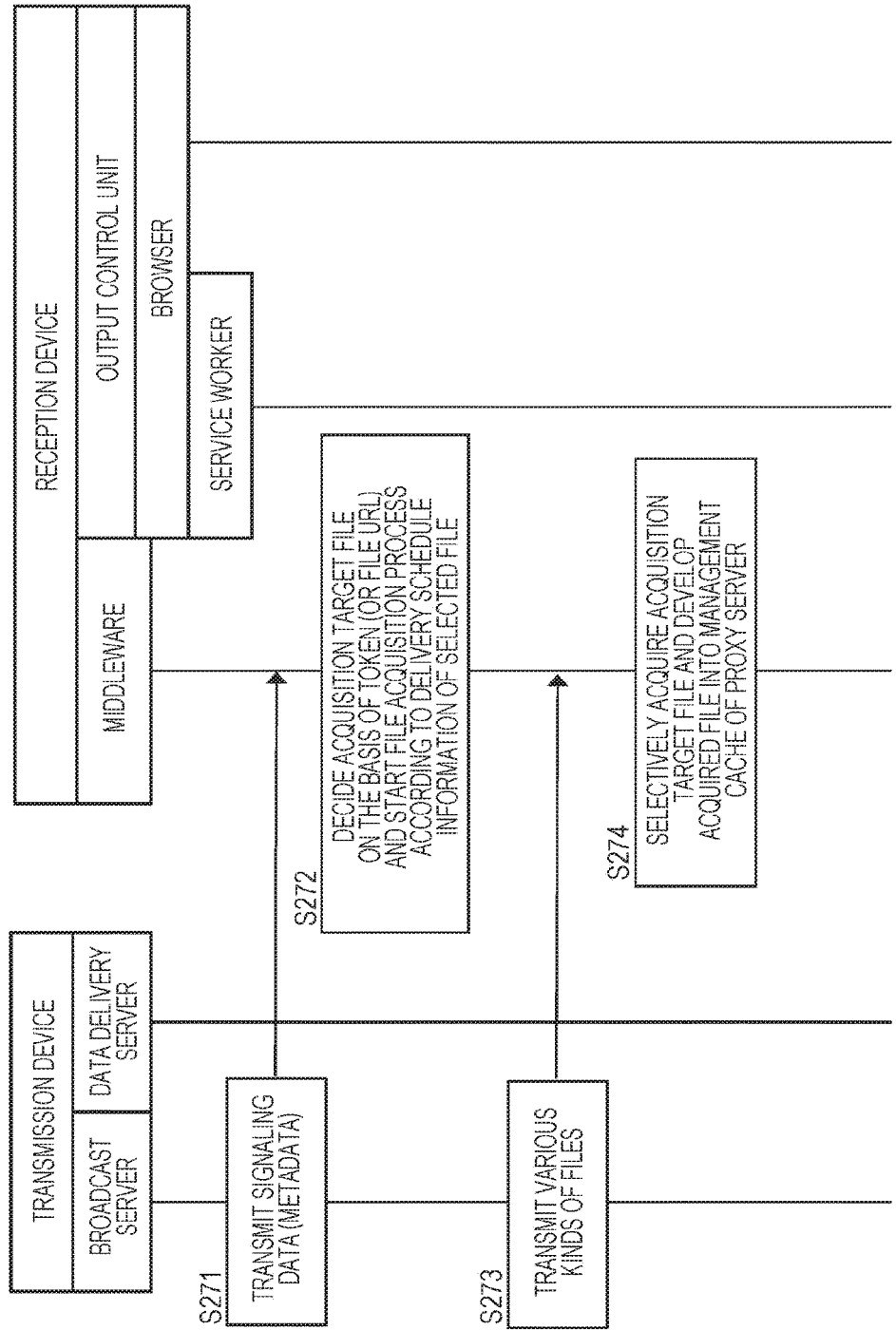
FIG. 18 is a diagram for describing an update process sequence of a service worker (SW).
Figure 19:
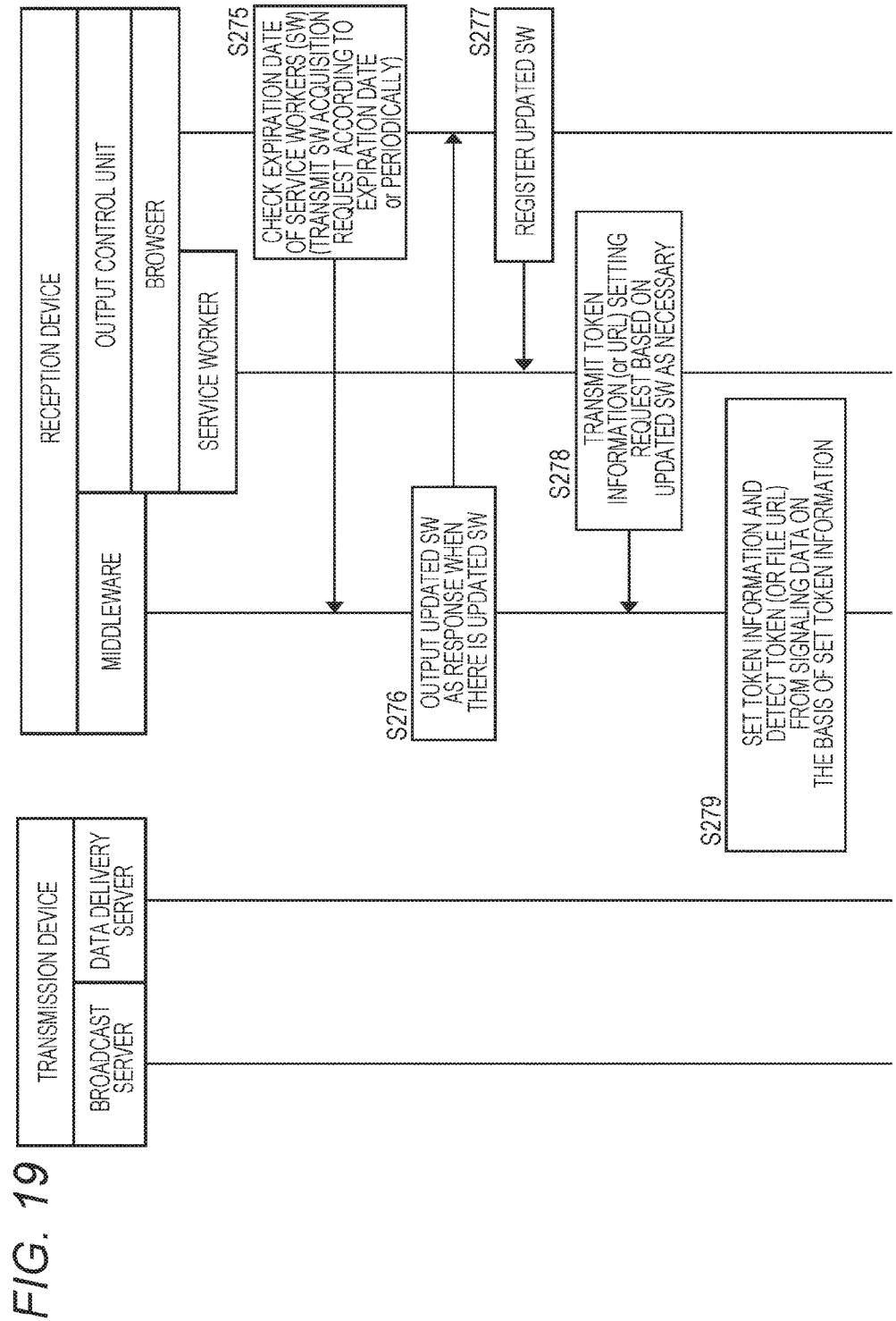
FIG. 19 is a diagram for describing an update process sequence of a service worker (SW).

In FIGS. 18 to 19, the following components are illustrated from the left:

(a) the broadcast server constituting the transmission device;

(b) the data delivery server constituting the transmission device;

(c) the middleware of the reception device;

(d) the browser executed by the output control unit of the reception device; and (e) the service worker (SW) executed on the browser executed by the output control unit of the reception device.

A process of steps illustrated in the sequence diagrams of FIGS. 18 to 19 will be sequentially described.

(Step S271)

A process of step S271 is a transmission process of transmitting the signaling data which is continuously performed by the broadcast server.

For example, the token described above with reference to FIGS. 12 to 15 is set in the signaling data.

(Step S272)

A process of step S272 is a process of the middleware of the reception device 30. In other words, it is a process of the middleware that performs processes such as data reception and analysis of reception data. The middleware sets the token information reported from the application or the service worker (SW), and detects the token (or the file URL) from the signaling data on the basis of the set token information.

(Step S273)

A process of step S273 is a transmission process of transmitting various files which is continuously performed by the broadcast server.

The application, the application-related data such as the data file used when the application is executed, the service worker (SW), and the like are included in the transmission file.

(Step S274)

A process of step S274 is a process of the middleware of the reception device 30. The middleware selectively acquires a file serving as an acquisition target from the transmission file of the broadcast server and develops (stores) the acquired file into the management cache of the proxy server.

The application, the application-related data such as the data file used when the application is executed, the service worker (SW), and the like are included in the cache data.

An update version of the service worker (SW) retained in the reception device 30 is also included in the service worker (SW).

(Step S275)

Step S275 is a process of the browser executed by the output control unit of the reception device.

The browser checks the expiration date of each of a plurality of service workers (SW) stored in the storage unit (permanent cache) of the reception device 30, and automatically transmits the acquisition request to the local proxy server when the expiration date comes.

Alternatively, when a certain period of time (for example, once a day) set by the browser passes, the acquisition request for the service worker (SW) is automatically transmitted to the local proxy server.

(Step S276)

A process of step S276 is a process of the middleware of the reception device 30. The middleware searches for the updated service worker (SW) for which the acquisition request is transmitted from the browser in the management cache of the proxy server, and outputs the updated service worker (SW) to the browser when the updated service worker (SW) is detected.

(Step S277)

Step S277 is a process of the browser executed by the output control unit of the reception device.

The browser registers the updated service worker (SW) received from the proxy server. In other words, the updated service worker (SW) is stored in the storage unit (permanent cache).

(Step S278)

Step S278 is a process of the service worker (SW) executed by the output control unit of the reception device. Here, a process of an updated service worker (SW) which is newly registered is illustrated.

The updated service worker (SW) transmits the token information setting request to the middleware as necessary.

The setting of the token information is a process similar to the process of step S251 in FIG. 16. In other words, for example, a notification of the token information indicating a detection target token included in the signaling data is given to the signaling analyzing unit 113 of the middleware 110 illustrated in FIG. 7, and the detection target token is set in the signaling analyzing unit 113 in an identifiable state.

(Step S279)

A process of step S279 is a process of the middleware of the reception device 30. In other words, it is a process of the middleware that performs processes such as data reception and analysis of reception data. The middleware sets the token information reported from the updated service worker (SW), and detects the token (or the file URL) from the signaling data on the basis of the set token information.

[6.4. Control Process of Storage Unit (Permanent Cache) of Reception Device by Service Worker (SW)]

Next, a control process of the storage unit (permanent cache) of the reception device by the service worker (SW) stored in the reception device 30 will be described.

The service worker (SW) stored in the reception device 30 controls the storage unit (permanent cache), that is, the cache in which the resources are stored using the resources of the management target, that is, the application or the application-related data as one of management processes.

First, the service worker (SW) stores a file necessary for the application that has initially activated the service worker (SW) according to detection of a predetermined event in the storage unit (permanent cache) of the reception device 30.

A timing at which an event serving as a trigger of resource storage by the service worker (SW) is received is a timing at which the registration process or the re-registration (update) process for the service worker (SW) is performed. At this point, the service worker (SW) receives a registration (installation) event.

In addition, an event serving as a trigger of the resource storage process is received at a timing at which the application requests an HTML page or JavaScript (registered trademark) (when a fetch event is received) or when it is reactivated by a timer generated by the service worker (SW).

The application (part group) developed into the storage unit (permanent cache) by the service worker (SW) can be activated as an application (offline application) which is not only activated in association with (at the same time as) the broadcast stream but also installed in a client independently of the broadcast stream.

A control process sequence of the storage unit (permanent cache) of the reception device by the service worker (SW) will be described with reference to sequence diagrams illustrated in FIGS. 20 to 21.

Figure 20:
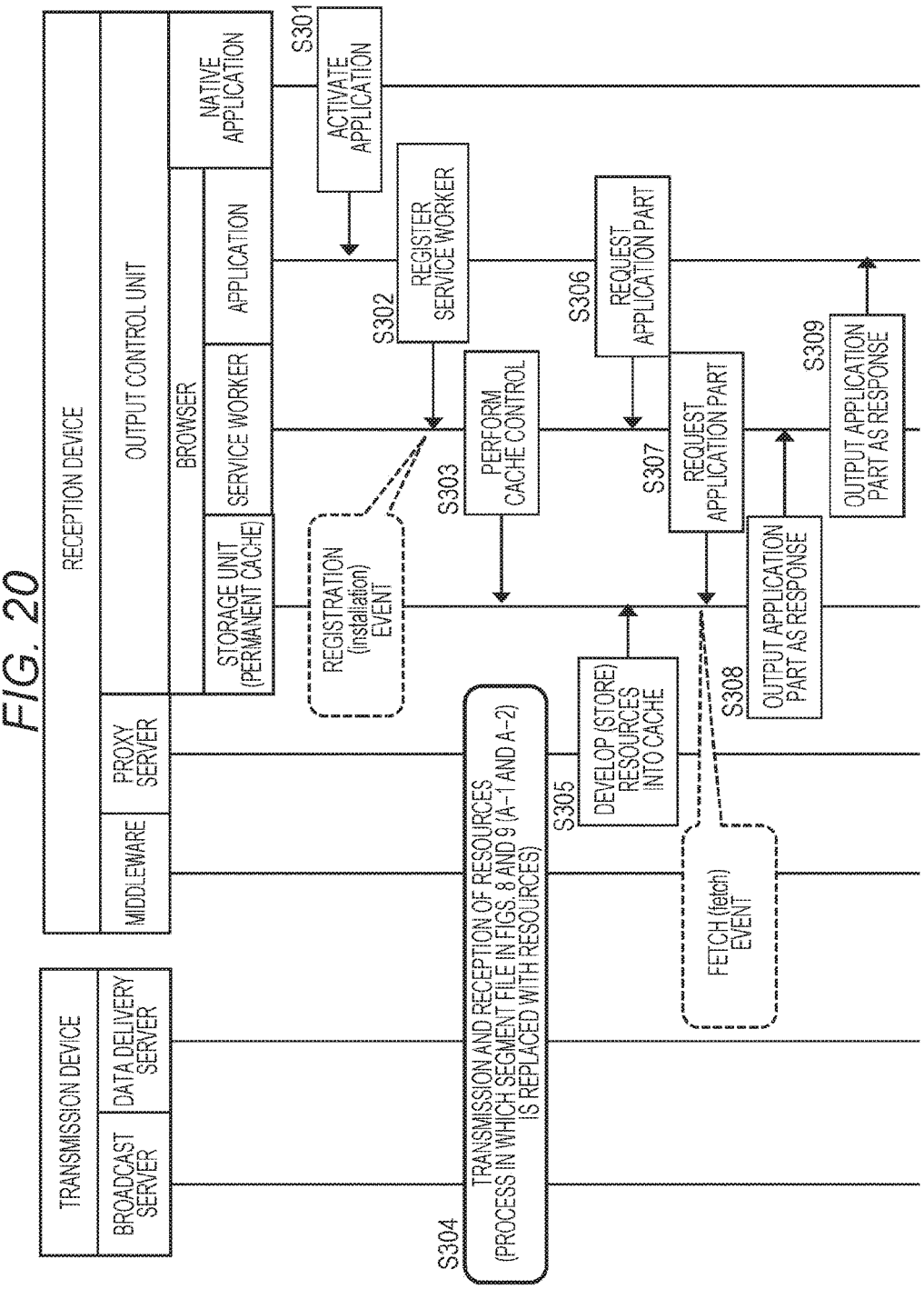
FIG. 20 is a diagram for describing a control process sequence of a storage unit (permanent cache) of a reception device by a service worker (SW).
Figure 21:
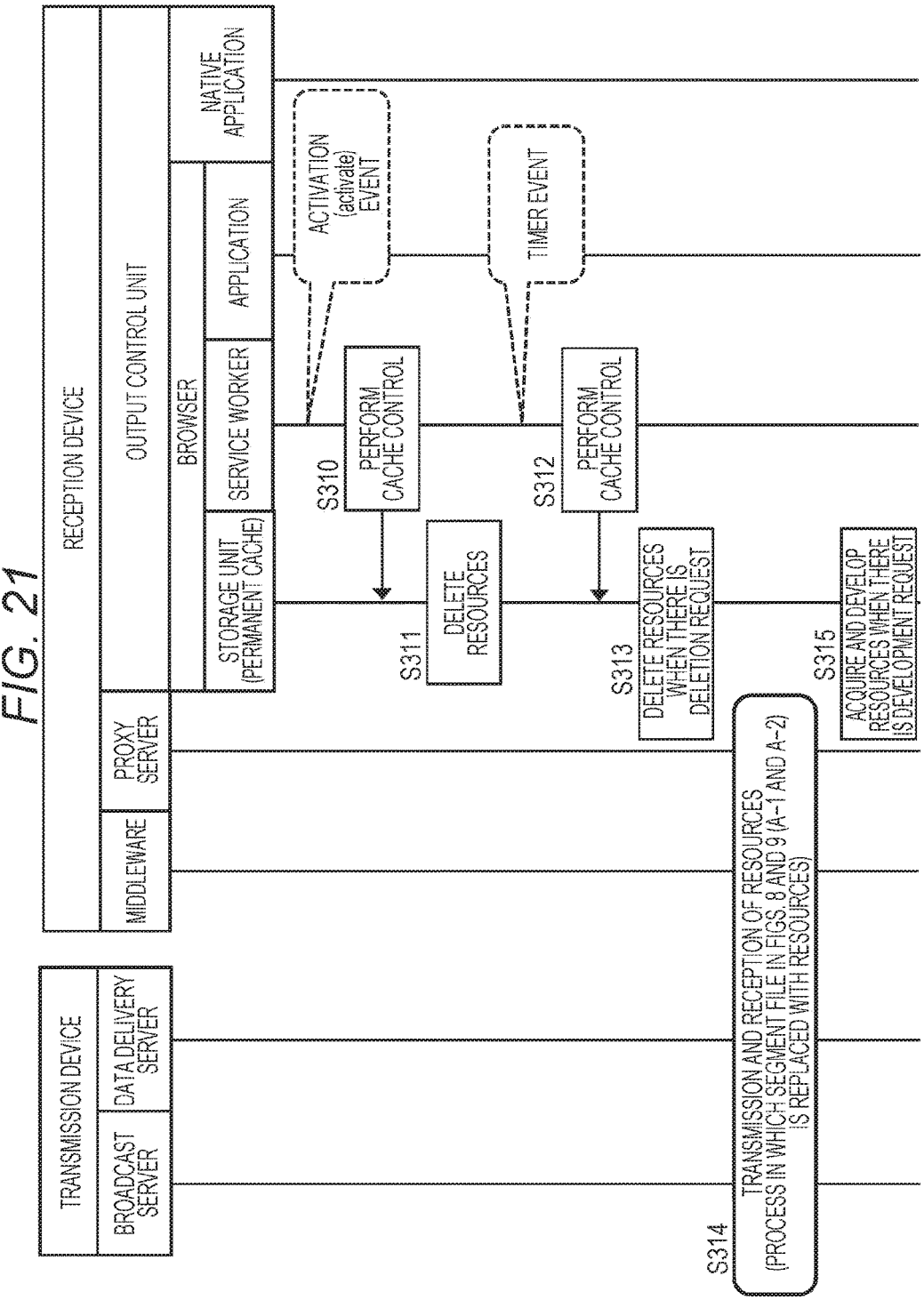
FIG. 21 is a diagram for describing a control process sequence of a storage unit (permanent cache) of a reception device by a service worker (SW).

In FIGS. 20 to 21, the following components are illustrated from the left:

(a) the broadcast server constituting the transmission device;

(b) the data delivery server constituting the transmission device;

(c) the middleware of the reception device;

(d) the proxy server of the reception device;

(e) the storage unit (permanent cache) managed by the browser executed by the output control unit of the reception device;

(f) the service worker (SW) executed on the browser executed by the output control unit of the reception device;

(g) the application executed on the browser executed by the output control unit of the reception device; and (h) the native application executed by the output control unit of the reception device.

Note that the native application is an application executed by the reception device 30, but the native application is not an application managed by the service worker (SW) but, for example, an application used for an activating process of an application corresponding to content (program).

A process of steps illustrated in the sequence diagrams of FIGS. 20 to 21 will be sequentially described.

(Step S301)

A process of step S301 is a process of activating an application corresponding to content (program) through the native application.

As described above, the native application is an application used for the activation process of an application corresponding to content (program).

In the case of a setting in which the application corresponding to content (program) is activated on the basis of, for example, trigger information embedded in a program, the activation process by the native application is unnecessary. (Step S302)

In step S302, the activated application performs the registration process for the service worker (SW).

Through the registration process, the service worker (SW) is stored in the storage unit (permanent cache) and enters a state in which it can be used at any time.

The service worker (SW) detects the service worker (SW) registration process on the basis of detection of the registration (installation) event, and the service worker (SW) starts the cache control of step S303 using the detection of the registration (installation) event as a trigger.

(Steps S303 to S305)

When the registration (installation) event is detected, in step S303, the service worker (SW) starts control of the storage unit (permanent cache), for example, according to the script description.

Specifically, the acquisition process and the cache development (storage) process for the resources (the application and the application-related data) serving as the management target of the service worker (SW) start.

Note that, in step S304, the resources (the application and the application-related data) serving as the management target of the service worker (SW) are continuously transmitted from the transmission device such as the broadcast server, the data delivery server, or the like.

In step S304, a process of replacing the process for the segment file in steps of FIGS. 8 to 9 (A-1 to A-2) in the resource transmission/reception process described above with reference to FIGS. 8 to 9 with a process for the resources is performed.

In step S305, transmission data is developed (stored) into the storage unit (permanent cache) through the management cache of the proxy server.

(Steps S306 to S309)

In step S306, the application requests the service worker (SW) to transmit the application part, for example, a moving image file or a still image file necessary for execution of the application, or the application-related data such as a JavaScript (registered trademark) program or audio data.

This request process corresponds to fetch event detection in the service worker (SW).

In steps S307 to S309, the service worker (SW) acquires the requested part from the storage unit (permanent cache) and provides the requested part to the application.

(Steps S310 to S311)

A process of steps S310 to S311 is a process when an activation event is detected by the service worker (SW).

The activation event is detected, for example, when a resource deletion request is input by the user or when an expiration date of the application expires.

When the service worker (SW) detects the activation event, for example, the control of the storage unit (permanent cache) according to the script description starts.

Specifically, for example, the deletion process for the resources (the application and the application-related data) serving as the management target of the service worker (SW) is performed.

(Steps S312 to S315)

A process of steps S312 to S315 is a process when a timer event is detected by the service worker (SW).

The timer event is detected, for example, when the expiration date of the application expires, when an update deadline arrives, or the like.

Examples of the process according to the timer event include deletion of cache resources and an acquisition process of update resources or addition resources.

Step S313 is a sequence of the deletion process of the cache resources corresponding to the timer event.

Steps S314 to S315 illustrate a sequence of the acquisition process of the update resources or the addition resources corresponding to the timer event.

Note that, in step S314, a process of replacing the process for the segment file in steps of FIGS. 8 to 9 (A-1 to A-2) in the resource transmission/reception process described above with reference to FIGS. 8 to 9 with a process for the resources is performed.

[7. Delivery of Service Worker (Sw) and Cache Control Process (Push Type Process Example)]

As described above, for the service worker (SW) or the resource including the application serving as the management target of the service worker (SW) or data applied to the application, for example, there are two forms, that is, a configuration in which the polling type acquisition process is performed on the basis of the acquisition request from the browser installed in the reception device 30 and a push type in which it is acquired regardless of the acquisition request from the browser and provided to the browser.

The process described above with reference to FIGS. 8 to 21 is the exemplary polling type process of performing the acquisition of the service worker (SW) and the management resources thereof (the application and the application-related data) using the acquisition request from the browser installed in the reception device 30 as a trigger.

An exemplary push type process of acquiring the service worker (SW) and the management resources thereof (the application and the application-related data) and providing the service worker (SW) and the management resources thereof to the browser regardless of the acquisition request from the browser will be described.

[7.1. Acquisition and Registration Processes of Service Worker (SW) from Broadcast Stream-associated Application]

Even in the push type process, the acquisition and registration sequences of the service worker (SW) using the application corresponding to content (program) provided from the broadcast server 21 is a process similar to the exemplary polling type process described above with reference to FIGS. 8 to 10.

[7.2. Configuration in which Efficiency of Data Acquisition Process of Reception Device is Improved by Applying Token]

In the polling type token utilization process described above with reference to FIGS. 16 to 17, the content-associated application or the service worker (SW) has been described as performing the process of setting the token information (or the file URL) for filtering and acquiring the file including the resources to be acquired or the service worker (SW) in the middleware.

This scenario requires the middleware to develop (store) the file specified by the token information (or the file URL) in the cache of the local HTTP proxy server.

However, the application or the service worker (SW) that transmits the token information setting request is unable to passively detect whether or not the file selected according to the token has been developed (stored) into the cache of the proxy server.

In other words, the sequence described above with reference to FIGS. 16 to 17 is a model in which the application part or the service worker (SW) is pulled in from the proxy server in a polling form the browser (application).

In the description of the polling type process described above, the method in which the cache expiration date of the service worker (SW), the timer, a predetermined polling cycle, or the like is used as a trigger for performing polling has been described.

This process has a problem in that when the cache expiration date/timer/polling cycle or the like are long, it is unable to perform pull-in timing control such that when an update is performed in the cache of the proxy server, it is pulled to the browser side immediately without depending on granularity of set time intervals.

Further, when the time interval is decreased to increase the timing accuracy, an inquiry request is frequently made, and a useless load is increased.

In order to solve this problem, in the push type process to be described below, a process using a push type event notification mechanism using a push API of notifying the browser side of the cache development when the token information (or file URL) setting request is transmitted from the browser side, and data is developed (stored) into the management cache of the middleware at the same time is performed.

A push type token application data selection acquisition process sequence will be described with reference to sequence diagrams of FIGS. 22 to 23.

Figure 22:
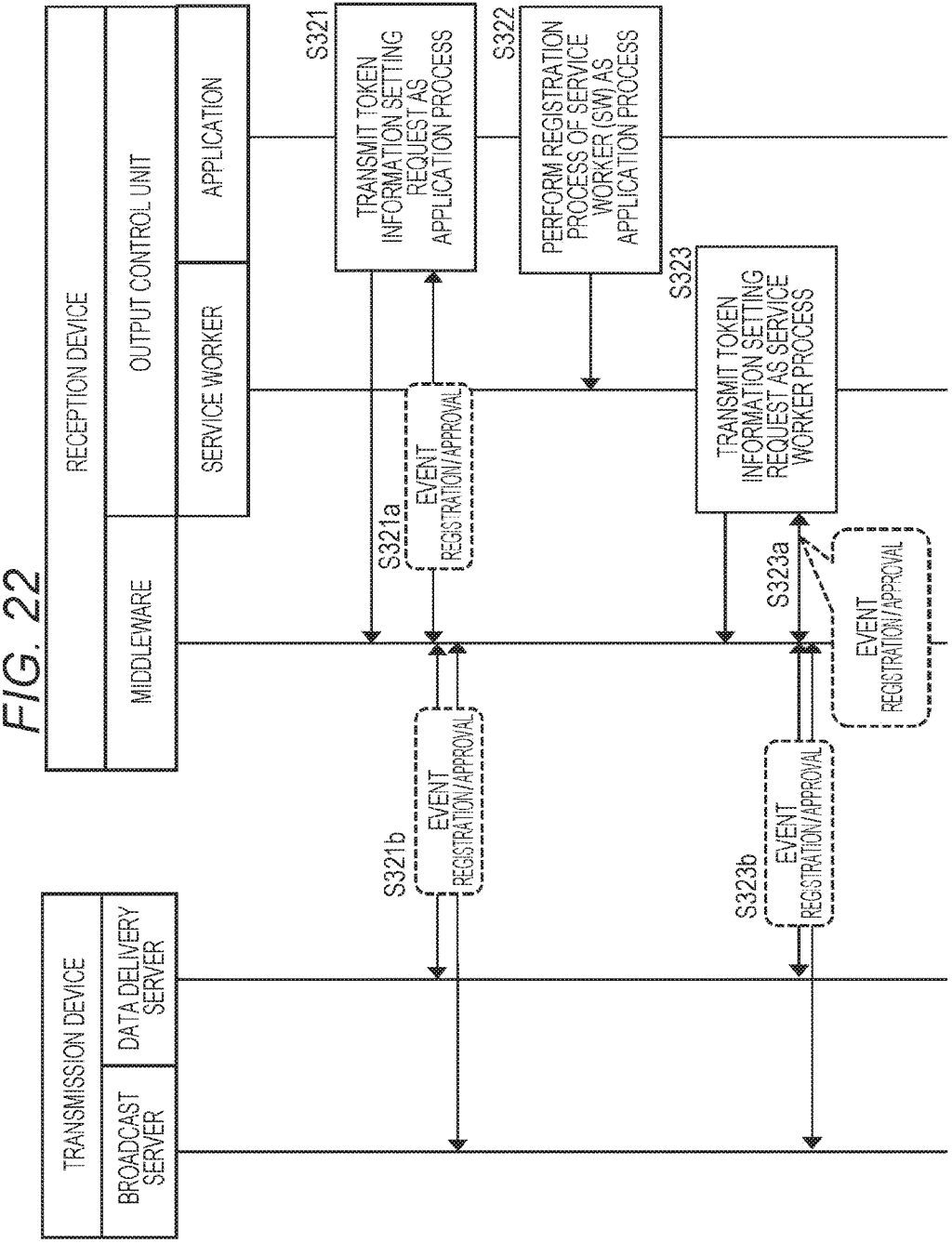
FIG. 22 is a diagram for describing a push type token application data selection acquisition process sequence.
Figure 23:
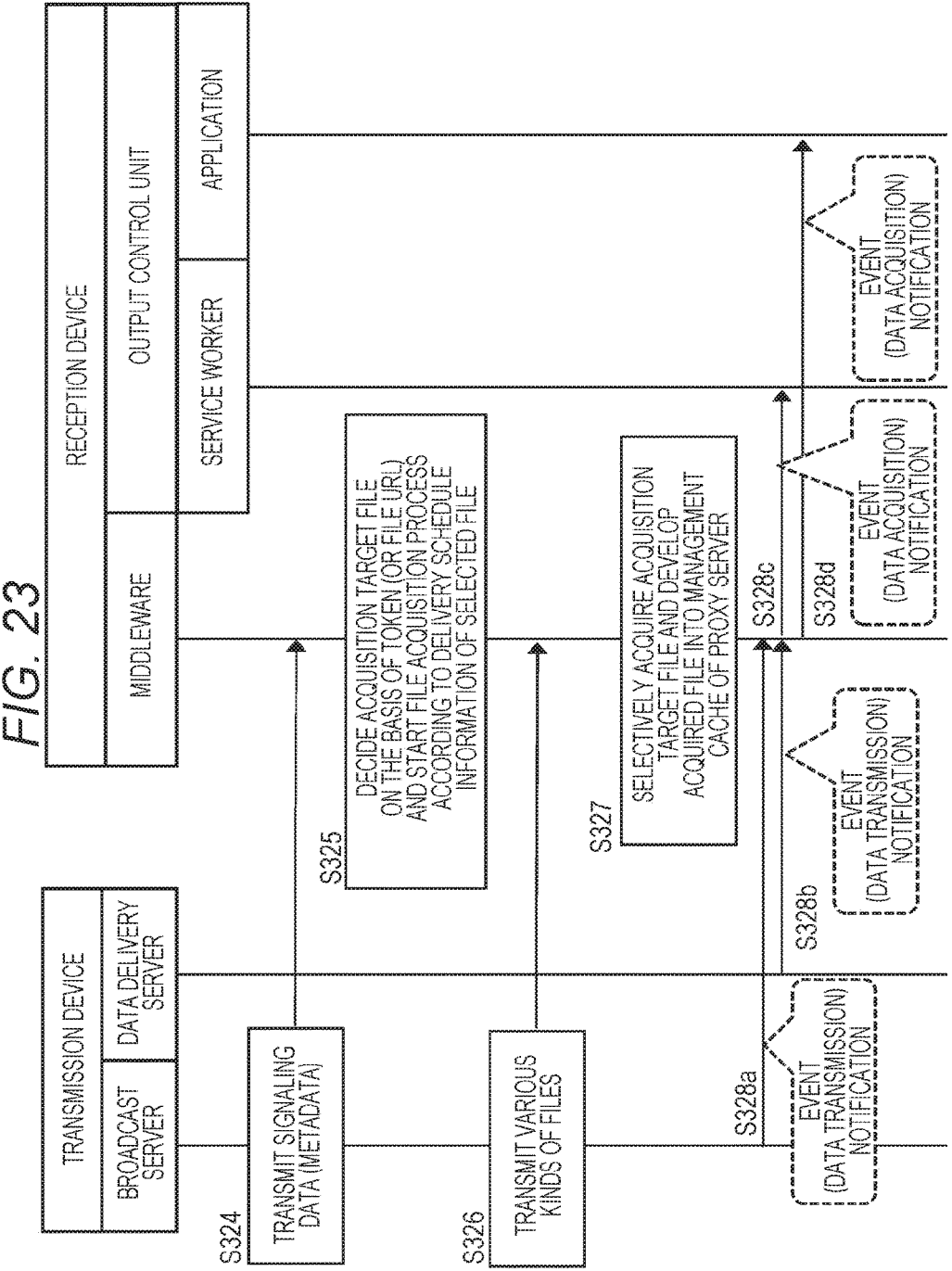
FIG. 23 is a diagram for describing a push type token application data selection acquisition process sequence.

In FIGS. 22 to 23, the following components are illustrated from the left:

(a) the broadcast server constituting the transmission device;

(b) the data delivery server constituting the transmission device;

(c) the middleware of the reception device;

(d) the service worker executed by the output control unit of the reception device; and (e) the application executed by the output control unit of reception device.

A process of steps illustrated in the sequence diagrams of FIGS. 22 to 23 will be sequentially described.

(Step S321)

A process of step S321 is performed by the application executed by the output control unit of the reception device.

The application transmits the token information setting request to the middleware.

Specifically, for example, a notification of token information indicating a detection target token included in the signaling data is given to the signaling analyzing unit 113 of the middleware 110 illustrated in FIG. 7, and the detection target token is set in the signaling analyzing unit 113 in an identifiable state.

Specifically, for example, the service worker (SW) identifier or the like is reported and set as the token information.

In parallel with the process of step S321, an event registration/approval process of step S321a is performed between the application and the middleware, and an event registration/approval process of step S321b is performed between the middleware and the transmission device (the broadcast server or the data delivery server).

This is a process of confirming that when the data transmitted from the transmission device (the broadcast server or the data delivery server) to the reception device (the application, the application-related data, the service worker (SW), or the like.) is developed (stored) into the proxy server management cache of the middleware, each device or component approves execution of a process of which the application is notified, and the process is performed.

(Steps S322 to S323)

A process of steps S322 to S323 is performed by the application and the service worker executed by the output control unit of the reception device.

The setting process of setting the token information in the middleware may be performed as a process of the application as described in step S321 but may be performed as a process of the service worker (SW).

The process of steps S322 to S323 is performed when the setting process of setting the token information in the middleware is performed as the process of the service worker (SW).

First, in step S322, the application performs the registration process of registering the service worker (SW) and starts the process of the service worker (SW).

Through the registration process, the service worker (SW) is stored in the storage unit (permanent cache) and enters a state in which it can be used at any time.

Then, the registered service worker (SW) transmits the token information setting request to the middleware.

The setting of the token information is a process similar to the process of step S321. In other words, for example, a notification of the token information indicating a detection target token included in the signaling data is given to the signaling analyzing unit 113 of the middleware 110 illustrated in FIG. 7, and the detection target token is set in the signaling analyzing unit 113 in an identifiable state.

When the process of steps S322 to S323 is performed, in parallel with the process, an event registration/approval process of step S323a is performed between the application and the middleware, and an event registration/approval process of step S323b is performed between the middleware and the transmission device (the broadcast server or the data delivery server).

This is a process of confirming that when the data transmitted from the transmission device (the broadcast server or the data delivery server) to the reception device (the application, the application-related data, the service worker (SW), or the like.) is developed (stored) into the proxy server management cache of the middleware, each device or component approves execution of a process of which the application is notified, and the process is performed.

(Step S324)

A process of step S324 is a transmission process of transmitting the signaling data which is continuously performed by the broadcast server.

For example, the token described above with reference to FIGS. 12 to 15 is set in the signaling data.

(Step S325)

A process of step S325 is a process of the middleware of the reception device 30. In other words, it is a process of the middleware that performs processes such as data reception and analysis of reception data. The middleware sets the token information reported from the application or the service worker (SW), and detects the token (or the file URL) from the signaling data on the basis of the set token information.

Further, the middleware of the reception device 30 determines the acquisition target file on the basis of the token (or the file URL) and starts the file acquisition process according to the delivery schedule information of the selected file.

(Step S326)

A process of step S326 is a transmission process of transmitting various files which is continuously performed by the broadcast server.

The application, the application-related data such as the data file used when the application is executed, the service worker (SW), and the like are included in the transmission file.

(Steps S327 to S328)

A process of step S327 is a process of the middleware of the reception device 30. The middleware selectively acquires a file serving as an acquisition target from the transmission file of the broadcast server and develops (stores) the acquired file into the management cache of the proxy server.

When the process of step S327 is performed, event notification processes of steps S328a to S328d are performed between the devices and between the components.

This is a process of giving a notification indicating that the data transmitted from the transmission device (the broadcast server or the data delivery server) to the reception device (the application, the application-related data, the service worker (SW), or the like.) is developed (stored) into the proxy server management cache of the middleware to the application or the service worker (SW).

Note that the four event notification lines of step S328a to 328d are illustrated in FIG. 23, but it is desirable that the event notifications of steps S328a and S328b be given by any device that desires to perform data transmission.

Further, the notification process from the middleware insteps S328c and S328d may be performed only for the publisher of the token information setting request, that is, either of the application or the service worker (SW).

In the process sequence described above, the events of the token (or file URL) setting and the push event request by the push API are registered in a push event server (publisher) implemented on the ATSC 3.0 client broadcast middleware. The push event server registers the event of the push event request in the transmission device via the network as necessary.

The middleware notifies the push event client (application or the service worker (SW)) of the push event when data filtered by the set token (or the file URL) is developed on the proxy server.

Since the browser side can transmit the acquisition request (pulling into the browser cache) upon receiving an event, when the file is accumulated on the client side via broadcasting, the file can be used on the browser side immediately. Further, the reason to make it possible to transmit and receive the push event via the network is to enable the client side to detect the fact of the file transfer even when the client broadcast middleware is not tuned to the file transfer stream.

[7.3. Update Process of Service Worker (SW)]

Next, the update process of updating the service worker (SW) when the push type process is performed will be described.

As described above, the expiration date can be set in the service worker (SW), and the reception device 30 can perform the service device (SW) update process of replacing the service worker (SW) whose expiration date by which the reception device retains it has come with a new service worker (SW) as necessary.

The polling type service worker (SW) update process sequence is the sequence described above with reference to FIGS. 18 to 19.

In the push type process, the process using the push type event notification mechanism using the push API of notifying the browser side of the cache development when the updated service worker (SW) is developed (stored) into the management cache of middleware is performed.

The service worker update process sequence in the push type process will be described with reference to FIG. 24.

Figure 24:
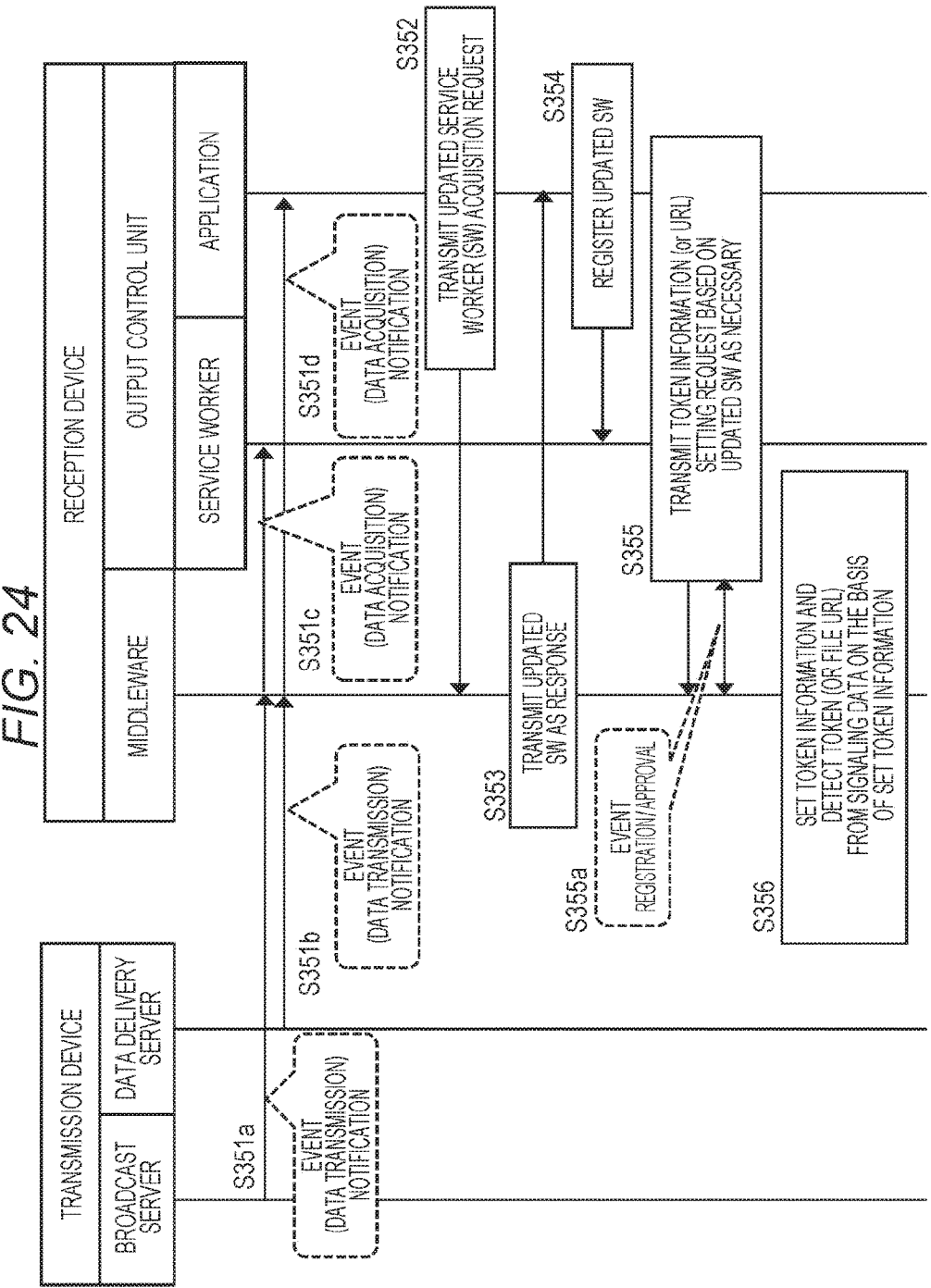
FIG. 24 is a diagram for describing a service worker update process sequence in a push type process.

In FIG. 24, the following components are illustrated from the left;

(a) the broadcast server constituting the transmission device;

(b) the data delivery server constituting the transmission device;

(c) the middleware of the reception device;

(d) the browser executed by the output control unit of the reception device; and (e) the service worker (SW) executed on the browser executed by the output control unit of the reception device.

A processing of steps illustrated in the sequence diagram of FIG. 24 will be sequentially described.

Note that the event registration/approval process is assumed to be performed between the devices and between the components before the start of the sequence in FIG. 24, similarly to the process described above with reference to FIG. 22.

In other words, for example, the event registration/approval process of step S321a in FIG. 22 is performed between the application and the middleware, and the event registration/approval process of step S321b in FIG. 22 is performed between the middleware and the transmission device (the broadcast server or the data delivery server).

This is a process of confirming that when the data transmitted from the transmission device (the broadcast server or the data delivery server) to the reception device (the application, the application-related data, the service worker (SW), or the like.) is developed (stored) into the proxy server management cache of the middleware, each device or component approves execution of a process of which the application is notified, and the process is performed.

The sequence illustrated in FIG. 24 corresponds to a process after the event registration/approval processes have been performed.

A process of steps illustrated in the sequence diagram of FIG. 24 will be sequentially described.

(Step S351)

Steps S351a to S351d are a process of giving a notification indicating that the data (the updated service worker (SW) in this example) transmitted from the transmission device (the broadcast server or the data delivery server) to the reception device is developed (stored) into the proxy server management cache of the middleware to the application or the service worker (SW).

Note that the four event notification lines of step S351a to S351d are illustrated in FIG. 23, but it is desirable that the event notifications of steps S351a and S351b be given by any device that desires to perform data transmission.

Further, the notification process from the middleware insteps S351c and S351d may be performed only for either of the application or the service worker (SW).

(Step S352)

Step S352 is a process of the browser executed by the output control unit of the reception device.

The browser transmits the acquisition request to the local proxy server of the updated service worker (SW) on the basis of the event notification.

(Step S353)

A process of step S353 is a process of the middleware of the reception device 30. The middleware searches for the updated service worker (SW) for which the acquisition request is transmitted from the browser in the management cache of the proxy server, and outputs the updated service worker (SW) to the browser when the updated service worker (SW) is detected.

(Step S354)

Step S354 is a process of the browser executed by the output control unit of the reception device.

The browser registers the updated service worker (SW) received from the proxy server. In other words, the updated service worker (SW) is stored in the storage unit (permanent cache).

(Step S355)

Step S355 is a process of the service worker (SW) executed by the output control unit of the reception device. Here, a process of an updated service worker (SW) which is newly registered is illustrated.

The updated service worker (SW) transmits the token information setting request to the middleware as necessary.

The setting of the token information is a process similar to the process of step S251 in FIG. 16. In other words, for example, a notification of the token information indicating a detection target token included in the signaling data is given to the signaling analyzing unit 113 of the middleware 110 illustrated in FIG. 7, and the detection target token is set in the signaling analyzing unit 113 in an identifiable state.

Note that, in parallel with the process of step S355, an event registration/approval process illustrated in step S355a is performed. This is a process of giving a notification indicating development of data to the service worker (SW) or the application when data corresponding to the token information is developed (stored) into the proxy server of middleware.

(Step S356)

A process of step S356 is a process of the middleware of the reception device 30. In other words, it is a process of the middleware that performs processes such as data reception and analysis of reception data. The middleware sets the token information reported from the updated service worker (SW) and detects the token (or the file URL) from the signaling data on the basis of the set token information.

[7.4. Control Process of Storage Unit (Permanent Cache) of Reception Device by Service Worker (SW)]

In the push type process, the control process sequence of the storage unit (permanent cache) of the reception device by the service worker (SW) stored in the reception device 30 is also a process similar to the polling type process example described above with reference to FIGS. 20 to 21.

[8. Configuration of Signaling Data (Metadata) Which Describes Token]

The token (or the URL) for efficiently performing selection of acquired data in the reception device 30 is described in the signaling data (metadata) transmitted from the transmission device 20 such as the broadcast server 21 as described above with reference to FIGS. 12 to 15.

A specific exemplary configuration in which the token (or the URL) is recorded in the signaling data (metadata) will be described below.

Figure 25:
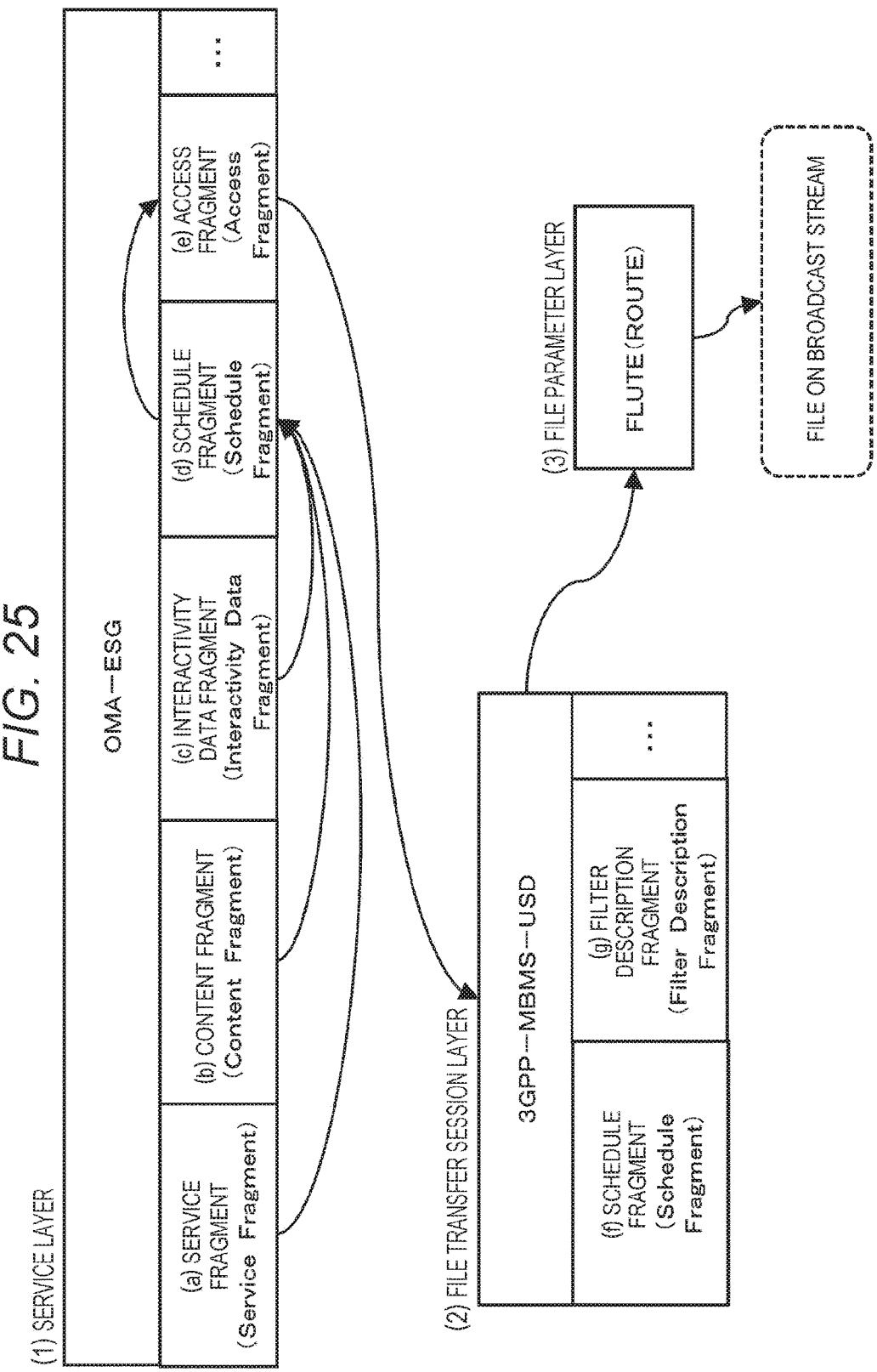
FIG. 25 is a diagram illustrating an exemplary configuration of signaling data (metadata) transmitted from a transmission device.

FIG. 25 is a diagram illustrating an exemplary configuration of the signaling data (metadata) transmitted from the transmission device 20 such as the broadcast server 21.

The signaling data (metadata) has the following three layers as illustrated in FIG. 25:

(1) a service layer (open mobile alliance-electronic service guide (OMA-ESG));

(2) a file transfer session layer (3GPP-MBMS-USD); and (3) a FLUTE (ROUTE) parameter layer (FLUTE (ROUTE)).

(1) The service layer is a layer in which attribute information of service or content which is particularly intended to be presented to the user is described.

(2) The file transfer session layer is a layer in which the transfer parameter of the file or the like is described.

(3) The FLUTE (ROUTE) parameter layer is a layer in which the parameter corresponding to the FLUTE (ROUTE) protocol is described.

(1) For example, the following attribute information (element) recording regions (fragments) are set below the OMA-ESG in which the program table or the like is recorded are set in the service layer:

(a) a service fragment;

(b) a content fragment;

(c) an interactivity data fragment (InteractivityData Fragment);

(d) a schedule fragment; and (e) an access fragment.

The fragments are classified as regions in which different types of attribute information are recorded.

Note that a plurality of other attribute information (element) recording regions (fragments) are set in the OMA-ESG, but an example in which the attribute information (element) recording regions (fragments) of (a) to (e) are set as recording regions of the token will be described later.

Note that arrows illustrated in FIG. 25 illustrate a reference relation between the attribute information (element) recording regions (fragments).

For example, an arrow extending from (a) the service fragment to (d) the schedule fragment indicates that (a) the delivery schedule information corresponding to the services (for example, the channel and the program) recorded in (a) the service fragment is recorded in (d) the schedule fragment.

Further, in the file transfer session layer, for example, the following attribute information (element) recording regions (fragments) are set below the user service description (USD) serving as the signaling data of the service unit:

(f) a schedule fragment;

(g) a filter description fragment (FilterDescription Fragment).

A plurality of attribute information (element) recording regions (fragments) are set in the user service description (USD), but an example in which the attribute information (element) recording regions (fragments) of (f) and (g) are set as recording regions of the token will be described later.

[8.1. Exemplary Token Recording in OMA-ESG Constituting Signaling Data (Metadata)]

As described above with reference to FIG. 25, the signaling data (metadata) has the following three layers as illustrated in FIG. 25:

(1) the service layer (OMA-ESG);

(2) the file transfer session layer (3GPP-MBMS-USD); and (3) the FLUTE (ROUTE) parameter layer (FLUTE (ROUTE)).

First, an example of recording the token in (1) the service layer (OMA-ESG) will be described.

As fragments suitable for storage of the token among the attribute information (element) recording regions (fragments) set in the service layer (OMA-ESG), there are the following attribute information (element) recording regions (fragments) as described above:

(a) a service fragment;

(b) a content fragment;

(c) an interactivity data fragment (InteractivityData Fragment);

(d) a schedule fragment; and (e) an access fragment.

(a) The service fragment is a fragment in which an attribute of a service layer such as a channel or a streaming service is described.

(b) The content fragment is a fragment in which each content (a unit such as a program when a service describes a channel) constituting the service fragment is described.

(d) The schedule fragment is a fragment for mapping a service, content, and interactivity data on a time axis (a program delivery schedule, a program presentation schedule, or the like).

(e) The access fragment is a fragment for describing an address of an actual file or a stream together with the delivery schedule of the schedule fragment.

A private extension element which is an extension region in which various data can be recorded is set in each of the attribute information (element) recording regions (fragments).

For example, in a standardization organization different from OMA, when a new element for adding a functional element using this schema definition is necessary, various elements can be additionally specified below this extended region. However, when the schema is extended in OMA or when it is possible to change the entire schema in other standardization organizations, an additional element is defined to be stored on the private extension element.

Figure 26:
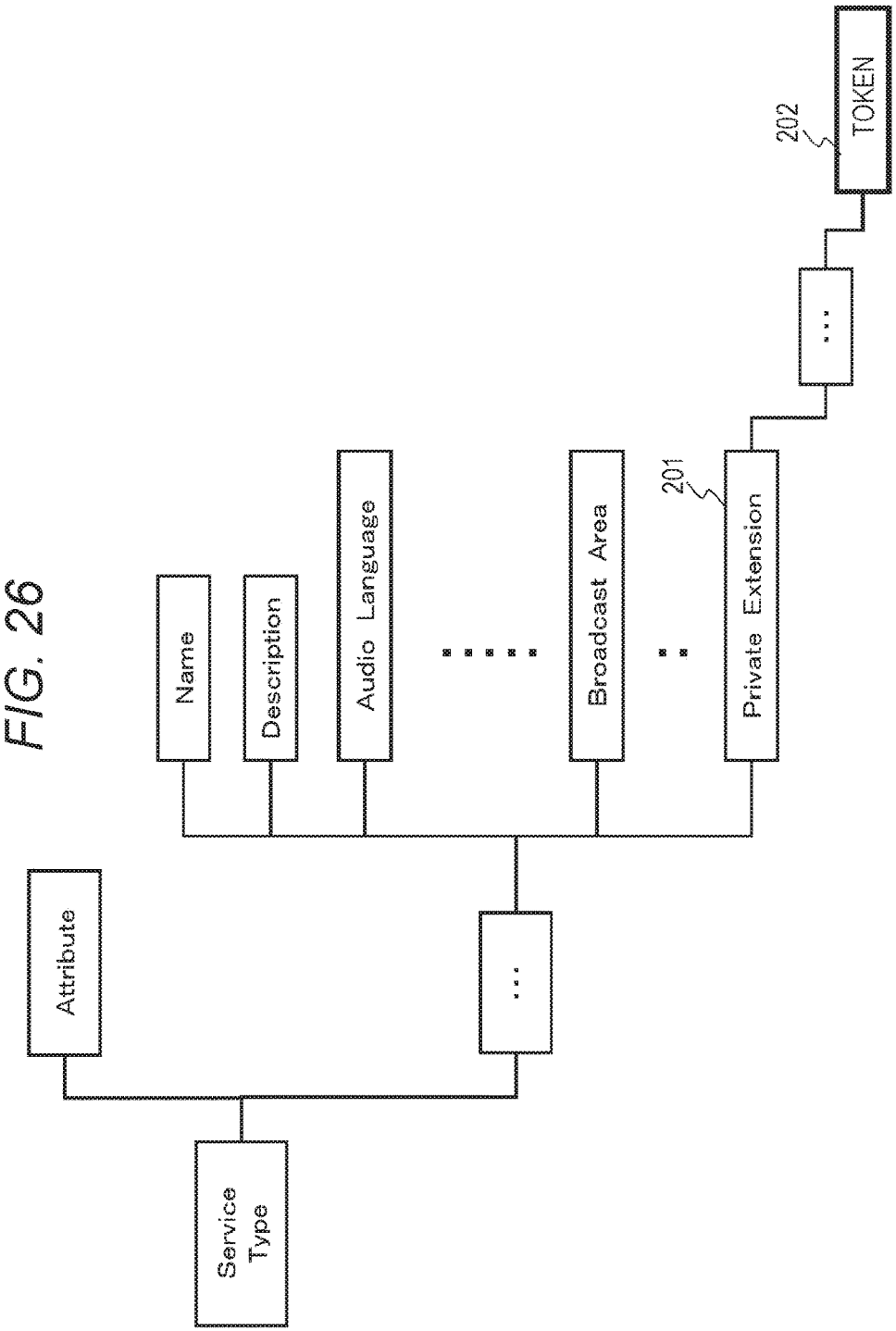
FIG. 26 is a diagram for describing an exemplary configuration of a service fragment.

For example, (a) the service fragment has a configuration illustrated in FIG. 26.

It is possible to set a token recording region 202 below the private extension data recording region 201 as illustrated in FIG. 26.

This corresponds to the example in which the "service worker (SW) search scope token <SW-Scope>" is recorded in the service metadata 161 illustrated in the exemplary token setting 1 of FIG. 13(1) described above with reference to FIG. 13.

In the token recording region 202 illustrated in FIG. 26, for example the token is recorded as XML data.

For example, an XML schema definition of the token has the following setting:

<xs:element name="SWToken" type="xs:string" xmlns:xs="http://www.w3.org/2001/XMLSchema"/>

It is encoded as a character string expression of the above setting.

Further, an example of an XML instance of the service fragment has, for example, the following setting.

```
<Service>
...
<PrivateExt>
<SWToken>character string of SW token</SWToken>
</PrivateExt>
</Service>
```

[8.2. Exemplary Token Recording in USD Constituting Signaling Data (Metadata)]

As described above with reference to FIG. 25, the signaling data (metadata) has the following three layers as illustrated in FIG. 25:

(1) the service layer (OMA-ESG)

(2) the file transfer session layer (3GPP-MBMS-USD)

(3) the FLUTE (ROUTE) parameter layer (FLUTE (ROUTE))

An example of recording the token in (2) the file transfer session layer (3GPP-MBMS-USD) will be described below.

As fragments suitable for storage of the token among the attribute information (element) recording regions (fragments) set in the user service description (USD) serving as the signaling data of the service unit, there are the following attribute information (element) recording regions (fragments) as described above:

(f) the schedule fragment; and (g) the filter description fragment (FilterDescription Fragment).

The user service description (USD) is a hub-like element that stores the attribute of the transport session making up service.

Figure 27:
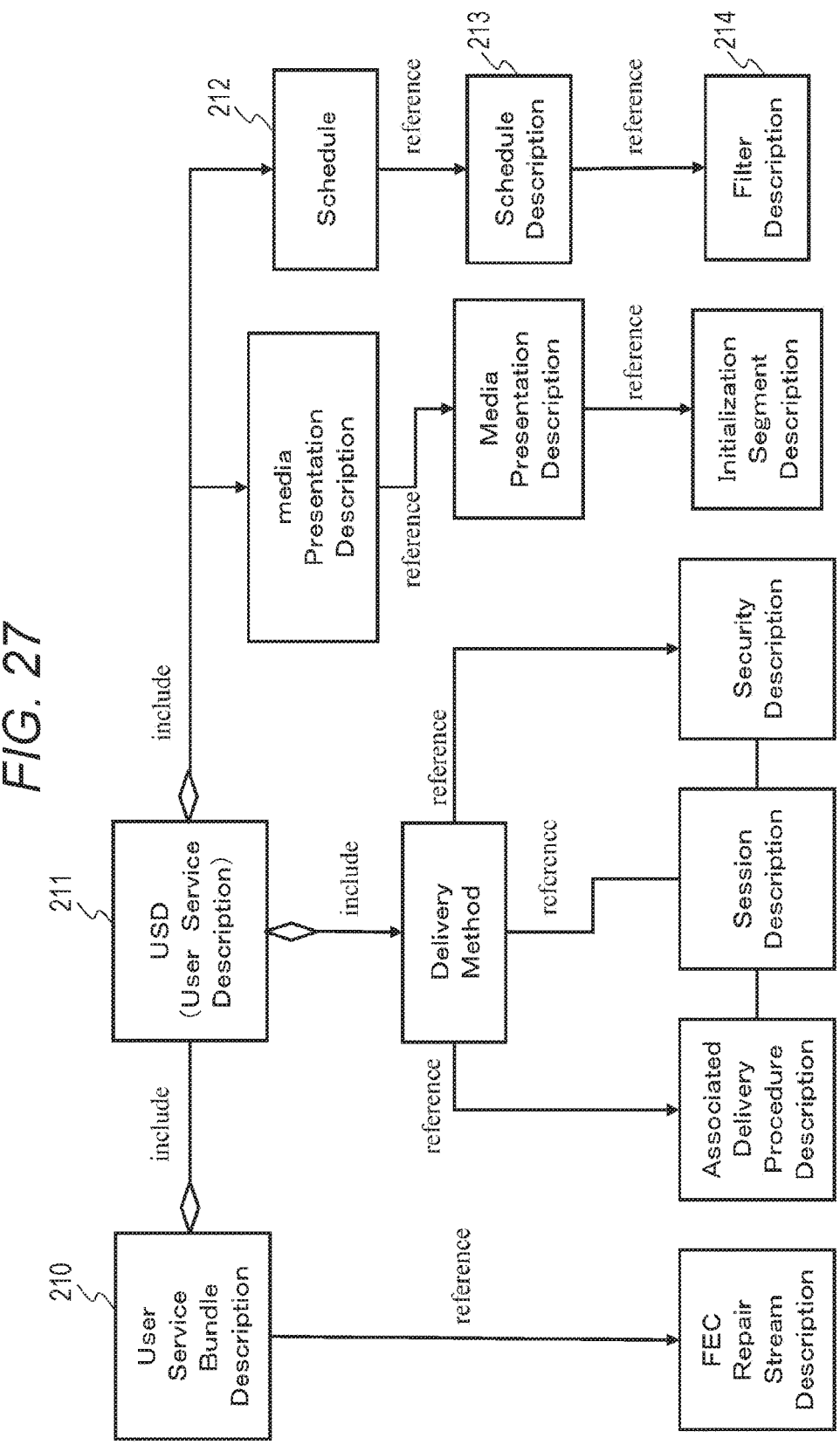
FIG. 27 is a diagram for describing an entire exemplary configuration of a user service description (USD).

FIG. 27 illustrates the entire exemplary configuration of user service description (USD).

A user service bundle description (USD) 210 is a set of a plurality of user service descriptions (USD) 211.

A hollow diamond-shaped arrow illustrated in FIG. 27 indicates that an element at the hollow arrow side includes a connection element.

Normal arrows indicate a reference relation.

Below the user service description (USD) 211, a schedule element 212 is set. Note that an element has the same meaning as a fragment.

In the schedule element 212, a schedule description element 213 is set, and furthermore, a filter description element 214 is set below the schedule element 212.

The schedule element 212 below the USD element 211 describes the delivery schedule of the transport session. It is possible to refer to the filter description (FilterDescription) element 214 that stores a parameter used for filtering used when the service (the stream session or the file session) delivered according to the schedule is selectively acquired from the schedule description element 213 referred to from the schedule element 212.

Figure 28:
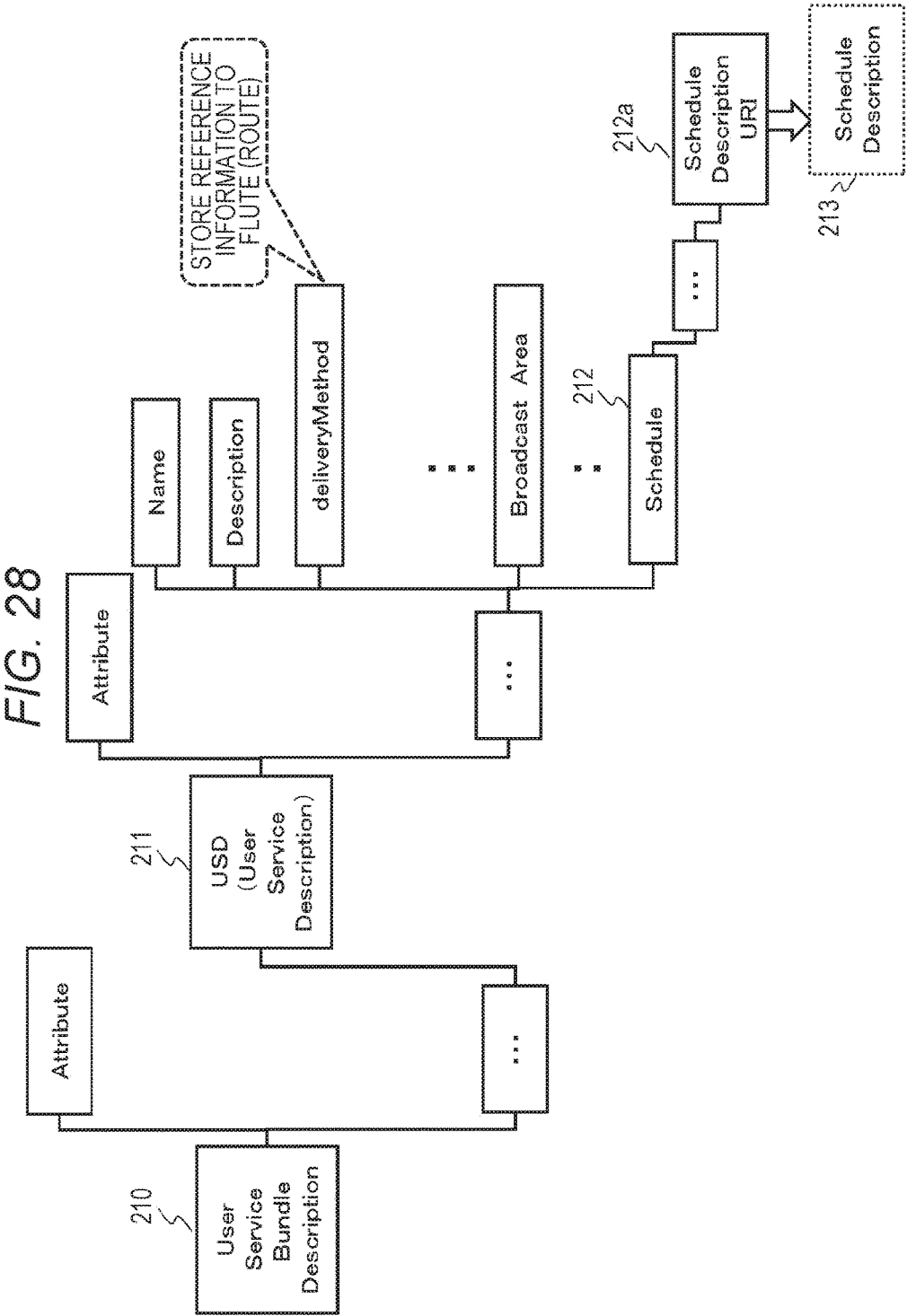
FIG. 28 is a diagram illustrating an exemplary hierarchical configuration below a user service bundle description (USD) constituting signaling data.

FIG. 28 illustrates an exemplary hierarchical configuration below the user service bundle description (USD) 210 constituting the signaling data.

The following elements are set below the user service bundle description (USD) 210:

the user service description (USD) element 211; and the schedule element 212.

A schedule description URI 212a serving as identification information of the schedule description element 213 is recorded in the schedule element 212.

The schedule description element 213 is specified on the basis of the schedule description URI 212a.

Note that reference information to FLUTE (ROUTE) is stored in the delivery method (deliveryMethod) element set below the user service description (USD) element 211. This configuration will be described later.

Figure 29:
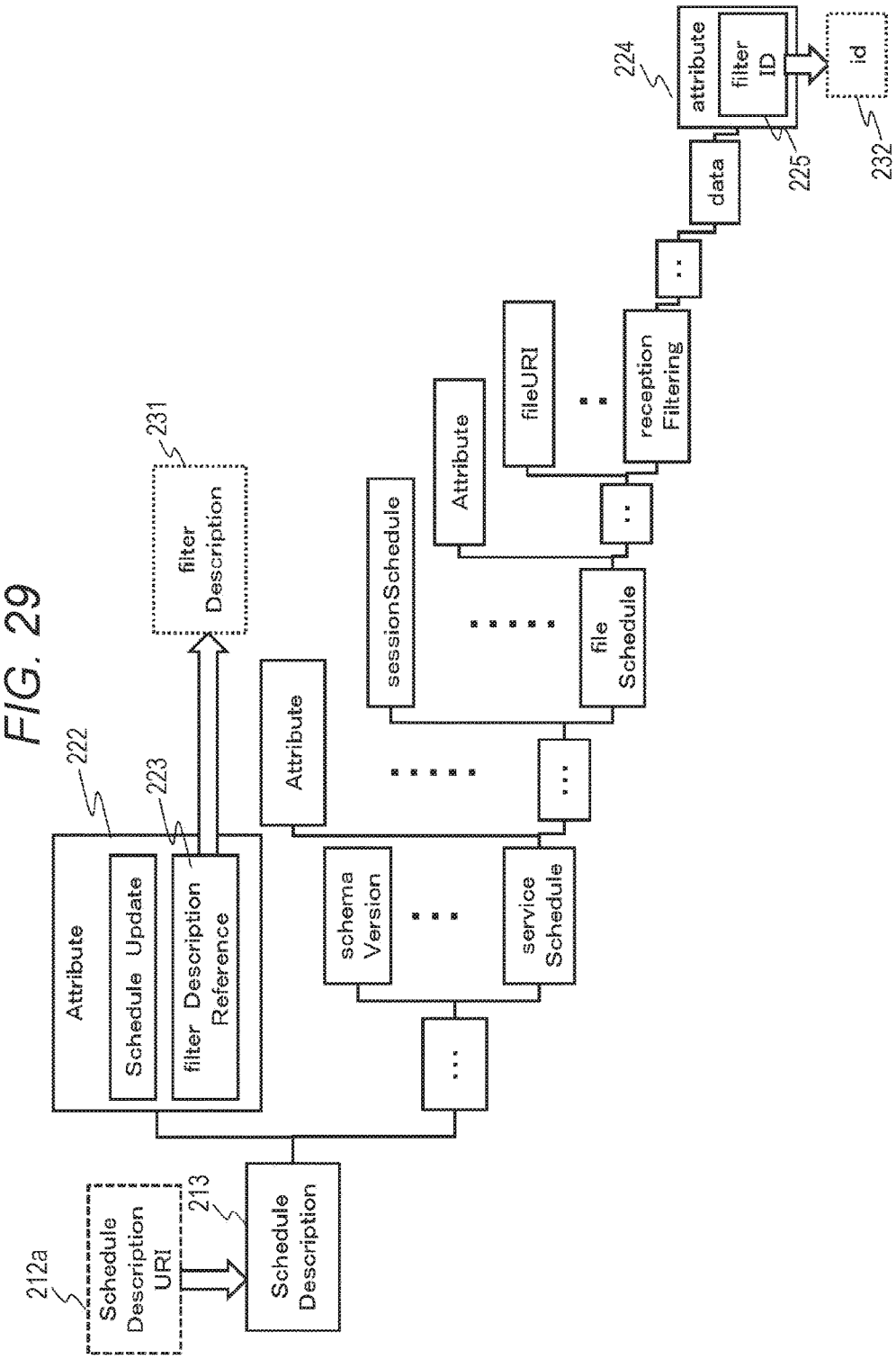
FIG. 29 is a diagram illustrating a signaling data configuration below a schedule description element.

FIG. 29 is a diagram illustrating a signaling data configuration below the schedule description element 213.

Attribute data 222 is set below the schedule description element 213, and a filter description reference 223 serving as identification information identifying a specific filter description element is recorded in the attribute data 222.

Further, a filter ID 225 serving as identification information identifying a specific filter is recorded in one piece of attribute data 224 recorded below the schedule description element 213.

Figure 30:
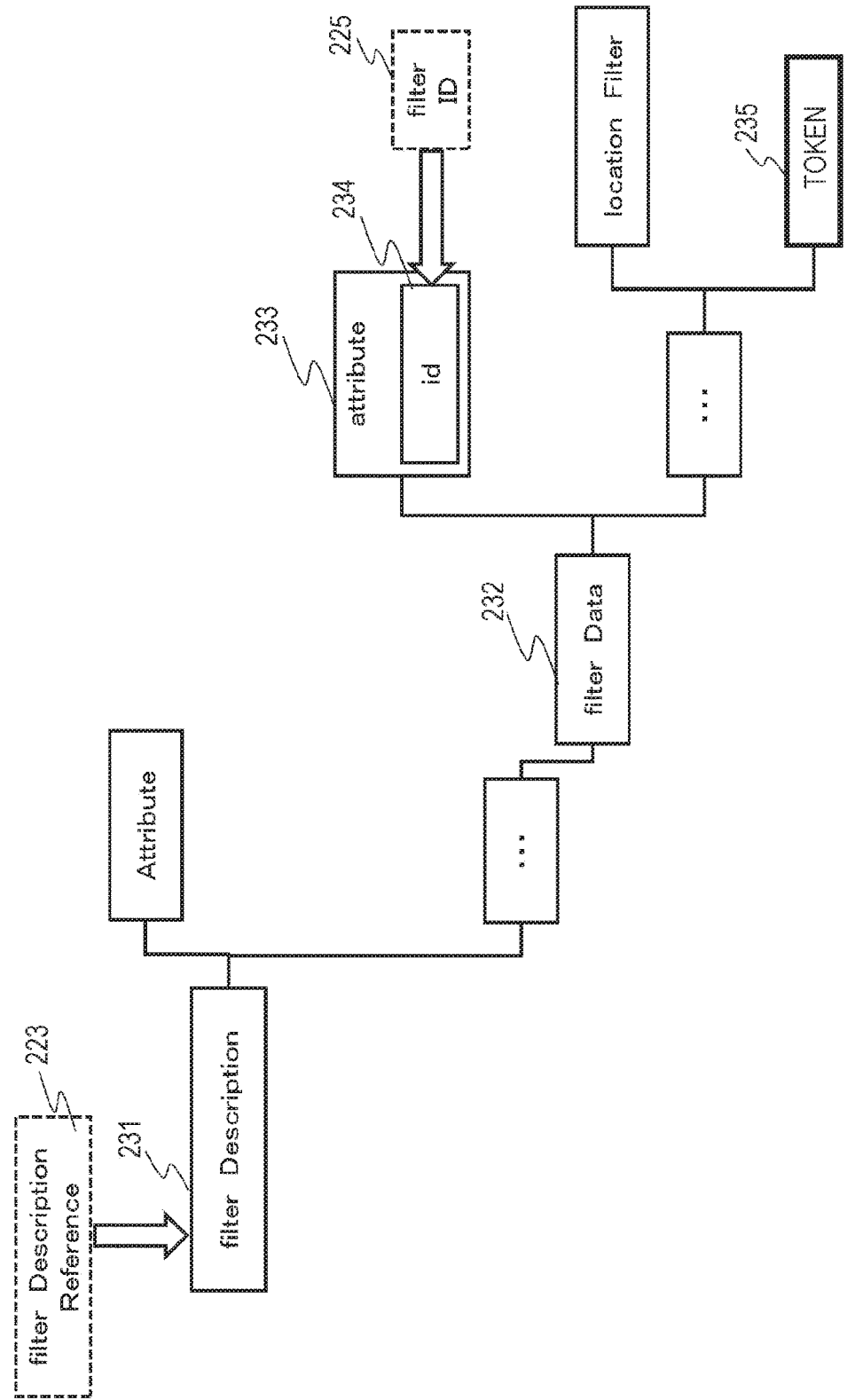
FIG. 30 is a diagram for describing a data configuration of a filter description element specified by a filter description reference.

FIG. 30 illustrates a data configuration of the filter description element 231 specified by the filter description reference 223.

A filter data element 232 for setting data corresponding to each filter is set below a filter description element 231

Further, id data 234 corresponding to the filter ID 225 illustrated in the data configuration of FIG. 29 is recorded in an attribute 233 of the filter data element 232.

Furthermore, a token 235 described above is recorded in the data recording region below the filter data element 232. This corresponds to an example in which the "service worker (SW) search scope token <SW-Scope>" is recorded in the schedule description 168 illustrated in the exemplary token setting 4 of FIG. 15(4) described above with reference to FIG. 15.

For example, the token 235 is recorded as XML data.

For example, an XML schema definition of the token XML has the following setting:
 <xs:element name="SWToken" type="xs:string" xmlns: xs="http://www.w3.org/2001/XMLSchema"/>

It is encoded as a character string expression.

Further, an example of an XML instance of the filter description fragment has, for example, the following setting.

```
<filterDescription>
...
<filterData>
<SWToken>character string of SW token</SWToken>
</filterData>
</filterDescription>
```

[Exemplary Reference Process from USD to FLUTE/ROUTE]

The data which is selectively acquired by the reception device 30 using the token is a file of the application, the application-related data, the service worker (SW) or the like and transferred according to the FLUTE/ROUTE protocol.

It is necessary for the reception device 30 to identify and acquire the file transferred according to the FLUTE/ROUTE protocol on the basis of the token described in, for example, the USD or the like which is the signaling data described above.

A configuration of this process will be described with reference to FIG. 31 and drawings subsequent thereto.

Figure 31:
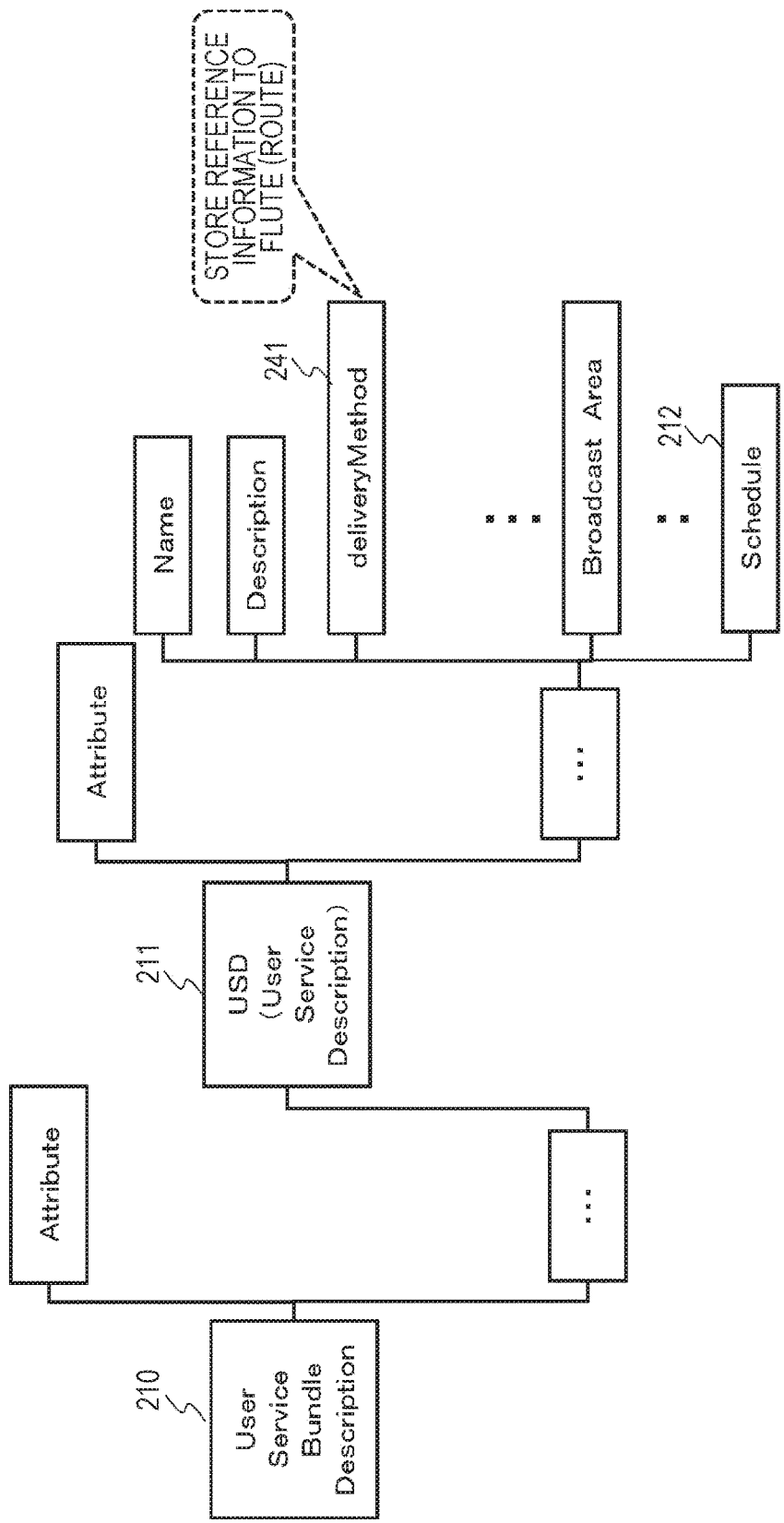
FIG. 31 is a diagram illustrating an exemplary hierarchical configuration below a user service bundle description (USD) constituting signaling data.

FIG. 31 is a diagram illustrating an exemplary hierarchical configuration below the user service bundle description (USD) 210 constituting the signaling data as described above with reference to FIG. 28.

The following elements are set below the user service bundle description (USD) 210:
 the user service description (USD) element 211; and
 the schedule element 212.

Reference information to FLUTE (ROUTE) is stored in a delivery method (deliveryMethod) element 241 set below the user service description (USD) element 211.

Figure 32:
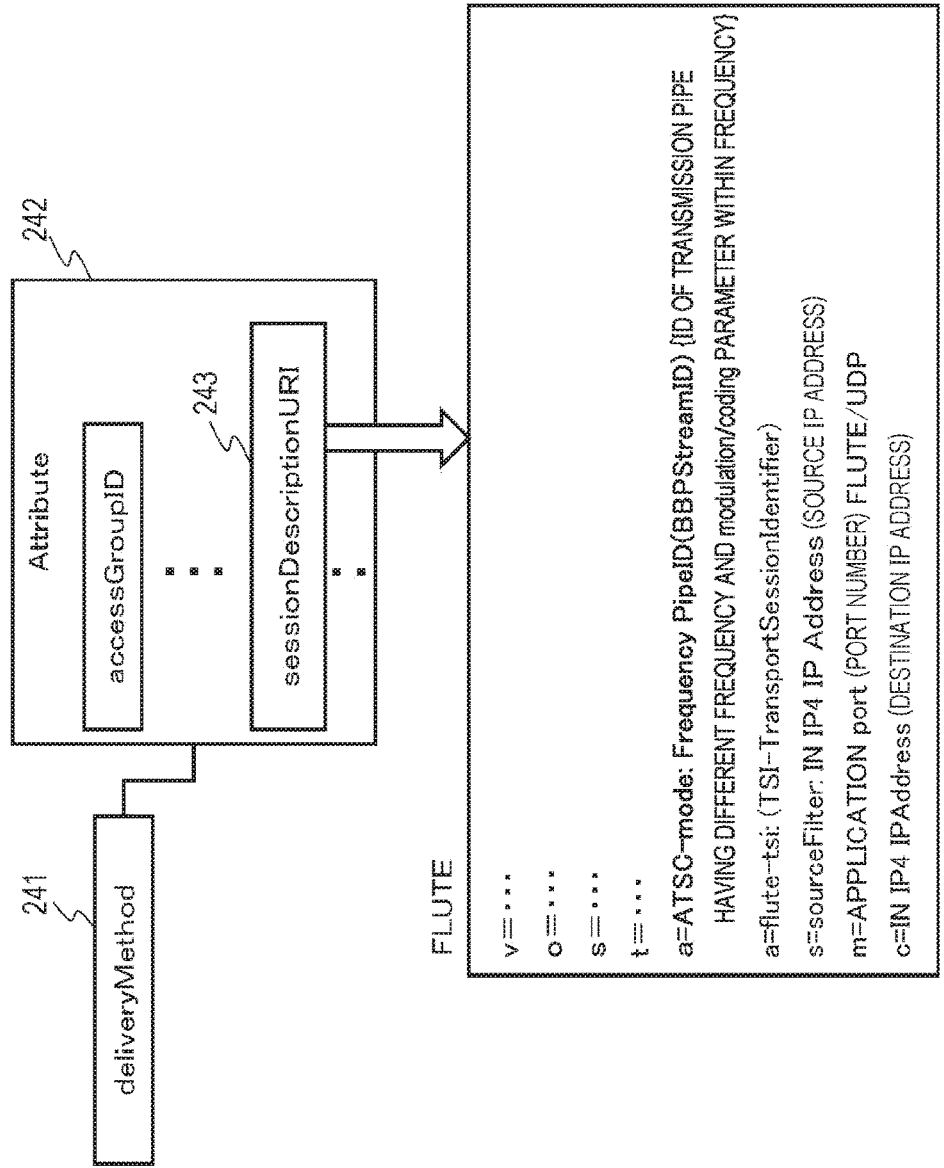
FIG. 32 is a diagram illustrating an example of reference information to FLUTE set in a delivery method (delivery-Method) element when file transfer is performed according to a FLUTE protocol.

FIG. 32 is a diagram illustrating an example of reference information to FLUTE set in the delivery method (deliveryMethod) element 241 when the file transfer is performed according to the FLUTE protocol.

The following information illustrated in FIG. 32 is recorded as an SDP referred to from a session description URI (sessionDescriptionURI) attribute 243 among attributes 242 set below the delivery method (deliveryMethod) element 241 as illustrated in FIG. 32:
 v= . . .
 o= . . .
 s= . . .
 t= . . .
 a=ATSC-mode: Frequency PipeID (BBPStreamID) {ID of transmission pipe having different frequency and modulation/coding parameter within frequency}
 a=flute-tsi: (TSI-TransportSessionIdentifier)
 s=sourceFilter: IN IP 4 IP Address (source IP address)
 m=APPLICATION port (port number) FLUTE/UDP
 c=IN IP4 IPAddress (destination IP address)

Figure 33:
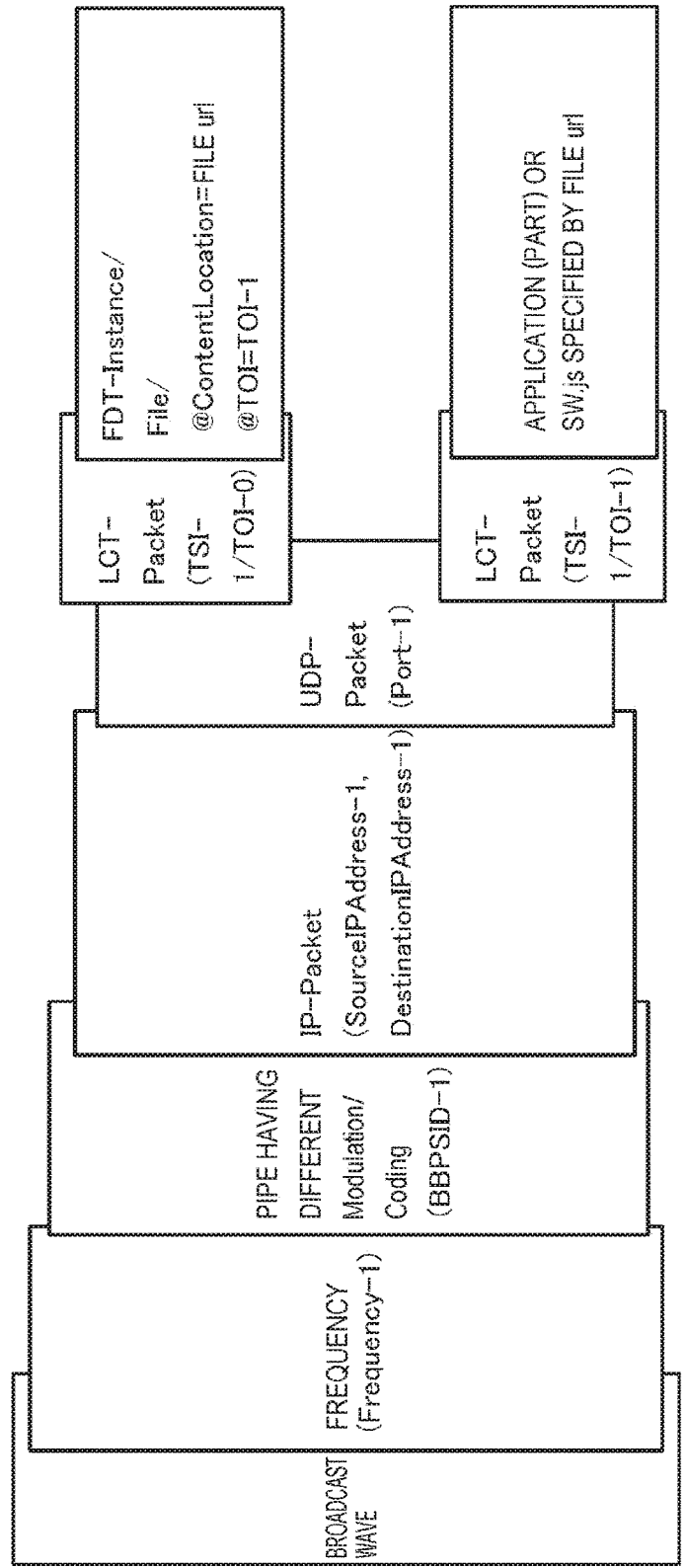
FIG. 33 is a diagram illustrating an example of reference information to FLUTE set in a delivery method (delivery-Method) element when file transfer is performed according to a FLUTE protocol.

FIG. 33 illustrates a file specifying configuration specified according to the above information.

All files transferred according to the FLUTE (ROUTE) protocol are stored in an LCT packet on a UDP packet on an IP packet and transferred.

In the case of FLUTE, the file is specified by an source IP address (SourceIPAddress), a destination IP address (DestinationIPAddress), a port number (Port), and TSI which are indicated by the SDP. This is performed in units of FLUTE sessions).

The source IP address (SourceIPAddress) and the destination IP address (DestinationIPAddress) are used to specify the IP packet, the port number (Port) is used to specify the UDP packet, and the TSI is used to specify the LCT packet string.

Further, a desired file is specified by TOI (TransportObjectIdentifier) stored in the LCT packet.

A file description table (FDT) is stored in an LCT packet in which the TOI is 0, and a relation between each file URL (stored in FDT-instance/File/@ContentLocatoin) and a corresponding TOI (stored in FDT-instance/File/@TOI) is resolved for other file objects in the transport session specified by the same TSI.

Figure 34:
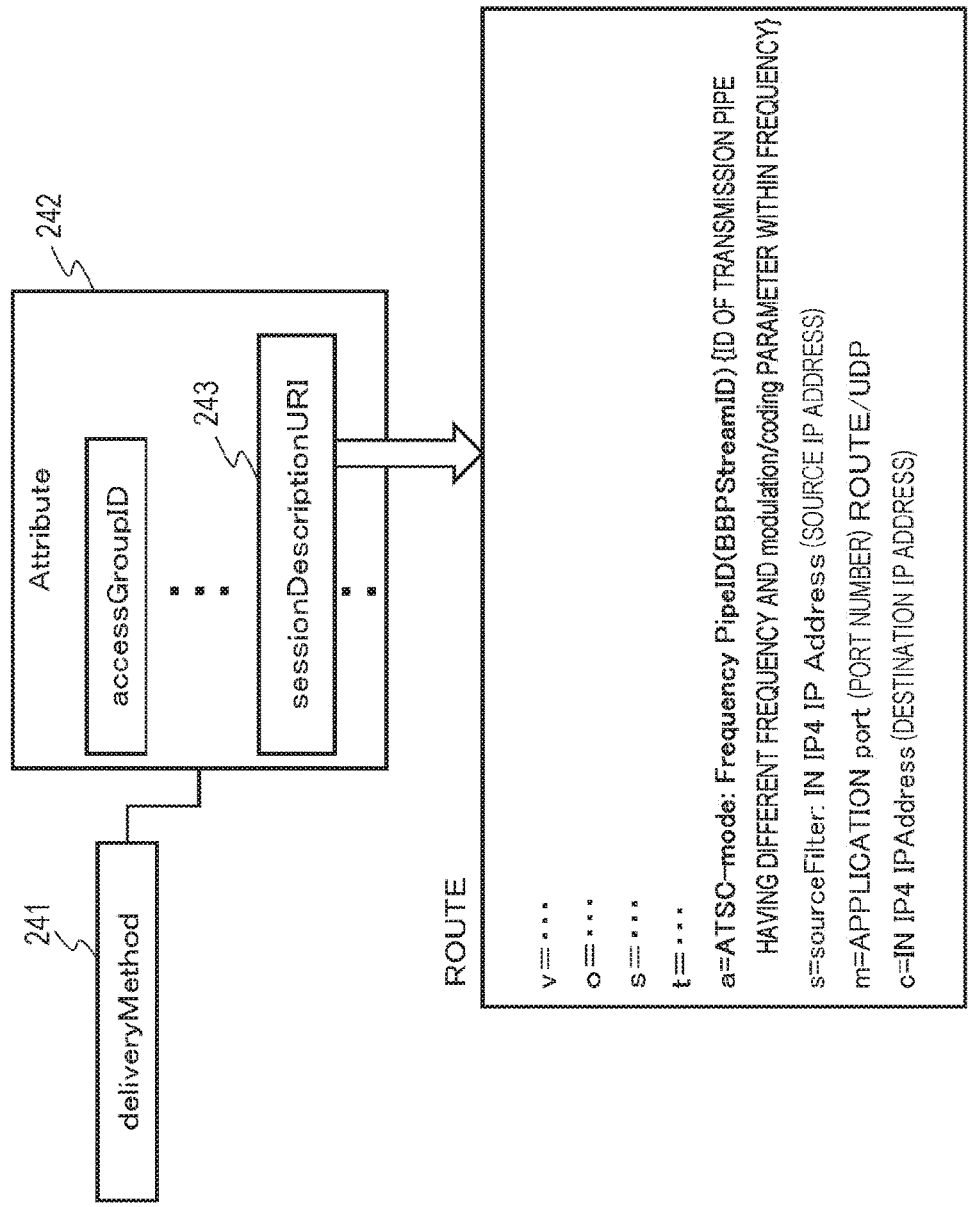
FIG. 34 is a diagram illustrating an example of reference information to FLUTE set in a delivery method (delivery-Method) element when file transfer is performed according to a ROUTE protocol.

On the other hand, FIG. 34 is a diagram illustrating an example of reference information to FLUTE set in the delivery method (deliveryMethod) element 241 when the file transfer is performed according to the ROUTE protocol.

The following information illustrated in FIG. 34 is recorded as the SDP referred to from the session description URI (sessionDescriptionURI) attribute 243 among the attributes (Attribute) 242 set below the delivery method (deliveryMethod) element 241 as illustrated in FIG. 34:
 v= . . .
 o= . . .
 s= . . .
 t= . . .
 a=ATSC-mode: Frequency PipeID (BBPStreamID) {ID of transmission pipe having different frequency andmodulation/codingparameter within frequency}
 s=source Filter: IN IP 4 IP Address (source IP address)
 m=APPLICATION port (port number) ROUTE/UDP
 c=IN IP4 IPAddress (destination IP address)

Figure 35:
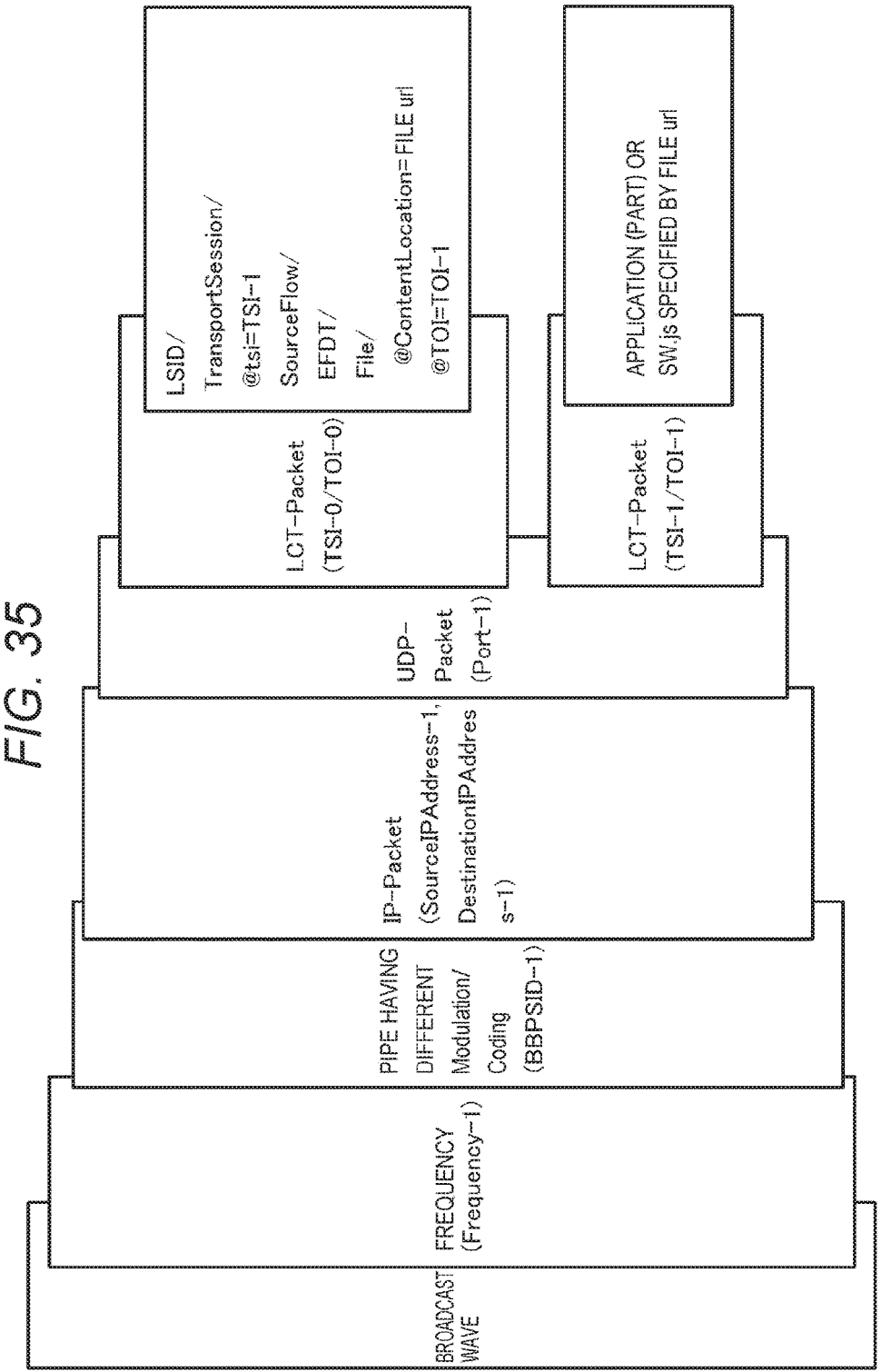
FIG. 35 is a diagram illustrating an example of reference information to FLUTE set in a delivery method (delivery-Method) element when file transfer is performed according to a ROUTE protocol.

FIG. 35 illustrates a file specifying configuration specified according to the above information.

In the case of ROUTE, the file is specified by an source IP address (SourceIPAddress), a destination IP address (destinationIPAddress), and a port number (Port) which are indicated by the SDP. This is performed in units of ROUTE sessions.

The source IP address (SourceIPAddress) and the destination IP address (destinationIPAddress) are used to specify the IP packet, and the port number is used to specify the UDP packet.

In the ROUTE session, an LCT session instance description (LSID) is stored in an LCT packet in which the TSI of the LCT packet is 0, and the TOI is 0, and attributes for other transport sessions (specified by the TSI of the LCT packet) in the ROUTE session are stored. A relation between a ContentLocation attribute serving as an attribute of a TransportSession/SourceFlow/EFDT/File element of the LSID and a TOI corresponding to a file URL by the TOI attribute is resolved.

The client middleware parses (analyzes) the FDT (FDT-instance) of FLUTE or the LSID of ROUTE and detects the file URL transferred through the file transfer session.

[8.3. Exemplary Token Recording in FLUTE (ROUTE) Parameter Layer Constituting Signaling Data (Metadata)]

As described above with reference to FIG. 25, the signaling data (metadata) has the following three layers as illustrated in FIG. 25:

(1) the service layer (OMA-ESG)
(2) the file transfer session layer (3GPP-MBMS-USD)
(3) the FLUTE (ROUTE) parameter layer (FLUTE (ROUTE))

An example of recording the token in (3) the FLUTE (ROUTE) parameter layer (FLUTE (ROUTE)) will be described.

In the FLUTE (ROUTE) parameter layer, as an element suitable for storage of the token, there is an FDT instance (FDT-instance) element in which the entire FLUTE file transfer session is described or a file element in which an attribute of each file carried in the session thereof is described.

For example, the file URL is stored in a content location (Content-Location) attribute which is the attribute of the file element.

A configuration of recording the token in the attribute of the FDT-instance element or the attribute of the file element will be described with reference to FIG. 36 and drawings subsequent thereto.

Figure 36:
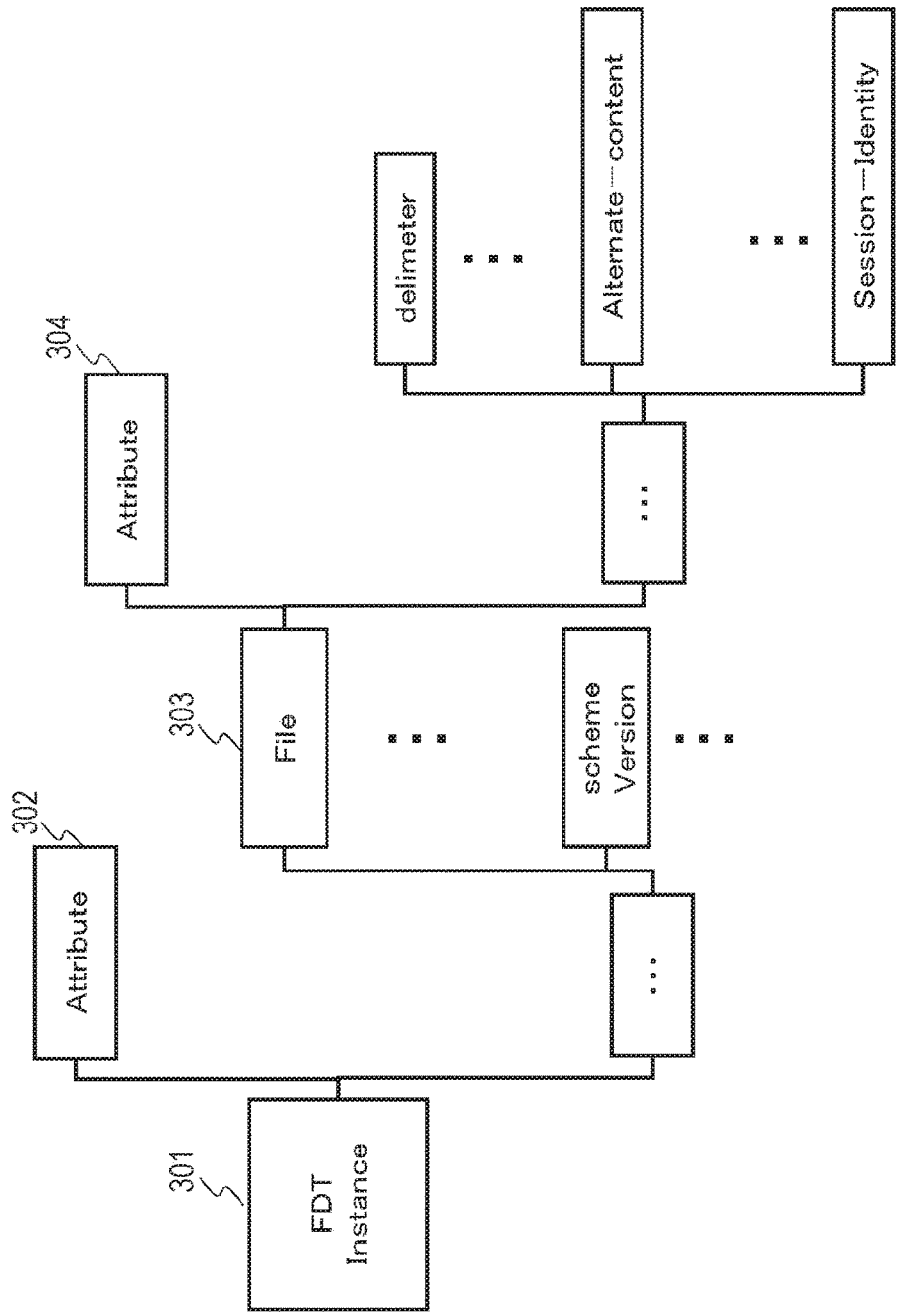
FIG. 36 is a diagram for describing a configuration of recording a token in an attribute of an FDT-instance element or an attribute of a file element.

FIG. 36 is a diagram illustrating a data storage configuration below the FDT instance element in the FLUTE (ROUTE) parameter layer constituting the signaling data.

Below an FDT instance element 301, set are an attribute 302 corresponding to the FDT instance, and a file element 303.

Further, below the file element 303, set is an attribute 304 corresponding to a file.

Figure 37:
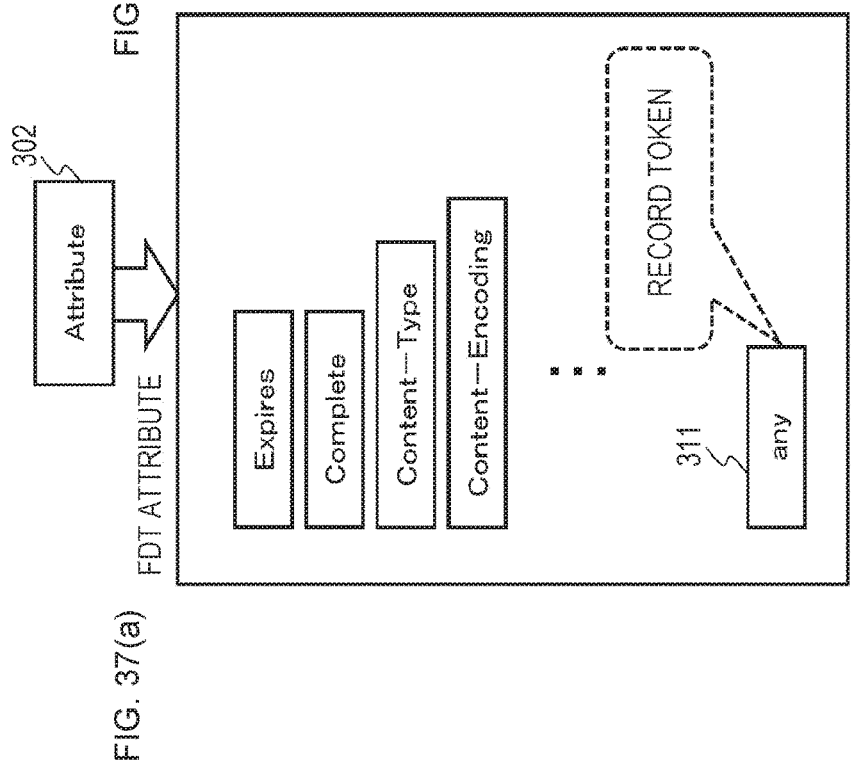
FIGS. 37($a$) and 37($b$) are diagrams for describing a detailed configuration of an attribute corresponding to an FDT instance and an attribute corresponding to a file respectively.

FIGS. 37(a) and 37(b) illustrate detailed configurations of the attribute 302 corresponding to the FDT instance and the attribute 304 corresponding to the file.

In addition to a region for recording specified attribute information, a data recording field (any) in which free data can be stored is set in the attribute recording region as illustrated in FIGS. 37(a) and 37(b).

The token is recorded in the data recording fields (any) 311 and 312.

This token recording example corresponds to, for example, the example in which the "service worker (SW) cache scope token <SW-ID>" is recorded in the ROUTE metadata 162 and 163 of the lowest layer illustrated in the exemplary token setting 1 of FIG. 13(1) described above with reference to FIG. 13.

Note that the file URL is recorded in a default content location (Content-Location) recording region in the attribute 304 corresponding to the file.

For example, the tokens recorded in the data recording fields (any) 311 and 312 in the attribute 302 corresponding to the FDT instance and the attribute 304 corresponding to the file are recorded as XML data.

For example, the XML schema definition of the token has the following setting:

<xs:attribute name="SWToken"type="xs:string" xmlns: xs="http://www.w3.org/2001/XMLSchema"/>

It is encoded as a character string expression of the above setting.

An example of an XML instance when the token is stored in the FDT-instance element as illustrated in FIG. 37(a) has, for example, the following setting.

```
<FDT-Instance..SWToken="character string of SW token"...>
...
</FDT-Instance>
```

Note that, for example, when the "service worker (SW) search scope token <SW-Scope>" is arranged in the attribute of the FDT-instance element, it indicates that a file associated with a desired service worker (SW) is stored in any one of the files of the file transfer sessions.

On the other hand, when the "service worker (SW) cache scope token <SW-ID>" is arranged, it indicates that all files in the file transfer session are files associated with a desired service worker (SW).

Further, an example of the XML instance when the token is stored in the file element as illustrated in FIG. 37(b) is as follows.

```
<FDT-Instance>
...
<File...SWToken="character string of SW token"...>
...
</FDT-Instance>
```

Only the "service worker (SW) cache scope token <SW-ID>" can be arranged in the attribute of the file element, and it indicates that this file is a file associated with a desired service worker (SW).

On the other hand, for ROUTE, the file element specified in FLUTE is stored in the LSID serving as the signaling data specified in ROUTE.

Figure 38:
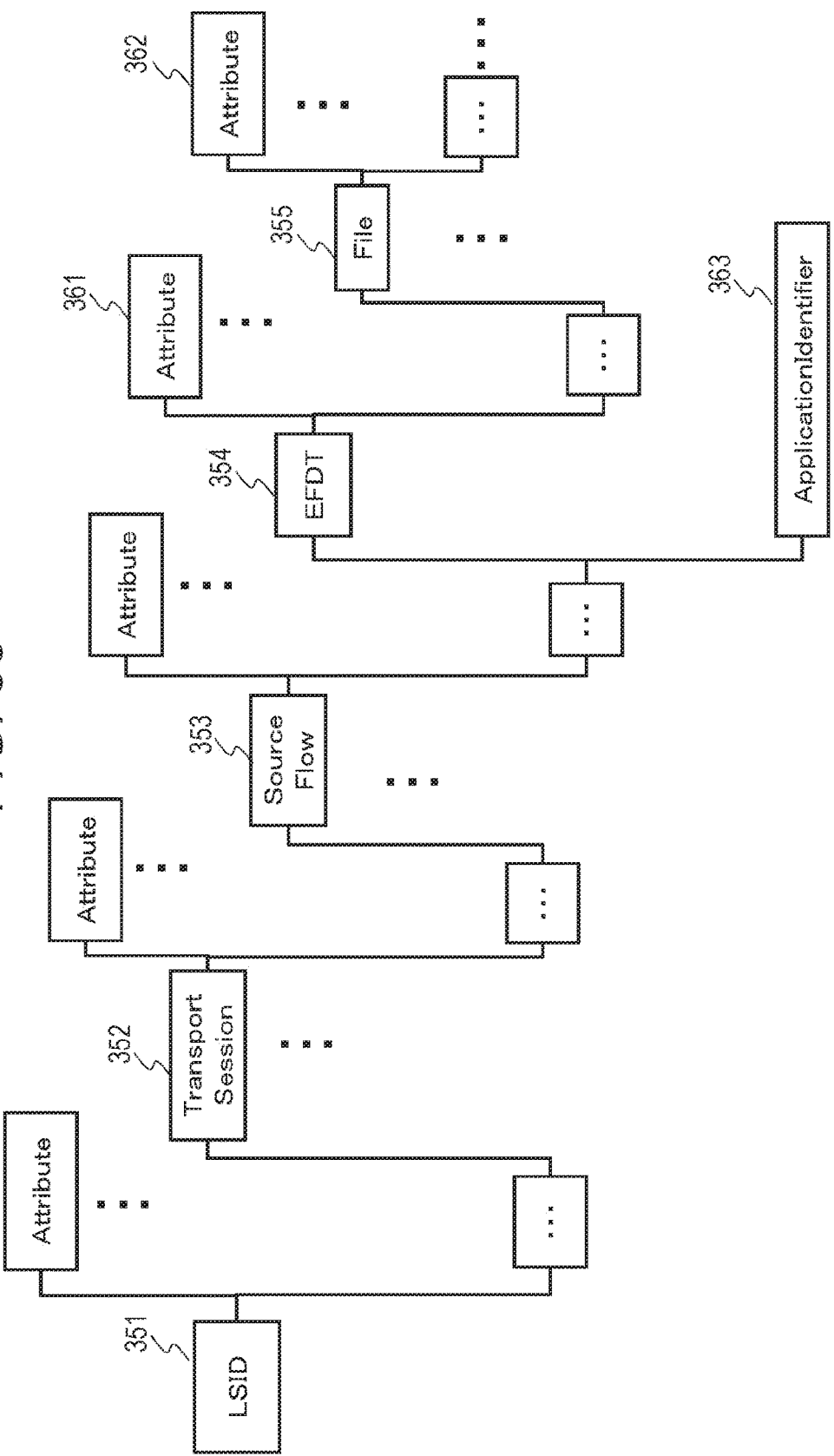
FIG. 38 is a diagram illustrating a data configuration below LSID specified in ROUTE.

FIG. 38 illustrates a data configuration below the LSID specified in ROUTE.

As illustrated in FIG. 38, a hierarchical setting is performed as follows:

an LSID element 351;
a transport session (TransportSession) element 352;
a source flow (SourceFlow) element 353;
an EFDT element 354; and
a file element 355.

Therefore, as an element suitable for storage of a service worker (SW) token (a SW search scope token and a SW cache scope token), there are the following elements.

(a) an attribute data element 361 of the EFDT element 354 unit;
(b) an attribute data element 362 of the file 355 unit; and
(c) an application identifier (ApplicationIdentifier) element of the EFDT element 354 unit.

Each of the elements is a candidate.

Figure 39A:
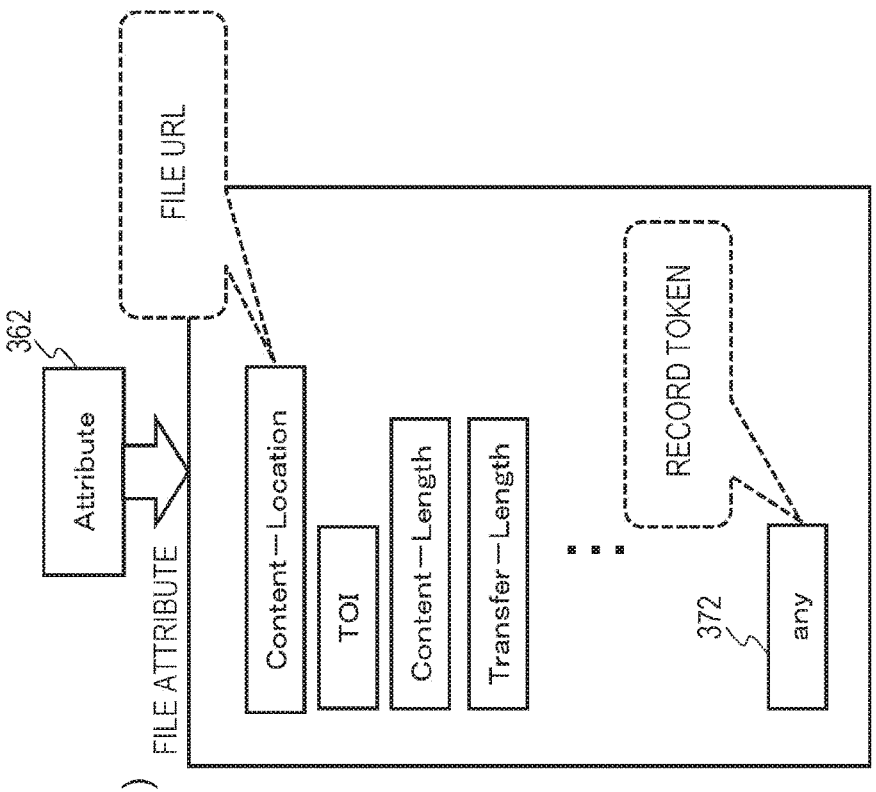
FIGS. 39($a$) and 39($b$) are diagrams for describing the details of an attribute data element in an EFDT element unit and an attribute data element of a file unit respectively.
Figure 39B:
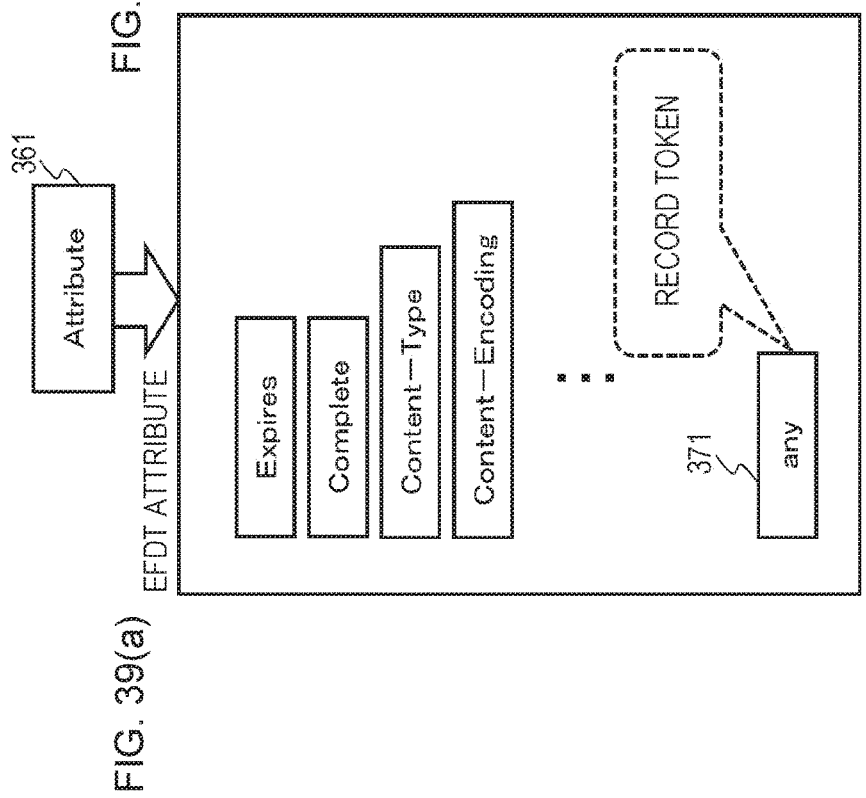

FIGS. 39(a) and 39(b) illustrate detailed configurations of (a) the attribute data element 361 of the EFDT element 354 unit and (b) the attribute data element 362 of the file 355 unit.

In addition to a region for recording specified attribute information, a data recording field (any) in which free data can be stored is set in the attribute recording region as illustrated in FIGS. 39(a) and 39(b).

The token is recorded in the data recording fields (any) 371 and 372.

This token recording example corresponds to, for example, an the example in which the "service worker (SW) cache scope token <SW-ID>" is recorded in the ROUTE metadata 162 and 163 of the lowest layer illustrated in the exemplary token setting 1 of FIG. 13(1) described above with reference to FIG. 13.

Note that the file URL is recorded in a default content location (Content-Location) recording region in the attribute 362 corresponding to the file.

An example of an XML instance when the token is stored in the EFDT-instance element as illustrated in FIG. 39(*a*) has, for example, the following setting.

```
<LSID>
...
<TransportSession>
...
<SourceFlow>
...
<EFDT...SWToken="character string of SW token"...>
...
</EFDT>
...
</SourceFlow>
...
</TransportSession>
...
</LSID>
```

Further, an example of an XML instance when the token is stored in the application identifier (ApplicationIdentifier) element 363 of the EFDT element 354 as illustrated in FIG. 38 has, for example, the following setting.

```
<LSID>
...
<TransportSession>
...
<SourceFlow>
...
<ApplicationIdentifier>character string of SW token<ApplicationIdentifier>
...
</SourceFlow>
...
</TransportSession>
...
</LSID>
```

When the "service worker (SW) search scope token <SW-Scope>" is arranged in the LSID/TransportSession/SourceFlow/ApplicationIdentifier element, it indicates that a file associated with a desired service worker (SW) is stored in any of the files in the file transfer session.

On the other hand, when the "service worker (SW) cache scope token <SW-ID>" is arranged, it indicates that all files in the file transfer session are files associated with a desired service worker (SW).

Further, an example of the XML instance when the token is stored in the file element as illustrated in FIG. 39(*b*) has the following setting.

```
<EFDT>
...
<File...SWToken="character string of SW token"...>
...
</EFDT>
```

Note that only the "service worker (SW) cache scope token <SW-ID>" can be arranged in the attribute of the file element, and it indicates that this file is a file associated with a desired service worker (SW). [9. Exemplary Configurations of Transmission Device and Reception Device]

Next, exemplary device configuration of the transmission device (server) 20 and the reception device (client) 30 which are communication devices will be described with reference to FIGS. 40 and 41.

Figure 40:
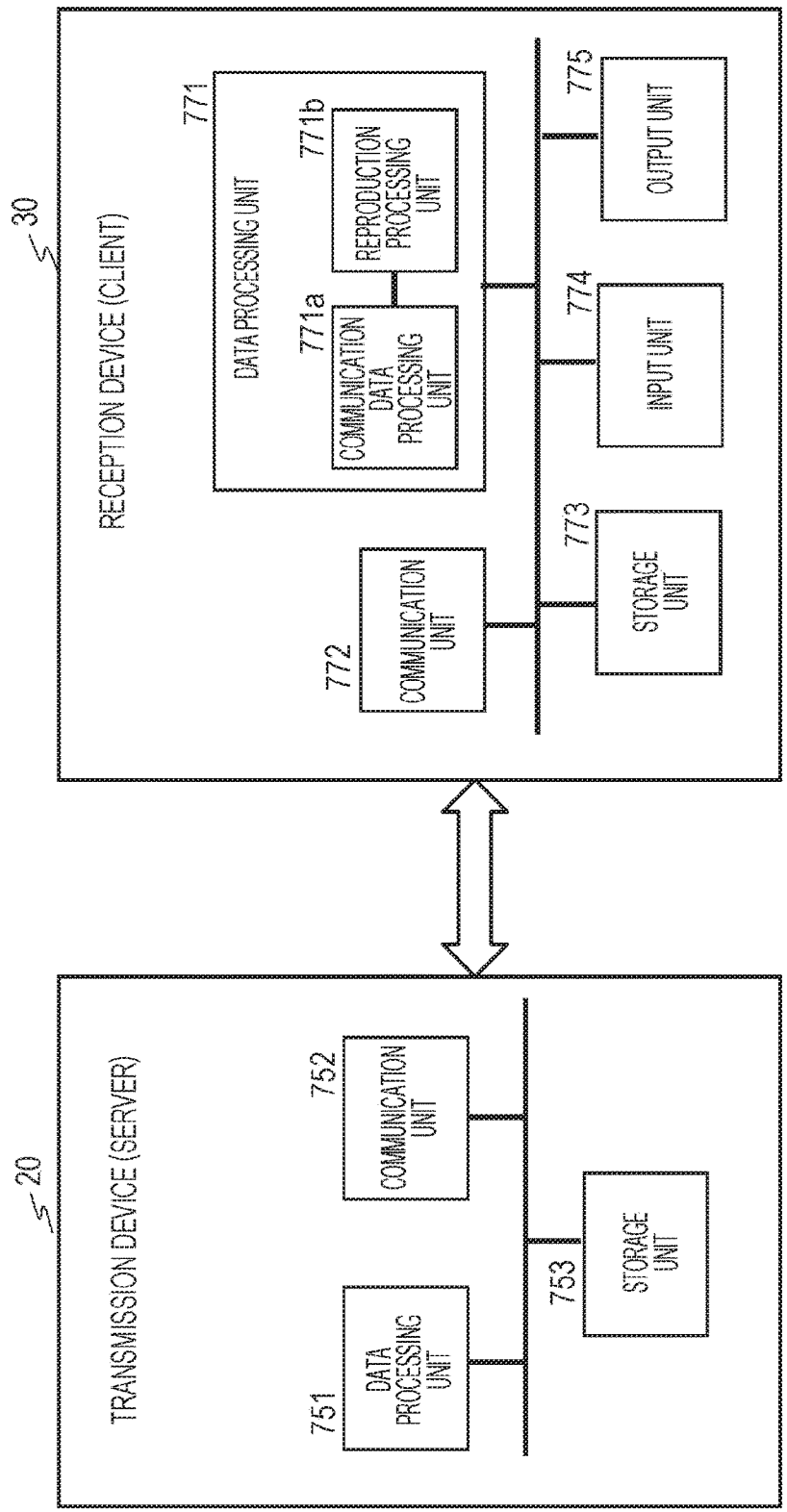
FIG. 40 is a diagram for describing exemplary configurations of a transmission device and a reception device serving as a communication device.

FIG. 40 illustrates exemplary configurations of the transmission device (server) 20 and the reception device (client) 30.

The transmission device (server) 20 includes a data processing unit 751, a communication unit 752, and a storage unit 753.

The reception device (client) 30 includes a data processing unit 771, a communication unit 772, a storage unit 773, an input unit 774, and an output unit 775.

The data processing unit includes a communication data processing unit 771*a* and a reproduction processing unit 771*b*.

The data processing unit 751 of the transmission device (server) 20 performs various data processing for executing the data delivery service. For example, the data processing unit 751 performs generation and transmission control of the configuration data of the data delivery service. Further, the data processing unit 751 performs generation and transmission processes of the application, the service worker (SW), various other data, and the signaling data to be provided to the reception device (client) 30.

The communication unit 752 performs communication processing such as delivery of the application, the service worker (SW), various other data, the signaling data, or the like in addition to the AV segment.

The storage unit 753 stores the AV segment, the application, and the service worker (SW) to be delivered, data used by the application, the signaling data, and the like.

Further, the storage unit 753 is used as a work area of data processing performed by the data processing unit 751 and also used as a storage region of various parameters.

On the other hand, the reception device (client) 30 includes a data processing unit 771, a communication unit 772, a storage unit 773, an input unit 774, and an output unit 775.

The communication unit 772 receives data delivered from the transmission device (server) 20, for example, the AV segment, the application, the service worker (SW), data to be used by the application, the signaling data, and the like.

The data processing unit 771 includes a communication data processing unit 771*a* and a reproduction processing unit 771*b*, and performs, for example, a process according to the above embodiment.

Specifically, the data processing unit 771 performs data processing using the application, the API, the service worker (SW), or the like.

An instruction command of the user, for example, various commands for channel selection, application activation, installation, and the like are input via the input unit 774.

Reproduction data is output to the output unit 775 such as a display unit or a speaker.

The storage unit 773 stores the AV segment, the service worker (SW), the application, data to be used by the application, the signaling data, and the like.

Further, the storage unit 773 is used as a work area of data processing performed by the data processing unit 771 and also used as a storage region of various parameters.

FIG. 41 illustrates an exemplary hardware configuration of a communication device applicable as the transmission device 20 and the reception device 30.

A central processing unit (CPU) 801 functions as a data processing unit that performs various processes according to programs stored in a read only memory (ROM) 802 or a storage unit 808.

For example, the CPU 801 performs the processes according to the sequences described in the above embodiment.

A random access memory (RAM) 803 stores programs executed by the CPU 801, data, and the like. The CPU 801, the ROM 802, and the RAM 803 are connected to one another via a bus 804.

The CPU 801 is connected to an input/output interface 805 via a bus 804, and an input unit 806 including various switches, a keyboard, a mouse, a microphone, and the like and an output unit 807 including a display, a speaker, and the like are connected to the input/output interface 805. The CPU 801 performs various processes in response to commands input from the input unit 806, and outputs processing results to, for example, the output unit 807.

A storage unit 808 connected to the input/output interface 805 is configured with, for example, a hard disk or the like, and stores programs performed by the CPU 801 and various data. A communication unit 809 functions as a transceiving unit for data communication via a network such as the Internet or a local area network (LAN) and a transceiving unit for broadcast waves, and communicates with an external device.

A drive 810 connected to the input/output interface 805 drives a removable medium 811 such as a magnetic disk, an optical disk, a magneto-optical disk, a semiconductor memory such as a memory card, and performs recording or reading of data.

Note that encoding or decoding of data can be performed as a process of the CPU 801 serving as the data processing unit, but a codec serving as dedicated hardware for executing an encoding process or a decoding processing may be provided.

[10. Summary of Configuration of Present Disclosure]

The embodiment of the present disclosure has been described in detail with reference to the specific examples. However, it is obvious that those skilled in the art can make modifications or substitutions of the embodiment without departing from the gist of the present disclosure. In other words, the embodiment is intended to disclose the present invention an exemplary form and not intended to be interpreted in a limiting manner. In order to determine the gist of the present disclosure, claims set forth below should be taken into consideration.

Note that the technology disclosed in this specification may have the following configurations.

(1) A reception device, including
a data processing unit that receives a token which is auxiliary search information for efficiently searching for metadata related to acquisition-scheduled data and performs a process using the token.

(2) The reception device according to (1),
in which the token is information for improving efficiency of a search process for access information of the acquisition-scheduled data.

(3) The reception device according to (1) or (2),
in which the data processing unit performs the search process for the access information of the acquisition-scheduled data using the token and a uniform resource locator (URL) of the acquisition-scheduled data.

(4) The reception device according to any one of (1) to (3),
in which the token is a search scope token capable of limiting a search scope of metadata in which access information corresponding to the acquisition-scheduled data of the reception device is recorded.

(5) The reception device according to (4),
in which the search scope token is a service worker (SW) search scope token capable of limiting a search scope of access information corresponding to data serving as a management target of a specific service worker (SW) which is a data management program.

(6) The reception device according to (5),
in which the data processing unit limits the metadata serving as the search scope on the basis of the service worker (SW) search scope token.

(7) The reception device according to any one of (1) to (6),
in which the token is a cache scope token indicating that access information corresponding to the acquisition-scheduled data of the reception device is recorded collectively.

(8) The reception device according to (7),
in which the cache scope token is a service worker (SW) cache scope token indicating that access information corresponding to data serving as a management target of a specific service worker (SW) that is a data management program is recorded collectively.

(9) The reception device according to (8),
in which the data processing unit acquires the access information corresponding to the management target data of the service worker (SW) from the metadata on the basis of the service worker (SW) cache scope token.

(10) The reception device according to any one of (1) to (9),
in which the token is recorded in signaling data transmitted from a transmission device, and
the reception device acquires the token recorded in the signaling data.

(11) The reception device according to (10),
in which the signaling data includes
(a) a service layer in which attribute information of a service or content to be presented to a user is described,
(b) a file transfer session layer in which a file transfer parameter is described, and
(c) a FLUTE (ROUTE) parameter layer in which a parameter corresponding to a FLUTE (ROUTE) protocol is described, and
the token is recorded in at least one of the layers (a) to (c).

(12) The reception device according to (11),
in which the data processing unit acquires the token recorded in the service layer, the file transfer session layer, or the FLUTE (ROUTE) parameter layer.

(13) The reception device according to any one of (1) to (12),
in which an application executed in the data processing unit of the reception device transmits a token information setting request for detecting the token to middleware that processes reception data, and
the middleware performs token detection on the basis of the token information set according to the token information setting request.

(14) The reception device according to any one of (1) to (13),
in which a service worker (SW) which is a data management program executed in the data processing unit of the reception device transmits a token information setting request for detecting the token to middleware that processes reception data, and
the middleware performs token detection on the basis of the token information set according to the token information setting request.

(15) The reception device according to (14),
in which the token is information for improving efficiency of a search process of access information corresponding to data serving as a management target of a specific service worker (SW), and the data processing unit transmits a new token information setting request to the middleware according to update of the service worker (SW).

(16) A transmission device that transmits metadata in which a token is recorded, the token being auxiliary search information for efficiently searching for metadata related to acquisition-scheduled data in a reception device.

(17) The transmission device according to (16),
in which the token is
a search scope token capable of limiting a search scope of metadata in which access information corresponding to the acquisition-scheduled data of the reception device is recorded, or
a cache scope token indicating that the access information corresponding to the acquisition-scheduled data of the reception device is collectively recorded.

(18) The transmission device according to (17),
in which the token is
a service worker (SW) search scope token capable of limiting a search scope of access information corresponding to data serving as a management target of a specific service worker (SW) which is a data management program, or
a service worker (SW) cache scope token indicating that the access information corresponding to the data serving as the management target of the specific service worker (SW) is collectively recorded.

(19) A data processing method performed in a reception device, including:
receiving, by a data processing unit of the reception device, a token which is auxiliary search information for efficiently searching for metadata related to acquisition-scheduled data; and
performing a process using the token.

(20) A data processing method performed in a transmission device, including:
transmitting metadata in which a token is recorded, the token being auxiliary search information for efficiently searching for metadata related to acquisition-scheduled data in a reception device.

Further, a series of processes described in the specification can be performed by hardware, software, or a complex configuration of both. When a process is performed by software, it is possible to install a program having a process sequence recorded therein in a memory in a computer incorporated into dedicated hardware and perform the program, or it is possible to install the program in a general-purpose computer capable of executing various processes and perform the program. For example, the program may be recorded in a recording medium in advance. The program may be installed in a computer from a recording medium, and the program may be received via a network such as the Internet or a LAN and installed in a recording medium such as an internal hard disk.

Note that various processes described in the specification may be performed not only chronologically according to the description but also in parallel or individually depending on a processing capability of a device that performs the processes or as necessary. Further, in this specification, a system is a logical aggregate configuration of a plurality of devices, and it is not limited to a configuration in which devices of respective components are in the same housing.

INDUSTRIAL APPLICABILITY

As described above, according to the configuration of the embodiment of the present disclosure, a device and a method which are capable of realizing an efficient search of metadata such as access information corresponding to acquisition-scheduled data in a reception device are implemented.

Specifically, the reception device receives a token serving as auxiliary search information for efficiently searching for metadata such as access information related to acquisition-scheduled data of the reception device and performs a search process using the token. Examples of the token includes a service worker (SW) search scope token capable of limiting a search scope of access information corresponding to data serving as a management target of a specific service worker (SW) which is a data management program and a service worker (SW) cache scope token indicating that the access information corresponding to the data of the management target of the service worker (SW) is collectively recorded.

According to the present configuration, a device and a method which are capable of realizing an efficient search of metadata such as access information corresponding to acquisition-scheduled data in a reception device are implemented.

REFERENCE SIGNS LIST

10 Communication system
20 Transmission device
21 Broadcast server
22 Data delivery server
30 Reception device
31 TV
32 PC
33 Mobile terminal
50 Signaling data
60 AV segment
70 Other data
110 Middleware
111 Communication unit (PHY/MAC)
112 Signaling acquiring unit
113 Signaling analyzing unit
114 File acquiring unit
120 HTTP proxy server
121, 122 Cache unit
123 Address resolution unit
130 Output control unit
131 Display data (for example, HTML/JavaScript (registered trademark)) acquisition & analysis unit
132 Display processing unit (renderer)
133 Storage unit (permanent cache)
140 External device
141 Output control unit
142 Storage unit (permanent cache)
751 Data processing unit
752 Communication unit
753 Storage unit
771 Data processing unit
772 Communication unit
773 Storage unit
774 Input unit
775 Output unit
801 CPU
802 ROM
803 RAM
804 Bus
805 Input/output interface
806 Input unit
807 Output unit
808 Storage unit
809 Communication unit
810 Drive
811 Removable medium

The invention claimed is:

1. A reception device, comprising
circuitry configured to:
   receive metadata transmitted using a unidirectional delivery protocol; and
   perform selection of data according to tokens included in the metadata,
wherein
at least one of the tokens is included in an attribute of a file delivery table instance element in the metadata and associated with files in a file transfer session indicated in the file delivery table instance element, and
at least another one of the tokens is included in an attribute of a file element in the metadata and only associated with a file indicated in the file element.

2. The reception device according to claim 1, wherein
the tokens include selection information on the data acquired by a program executed in the reception device, and
the selection information indicates that information associated with at least one of selection targets is recorded in the metadata.

3. The reception device according to claim 2,
wherein the circuitry is configured to perform selection of access information of the data using the tokens and at least one uniform resource locator (URL) of the data.

4. The reception device according to claim 2,
wherein the at least one of the tokens included in the attribute of the file delivery table instance element is a search scope token capable of limiting a search scope of the metadata in which access information corresponding to the data is recorded.

5. The reception device according to claim 4, wherein
the program executed in the reception device is a service worker (SW) that performs data management after an end of a related broadcast program, after a switch of channel, or in an offline state, and
the search scope token is a service worker (SW) search scope token capable of limiting a search scope of access information corresponding to data serving as a management target of a specific service worker (SW).

6. The reception device according to claim 5,
wherein the circuitry is configured to limit the metadata serving as the search scope on the basis of the service worker (SW) search scope token.

7. The reception device according to claim 2,
wherein the at least one of the tokens included in the attribute of the file delivery table instance element or the at least another one of the tokens included in the attribute of the file element is a cache scope token indicating that access information corresponding to the data is recorded in the metadata.

8. The reception device according to claim 7, wherein
the program executed in the reception device is a service worker (SW) that performs data management after an end of a related broadcast program, after a switch of channel, or in an offline state, and
the cache scope token is a service worker (SW) cache scope token indicating that access information corresponding to data serving as a management target of a specific service worker (SW) is recorded in the metadata.

9. The reception device according to claim 8,
wherein the circuitry is configured to acquire the access information corresponding to the management target of the service worker (SW) from the metadata on the basis of the service worker (SW) cache scope token.

10. The reception device according to claim 1, wherein
an application executed in the reception device transmits a token information setting request for detecting a particular token to middleware that processes reception data, and
the middleware performs token detection on the basis of the token information set according to the token information setting request.

11. The reception device according to claim 1, wherein
a service worker (SW), which performs data management after an end of a related broadcast program, after a switch of channel, or in an offline state, transmits a token information setting request for detecting a particular token to middleware that processes reception data, and
the middleware performs token detection on the basis of the token information set according to the token information setting request.

12. The reception device according to claim 11,
wherein the tokens include information for improving efficiency of a search process of access information corresponding to data serving as a management target of a specific service worker (SW), and
the circuitry is configured to transmit a new token information setting request to the middleware according to an update of the service worker (SW).

13. A transmission device, comprising:
a storage configured to store metadata usable in a reception device to perform selection of data; and
circuitry configured to transmit the metadata using a unidirectional delivery protocol,
wherein
at least one of the tokens is included in an attribute of a file delivery table instance element in the metadata and associated with files in a file transfer session indicated in the file delivery table instance element, and
at least another one of the tokens is included in an attribute of a file element in the metadata and only associated with a file indicated in the file element.

14. The transmission device according to claim 13, wherein
the tokens include selection information on the data acquired by a program executed in the reception device, and
the selection information indicates that information associated with at least one of selection targets is recorded in the metadata.

15. The transmission device according to claim 14, wherein
the program executed in the reception device is a service worker (SW) that performs data management after an end of a related broadcast program, after a switch of channel, or in an offline state, and
the search scope token is a service worker (SW) search scope token capable of limiting a search scope of access information corresponding to data serving as a management target of a specific service worker (SW).

16. The transmission device according to claim 13,
wherein the at least one of the tokens included in the attribute of the file delivery table instance element is a search scope token capable of limiting a search scope of the metadata in which access information corresponding to the data is recorded.

17. The transmission device according to claim 14,
wherein the at least one of the tokens included in the attribute of the file delivery table instance element or the at least another one of the tokens included in the attribute of the file element is a cache scope token indicating that access information corresponding to the data is recorded in the metadata.

18. The transmission device according to claim 17, wherein
the program executed in the reception device is a service worker (SW) that performs data management after an end of a related broadcast program, after a switch of channel, or in an offline state, and
the cache scope token is a service worker (SW) cache scope token indicating that access information corresponding to data serving as a management target of a specific service worker (SW) is recorded in the metadata.

19. A data processing method performed in a reception device, the method comprising:
receiving, by circuitry of the reception device, metadata transmitted using a unidirectional delivery protocol; and
performing, by the circuitry of the reception device, selection of data according to tokens included in the metadata,
wherein
at least one of the tokens is included in an attribute of a file delivery table instance element in the metadata and associated with files in a file transfer session indicated in the file delivery table instance element, and
at least another one of the tokens is included in an attribute of a file element in the metadata and only associated with a file indicated in the file element.

20. A data processing method performed in a transmission device, the method comprising:
storing, in a storage of the transmission device, metadata usable in a reception device to perform selection of data; and
transmitting, by circuitry of the transmission device, the metadata using a unidirectional delivery protocol,
wherein
at least one of the tokens is included in an attribute of a file delivery table instance element in the metadata and associated with files in a file transfer session indicated in the file delivery table instance element, and
at least another one of the tokens is included in an attribute of a file element in the metadata and only associated with a file indicated in the file element.

* * * * *